(12) United States Patent
Sun et al.

(10) Patent No.: US 10,735,148 B2
(45) Date of Patent: Aug. 4, 2020

(54) ACKNOWLEDGEMENT INDICATION METHOD FOR DATA TRANSMISSION AND RELATED DEVICE

(71) Applicant: HUAWEI TECHNOLOGIES CO., LTD., Shenzhen (CN)

(72) Inventors: Hao Sun, Beijing (CN); Qiang Wu, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 15/940,980

(22) Filed: Mar. 30, 2018

(65) Prior Publication Data

US 2018/0227089 A1    Aug. 9, 2018

Related U.S. Application Data

(63) Continuation of application No. PCT/CN2015/091329, filed on Sep. 30, 2015.

(51) Int. Cl.
| | | |
|---|---|---|
| *H04L 1/18* | (2006.01) | |
| *H04L 1/16* | (2006.01) | |
| *H04W 74/08* | (2009.01) | |
| *H04L 1/20* | (2006.01) | |
| *H04L 1/00* | (2006.01) | |
| *H04W 88/08* | (2009.01) | |

(52) U.S. Cl.
CPC ............. *H04L 1/1858* (2013.01); *H04L 1/16* (2013.01); *H04L 1/1614* (2013.01); *H04L 1/1628* (2013.01); *H04L 1/20* (2013.01); *H04W 74/08* (2013.01); *H04L 2001/0093* (2013.01); *H04W 88/08* (2013.01)

(58) Field of Classification Search
CPC ....... H04L 1/16; H04L 1/1614; H04L 1/1621; H04L 1/1858; H04L 2001/0093
See application file for complete search history.

(56) References Cited

U.S. PATENT DOCUMENTS

| | | | |
|---|---|---|---|
| 2011/0286377 | A1 | 11/2011 | Sampath et al. |
| 2013/0021982 | A1 | 1/2013 | Kim et al. |

(Continued)

FOREIGN PATENT DOCUMENTS

| | | |
|---|---|---|
| CN | 101621318 A | 1/2010 |
| CN | 101790195 A | 7/2010 |

(Continued)

*Primary Examiner* — Keith Ferguson
(74) *Attorney, Agent, or Firm* — Kilpatrick Townsend & Stockton LLP

(57) ABSTRACT

Embodiments of the present invention disclose an acknowledgement indication method for data transmission and a related device. The method includes: detecting, by a base station, whether each user equipment (UE) in an acknowledgement group transmits data, to obtain a detection result; generating, by the base station, an acknowledgement indication message according to the detection result, where the acknowledgement indication message indicates a flag bit status corresponding to each UE in the acknowledgement group, the flag bit status includes a first state or a second state, the first state indicates that the base station finds data, and the second state indicates that the base station does not find data; and sending, by the base station, the acknowledgement indication message.

20 Claims, 18 Drawing Sheets

(56) References Cited

U.S. PATENT DOCUMENTS

2013/0148575 A1    6/2013  Wentink et al.
2013/0172035 A1*   7/2013  Wentink ............... H04L 1/1614
                                                                455/517

FOREIGN PATENT DOCUMENTS

| CN | 102118782 A  | 7/2011  |
| CN | 102158981 A  | 8/2011  |
| CN | 102648597 A  | 8/2012  |
| CN | 103354489 A  | 10/2013 |
| CN | 103609055 A  | 2/2014  |
| EP | 2800293 A2   | 11/2014 |
| JP | 2013513346 A | 4/2013  |
| JP | 2014517627 A | 7/2014  |
| WO | 2011072085 A1| 6/2011  |

* cited by examiner

FIG. 8

ACKNOWLEDGEMENT INDICATION METHOD FOR DATA TRANSMISSION AND RELATED DEVICE

CROSS-REFERENCE TO RELATED APPLICATIONS

This application is a continuation of International Patent Application No. PCT/CN2015/091329, filed on Sep. 30, 2015, the disclosure of which is hereby incorporated by reference in its entirety.

TECHNICAL FIELD

The present invention relates to the field of communications technologies, and in particular, to an acknowledgement indication method for data transmission and a related device.

BACKGROUND

In an Long Term Evolution (LTE) system, uplink data of user equipment (UE) is scheduled by using Physical Downlink Control Channel (PDCCH) signaling of a base station. The base station is clear about whether the UE needs to transmit data at any moment. Regardless of whether the base station misses detecting or incorrectly detects data transmitted by the UE, the base station feeds back a negative acknowledgement message to the UE on an acknowledgement resource corresponding to the UE. However, in a contention-based transmission manner, uplink data transmission by the UE is an indefinite event for the base station. When the base station misses detecting uplink data transmitted by the UE, the base station considers that the UE has not transmitted the data, and therefore, the base station does not feed back an acknowledgement message on the acknowledgement resource corresponding to the UE. Consequently, erroneous determining of an uplink data transmission situation is caused.

SUMMARY

Embodiments of the present invention disclose an acknowledgement indication method for data transmission and a relate device, to resolve a problem that UE has transmitted data but a base station misses detecting the data and does not feed back an acknowledgement indication message.

A first aspect of the embodiments of the present invention discloses an acknowledgement indication method for data transmission, including:

detecting, by a base station, whether each user equipment (UE) in an acknowledgement group transmits data, to obtain a detection result, where the acknowledgement group includes each UE whose data is to be detected by the base station;

generating, by the base station, a first-level acknowledgement indication message according to the detection result, where the first-level acknowledgement indication message indicates a flag bit status corresponding to each UE in the acknowledgement group, the flag bit status includes a first state or a second state, the first state indicates that the base station finds data, and the second state indicates that the base station does not find data; and sending, by the base station, the first-level acknowledgement indication message.

With reference to the first aspect of the embodiments of the present invention, in a first possible implementation of the first aspect of the embodiments of the present invention, a data length of the first-level acknowledgement indication message is determined by a quantity of the UE in the acknowledgement group.

With reference to the first aspect of the embodiments of the present invention or the first possible implementation of the first aspect, in a second possible implementation of the first aspect of the embodiments of the present invention, the sending, by the base station, the first-level acknowledgement indication message includes:

sending, by the base station, the first-level acknowledgement indication message on a first acknowledgement resource corresponding to the acknowledgement group.

With reference to any one of the first aspect of the embodiments of the present invention, or the first to the second possible implementations of the first aspect, in a third possible implementation of the first aspect of the embodiments of the present invention, the method further includes:

when there is target UE in the UE in the acknowledgement group, checking, by the base station, data transmitted by the target UE, to obtain a check result, where the target UE is all UE whose flag bit statuses are the first state;

generating, by the base station, a second-level acknowledgement indication message according to the check result, where the second-level acknowledgement indication message indicates a type of acknowledgement feedback information corresponding to the data transmitted by the target UE, the type of the acknowledgement feedback information includes a first type or a second type, the first type indicates that the data check performed by the base station succeeds, and the second type indicates that the data check performed by the base station fails; and sending, by the base station, the second-level acknowledgement indication message.

With reference to third possible implementation of the first aspect of the embodiments of the present invention, in a fourth possible implementation of the first aspect of the embodiments of the present invention, the sending, by the base station, the second-level acknowledgement indication message includes:

sending, by the base station, the second-level acknowledgement indication message on a second acknowledgement resource corresponding to the acknowledgement group.

With reference to the third possible implementation of the first aspect of the embodiments of the present invention or the fourth possible implementation of the first aspect, in a fifth possible implementation of the first aspect of the embodiments of the present invention, a data length of the second-level acknowledgement indication message is determined by a quantity of the target UE.

With reference to any one of the third to the fifth possible implementations of the first aspect of the embodiments of the present invention, in a sixth possible implementation of the first aspect of the embodiments of the present invention, when the second-level acknowledgement indication message indicates that a type of acknowledgement feedback information corresponding to data transmitted by at least one target UE is the second type, the second-level acknowledgement indication message further indicates a check failure status corresponding to the data transmitted by the at least one target UE, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the first aspect of the embodiments of the present invention, or the first to the sixth possible implementations of the first aspect, in a seventh possible implementation of the first aspect of the embodiments of the present invention, before the detecting, by a base station, whether each user equipment (UE) in an acknowledgement group transmits data, to obtain a detection result, the method further includes:

sending, by the base station, configuration information to each user equipment (UE) in the acknowledgement group, where the configuration information indicates the acknowledgement group to which each UE belongs, the quantity of the UE in the acknowledgement group, and a flag bit corresponding to each UE in the acknowledgement group.

A second aspect of the embodiments of the present invention discloses an acknowledgement indication method for data transmission, including:

detecting, by a base station, whether each user equipment (UE) in an acknowledgement group transmits data, to obtain a detection result, where the acknowledgement group includes each UE whose data is to be detected by the base station;

generating, by the base station, an acknowledgement indication message according to the detection result, where the acknowledgement indication message indicates an index number corresponding to target UE in the acknowledgement group, the target UE is at least one UE whose data is found by the base station in the acknowledgement group, the index number is a number of the target UE in the acknowledgement group, and different target UE in the acknowledgement group correspond to different index numbers; and sending, by the base station, the acknowledgement indication message.

With reference to the second aspect of the embodiments of the present invention, in a first possible implementation of the second aspect of the embodiments of the present invention, the sending, by the base station, the acknowledgement indication message includes:

sending, by the base station, the acknowledgement indication message on an acknowledgement resource corresponding to the acknowledgement group.

With reference to the second aspect of the embodiments of the present invention or the first possible implementation of the second aspect, in a second possible implementation of the second aspect of the embodiments of the present invention, the acknowledgement indication message further indicates a flag bit of the index number corresponding to the target UE, and before the sending, by the base station, the acknowledgement indication message, the method further includes:

checking, by the base station, data transmitted by the target UE, to obtain a check result; and generating, by the base station according to the check result, a flag bit status of the index number corresponding to the target UE, where the flag bit status of the index number includes a first state or a second state, the first state indicates that the data check performed by the base station succeeds, and the second state indicates that the data check performed by the base station fails.

With reference to the second possible implementation of the second aspect of the embodiments of the present invention, in a third possible implementation of the second aspect of the embodiments of the present invention, when the acknowledgement indication message indicates that there is target UE corresponding to an index number whose flag bit status is the second state, the acknowledgement indication message further indicates a check failure status corresponding to data transmitted by the target UE corresponding to the index number whose flag bit status is the second state, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the second aspect of the embodiments of the present invention, or the first to the third possible implementations of the second aspect, in a fourth possible implementation of the second aspect of the embodiments of the present invention, a data length of the acknowledgement indication message is a preset data length, and a quantity of index numbers that are indicated by the acknowledgement indication message and that are corresponding to target UE in the acknowledgement group does not exceed the preset data length.

With reference to any one of the second aspect of the embodiments of the present invention, or the first to the fourth possible implementations of the second aspect, in a fifth possible implementation of the second aspect of the embodiments of the present invention, before the detecting, by a base station, whether each user equipment (UE) in an acknowledgement group transmits data, to obtain a detection result, the method further includes:

sending, by the base station, configuration information to each user equipment (UE) in the acknowledgement group, where the configuration information indicates the acknowledgement group to which each UE belongs, a quantity of UE for which the base station presets a feedback in the acknowledgement group, and an index number corresponding to each UE in the acknowledgement group.

A third aspect of the embodiments of the present invention discloses an acknowledgement indication method for data transmission, including:

receiving, by user equipment (UE) after sending data to a base station, a first-level acknowledgement indication message that is fed back by the base station, where the first-level acknowledgement indication message indicates a flag bit status corresponding to each UE in an acknowledgement group to which the UE belongs, the flag bit status includes a first state or a second state, the first state indicates that the base station finds data, the second state indicates that the base station does not find data, and the acknowledgement group includes each UE whose data is to be detected by the base station; and parsing, by the UE, a flag bit status corresponding to the UE in the acknowledgement group from the first-level acknowledgement indication message.

With reference to the third aspect of the embodiments of the present invention, in a first possible implementation of the third aspect of the embodiments of the present invention, a data length of the first-level acknowledgement indication message is determined by a quantity of the UE in the acknowledgement group.

With reference to the third aspect of the embodiments of the present invention or the first possible implementation of the third aspect, in a second possible implementation of the third aspect of the embodiments of the present invention, the method further includes:

when the UE learns, by means of parsing, that the flag bit status corresponding to the UE in the acknowledgement group is the first state, receiving, by the UE, a second-level acknowledgement indication message that is fed back by the base station, where the second-level acknowledgement indication message indicates a type of acknowledgement feedback information corresponding to data sent by target UE, the target UE is all UE that are in the acknowledgement group and whose flag bit statuses are the first state, the type of the acknowledgement feedback information includes a first type or a second type, the first type indicates that data check performed by the base station succeeds, and the second type indicates that the data check performed by the base station fails; and parsing, by the UE from the second-level acknowledgement indication message, a type of acknowledgement feedback information corresponding to the data sent by the UE.

With reference to the second possible implementation of the third aspect of the embodiments of the present invention, in a third possible implementation of the third aspect of the embodiments of the present invention, a data length of the second-level acknowledgement indication message is determined by a quantity of the target UE.

With reference to the second or the third possible implementation of the third aspect of the embodiments of the present invention, in a fourth possible implementation of the third aspect of the embodiments of the present invention, the parsing, by the UE from the second-level acknowledgement indication message, a type of acknowledgement feedback information corresponding to the data sent by the UE includes:

collecting, by the UE, statistics about the quantity of the target UE;

determining, by the UE, a location of the UE in the target UE, where a location of the UE in the second-level acknowledgement indication message is determined by the location of the UE in the target UE; and parsing, by the UE on the location of the UE in the second-level acknowledgement indication message, the type of the acknowledgement feedback information corresponding to the data sent by the UE.

With reference to any one of the second to the fourth possible implementations of the third aspect of the embodiments of the present invention, in a fifth possible implementation of the third aspect of the embodiments of the present invention, when the second-level acknowledgement indication message indicates that a type of acknowledgement feedback information corresponding to data transmitted by at least one target UE is the second type, the second-level acknowledgement indication message further indicates a check failure status corresponding to the data sent by the at least one target UE, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the second to the fifth possible implementations of the third aspect of the embodiments of the present invention, in a sixth possible implementation of the third aspect of the embodiments of the present invention, the method further includes:

when the UE learns, by means of parsing, that the type of the acknowledgement feedback information corresponding to the data sent by the UE is the first type, determining, by the UE, that check performed by the base station on the data sent by the UE succeeds.

With reference to any one of the second to the fifth possible implementations of the third aspect of the embodiments of the present invention, in a seventh possible implementation of the third aspect of the embodiments of the present invention, the method further includes:

when the UE learns, by means of parsing, that the type of the acknowledgement feedback information corresponding to the data sent by the UE is the second type, determining, by the UE, that check performed by the base station on the data sent by the UE fails.

With reference to the fifth possible implementation of the third aspect of the embodiments of the present invention, in an eighth possible implementation of the third aspect of the embodiments of the present invention, the method further includes:

when the UE learns, by means of parsing, that the type of the acknowledgement feedback information corresponding to the data sent by the UE is the second type, parsing, by the UE from the second-level acknowledgement indication message, a check failure status corresponding to the data sent by the UE.

With reference to the eighth possible implementation of the third aspect of the embodiments of the present invention, in a ninth possible implementation of the third aspect of the embodiments of the present invention, the method further includes:

when the UE learns, by means of parsing, that the check failure status corresponding to the data sent by the UE is the third state, determining, by the UE, that check performed by the base station on the data sent by the UE fails due to the conflict that is caused by the low uplink multi-user matching degree.

With reference to the eighth possible implementation of the third aspect of the embodiments of the present invention, in a tenth possible implementation of the third aspect of the embodiments of the present invention, the method further includes:

when the UE learns, by means of parsing, that the check failure status corresponding to the data sent by the UE is the fourth state, determining, by the UE, that check performed by the base station on the data sent by the UE fails due to the poor data transmission channel quality.

With reference to the third aspect of the embodiments of the present invention or the first possible implementation of the third aspect, in an eleventh possible implementation of the third aspect of the embodiments of the present invention, the method further includes:

when the UE learns, by means of parsing, that the flag bit status corresponding to the UE in the acknowledgement group is the second state, determining, by the UE, that the base station does not find the data sent by the UE.

With reference to any one of the third aspect of the embodiments of the present invention, or the first to the eleventh possible implementations of the third aspect, in a twelfth possible implementation of the third aspect of the embodiments of the present invention, before the receiving, by user equipment (UE) after sending data to a base station, a first-level acknowledgement indication message that is fed back by the base station, the method further includes:

receiving, by the user equipment (UE), configuration information sent by the base station, where the configuration information indicates the acknowledgement group to which the UE belongs, the quantity of the UE in the acknowledgement group, and a flag bit corresponding to the UE in the acknowledgement group.

A fourth aspect of the embodiments of the present invention discloses an acknowledgement indication method for data transmission, including:

receiving, by user equipment (UE) after sending data to a base station, an acknowledgement indication message that is fed back by the base station, where the acknowledgement indication message indicates an index number corresponding to target UE in an acknowledgement group to which the UE belongs, the target UE is at least one UE whose data is found by the base station in the acknowledgement group, the index number is a number of the target UE in the acknowledgement group, different target UE in the acknowledgement group correspond to different index numbers, and the acknowledgement group includes each UE whose data is to be detected by the base station; and parsing, by the UE, the acknowledgement indication message, to detect whether there is an index number corresponding to the UE in the acknowledgement indication message.

With reference to the fourth aspect of the embodiments of the present invention, in a first possible implementation of the fourth aspect of the embodiments of the present invention, the acknowledgement indication message further indicates a flag bit of the index number corresponding to the target UE, and the method further includes:

when the UE learns, by means of parsing, that there is the index number corresponding to the UE in the acknowledgement indication message, parsing, by the UE, a flag bit status of the index number corresponding to the UE, where the flag bit status of the index number includes a first state or a second state, the first state indicates that data check performed by the base station succeeds, and the second state indicates that the data check performed by the base station fails.

With reference to the first possible implementation of the fourth aspect of the embodiments of the present invention, in a second possible implementation of the fourth aspect of the embodiments of the present invention, when the acknowledgement indication message indicates that there is target UE corresponding to an index number whose flag bit status is the second state, the acknowledgement indication message further indicates a check failure status corresponding to data sent by the target UE corresponding to the index number whose flag bit status is the second state, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to the first or the second possible implementation of the fourth aspect of the embodiments of the present invention, in a third possible implementation of the fourth aspect of the embodiments of the present invention, the method further includes:

when the UE learns, by means of parsing, that the flag bit status of the index number corresponding to the UE is the first state, determining, by the UE, that check performed by the base station on the data sent by the UE succeeds.

With reference to the first or the second possible implementation of the fourth aspect of the embodiments of the present invention, in a fourth possible implementation of the fourth aspect of the embodiments of the present invention, the method further includes:

when the UE learns, by means of parsing, that the flag bit status of the index number corresponding to the UE is the second state, determining, by the UE, that check performed by the base station on the data sent by the UE fails.

With reference to the second possible implementation of the fourth aspect of the embodiments of the present invention, in a fifth possible implementation of the fourth aspect of the embodiments of the present invention, the method further includes:

when the UE learns, by means of parsing, that the flag bit status of the index number corresponding to the UE is the second state, parsing, by the UE from the acknowledgement indication message, a check failure status corresponding to the data sent by the UE.

With reference to the fifth possible implementation of the fourth aspect of the embodiments of the present invention, in a sixth possible implementation of the fourth aspect of the embodiments of the present invention, the method further includes:

when the UE learns, by means of parsing, that the check failure status corresponding to the data sent by the UE is the third state, determining, by the UE, that check performed by the base station on the data sent by the UE fails due to the conflict that is caused by the low uplink multi-user matching degree.

With reference to the fifth possible implementation of the fourth aspect of the embodiments of the present invention, in a seventh possible implementation of the fourth aspect of the embodiments of the present invention, the method further includes:

when the UE learns, by means of parsing, that the check failure status corresponding to the data sent by the UE is the fourth state, determining, by the UE, that check performed by the base station on the data sent by the UE fails due to the poor data transmission channel quality.

With reference to the fourth aspect of the embodiments of the present invention, in an eighth possible implementation of the fourth aspect of the embodiments of the present invention, the method further includes:

when the UE learns, by means of parsing, that there is no index number corresponding to the UE in the acknowledgement indication message, determining, by the UE, that the base station does not find the data sent by the UE.

With reference to any one of the fourth aspect of the embodiments of the present invention, or the first to the eighth possible implementations of the fourth aspect, in a ninth possible implementation of the fourth aspect of the embodiments of the present invention, a data length of the acknowledgement indication message is a preset data length, and a quantity of index numbers that are indicated by the acknowledgement indication message and that are corresponding to target UE in the acknowledgement group to which the UE belongs does not exceed the preset data length.

With reference to any one of the fourth aspect of the embodiments of the present invention, or the first to the ninth possible implementations of the fourth aspect, in a tenth possible implementation of the fourth aspect of the embodiments of the present invention, before the receiving, by user equipment (UE) after sending data to a base station, an acknowledgement indication message that is fed back by the base station, the method further includes:

receiving, by the user equipment (UE), configuration information sent by the base station, where the configuration information indicates the acknowledgement group to which the UE belongs, a quantity of UE for which the base station presets a feedback in the acknowledgement group, and the index number corresponding to the UE in the acknowledgement group.

A fifth aspect of the embodiments of the present invention discloses a base station, including:

a detection unit, configured to detect whether each user equipment (UE) in an acknowledgement group transmits data, to obtain a detection result, where the acknowledgement group includes each UE whose data is to be detected by the base station;

a generation unit, configured to generate a first-level acknowledgement indication message according to the detection result, where the first-level acknowledgement indication message indicates a flag bit status corresponding to each UE in the acknowledgement group, the flag bit status includes a first state or a second state, the first state indicates that the base station finds data, and the second state indicates that the base station does not find data; and a sending unit, configured to send the first-level acknowledgement indication message.

With reference to the fifth aspect of the embodiments of the present invention, in a first possible implementation of the fifth aspect of the embodiments of the present invention, a data length of the first-level acknowledgement indication message is determined by a quantity of the UE in the acknowledgement group.

With reference to the fifth aspect of the embodiments of the present invention or the first possible implementation of the fifth aspect, in a second possible implementation of the fifth aspect of the embodiments of the present invention, a manner in which the sending unit sends the first-level acknowledgement indication message is specifically:

sending, by the sending unit, the first-level acknowledgement indication message on a first acknowledgement resource corresponding to the acknowledgement group.

With reference to any one of the fifth aspect of the embodiments of the present invention, or the first to the second possible implementations of the fifth aspect, in a third possible implementation of the fifth aspect of the embodiments of the present invention, the base station further includes:

a check unit, configured to: when there is target UE in the UE in the acknowledgement group, check data transmitted by the target UE, to obtain a check result, where the target UE is all UE whose flag bit statuses are the first state;

the generation unit is further configured to generate a second-level acknowledgement indication message according to the check result, where the second-level acknowledgement indication message indicates a type of acknowledgement feedback information corresponding to the data transmitted by the target UE, the type of the acknowledgement feedback information includes a first type or a second type, the first type indicates that the data check performed by the base station succeeds, and the second type indicates that the data check performed by the base station fails; and the sending unit is further configured to send the second-level acknowledgement indication message.

With reference to the third possible implementation of the fifth aspect of the embodiments of the present invention, in a fourth possible implementation of the fifth aspect of the embodiments of the present invention, a manner in which the sending unit sends the second-level acknowledgement indication message is specifically:

sending, by the sending unit, the second-level acknowledgement indication message on a second acknowledgement resource corresponding to the acknowledgement group.

With reference to the third possible implementation of the fifth aspect of the embodiments of the present invention or the fourth possible implementation of the fifth aspect, in a fifth possible implementation of the fifth aspect of the embodiments of the present invention, a data length of the second-level acknowledgement indication message is determined by a quantity of the target UE.

With reference to any one of the third to the fifth possible implementations of the fifth aspect of the embodiments of the present invention, in a sixth possible implementation of the fifth aspect of the embodiments of the present invention, when the second-level acknowledgement indication message indicates that a type of acknowledgement feedback information corresponding to data transmitted by at least one target UE is the second type, the second-level acknowledgement indication message further indicates a check failure status corresponding to the data transmitted by the at least one target UE, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the fifth aspect of the embodiments of the present invention, or the first to the sixth possible implementations of the fifth aspect, in a seventh possible implementation of the fifth aspect of the embodiments of the present invention, before the detection unit detects whether each user equipment (UE) in the acknowledgement group transmits data, to obtain the detection result, the sending unit is further configured to send configuration information to each user equipment (UE) in the acknowledgement group, where the configuration information indicates the acknowledgement group to which each UE belongs, the quantity of the UE in the acknowledgement group, and a flag bit corresponding to each UE in the acknowledgement group.

A sixth aspect of the embodiments of the present invention discloses a base station, including:

a detection unit, configured to detect whether each user equipment (UE) in an acknowledgement group transmits data, to obtain a detection result, where the acknowledgement group includes each UE whose data is to be detected by the base station;

a generation unit, configured to generate an acknowledgement indication message according to the detection result, where the acknowledgement indication message indicates an index number corresponding to target UE in the acknowledgement group, the target UE is at least one UE whose data is found by the base station in the acknowledgement group, the index number is a number of the target UE in the acknowledgement group, and different target UE in the acknowledgement group correspond to different index numbers; and a sending unit, configured to send the acknowledgement indication message.

With reference to the sixth aspect of the embodiments of the present invention, in a first possible implementation of the sixth aspect of the embodiments of the present invention, a manner in which the sending unit sends the acknowledgement indication message is specifically:

sending, by the sending unit, the acknowledgement indication message on an acknowledgement resource corresponding to the acknowledgement group.

With reference to the sixth aspect of the embodiments of the present invention or the first possible implementation of the sixth aspect, in a second possible implementation of the sixth aspect of the embodiments of the present invention, the acknowledgement indication message further indicates a flag bit of the index number corresponding to the target UE, and the base station further includes:

a check unit, configured to: before the sending unit sends the acknowledgement indication message, check data transmitted by the target UE, to obtain a check result; and the generation unit is further configured to generate, according to the check result, a flag bit status of the index number corresponding to the target UE, where the flag bit status of the index number includes a first state or a second state, the first state indicates that the data check performed by the base station succeeds, and the second state indicates that the data check performed by the base station fails.

With reference to the second possible implementation of the sixth aspect of the embodiments of the present invention, in a third possible implementation of the sixth aspect of the embodiments of the present invention, when the acknowledgement indication message indicates that there is target UE corresponding to an index number whose flag bit status is the second state, the acknowledgement indication message further indicates a check failure status corresponding to data transmitted by the target UE corresponding to the index number whose flag bit status is the second state, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the sixth aspect of the embodiments of the present invention, or the first to the third possible implementations of the sixth aspect, in a fourth possible implementation of the sixth aspect of the embodiments of the present invention, a data length of the acknowledgement indication message is a preset data length, and a quantity of index numbers that are indicated by the acknowledgement indication message and that are corresponding to target UE in the acknowledgement group does not exceed the preset data length.

With reference to any one of the sixth aspect of the embodiments of the present invention, or the first to the fourth possible implementations of the sixth aspect, in a fifth possible implementation of the sixth aspect of the embodiments of the present invention, before the detection unit detects whether each user equipment (UE) in the acknowledgement group transmits data, to obtain the detection result, the sending unit is further configured to send configuration information to each user equipment (UE) in the acknowledgement group, where the configuration information indicates the acknowledgement group to which each UE belongs, a quantity of UE for which the base station presets a feedback in the acknowledgement group, and an index number corresponding to each UE in the acknowledgement group.

A seventh aspect of the embodiments of the present invention discloses user equipment (UE), including:

a receiving unit, configured to receive, after the UE sends data to a base station, a first-level acknowledgement indication message that is fed back by the base station, where the first-level acknowledgement indication message indicates a flag bit status corresponding to each UE in an acknowledgement group to which the UE belongs, the flag bit status includes a first state or a second state, the first state indicates that the base station finds data, the second state indicates that the base station does not find data, and the acknowledgement group includes each UE whose data is to be detected by the base station; and a first parsing unit, configured to parse a flag bit status corresponding to the UE in the acknowledgement group from the first-level acknowledgement indication message.

With reference to the seventh aspect of the embodiments of the present invention, in a first possible implementation of the seventh aspect of the embodiments of the present invention, a data length of the first-level acknowledgement indication message is determined by a quantity of the UE in the acknowledgement group.

With reference to the seventh aspect of the embodiments of the present invention or the first possible implementation of the seventh aspect, in a second possible implementation of the seventh aspect of the embodiments of the present invention, the receiving unit is further configured to: when the first parsing unit learns, by means of parsing, that the flag bit status corresponding to the UE in the acknowledgement group is the first state, receive a second-level acknowledgement indication message that is fed back by the base station, where the second-level acknowledgement indication message indicates a type of acknowledgement feedback information corresponding to data sent by target UE, the target UE is all UE that are in the acknowledgement group and whose flag bit statuses are the first state, the type of the acknowledgement feedback information includes a first type or a second type, the first type indicates that data check performed by the base station succeeds, and the second type indicates that the data check performed by the base station fails; and the UE further includes:

a second parsing unit, configured to parse, from the second-level acknowledgement indication message, a type of acknowledgement feedback information corresponding to the data sent by the UE.

With reference to the second possible implementation of the seventh aspect of the embodiments of the present invention, in a third possible implementation of the seventh aspect of the embodiments of the present invention, a data length of the second-level acknowledgement indication message is determined by a quantity of the target UE.

With reference to the second or the third possible implementation of the seventh aspect of the embodiments of the present invention, in a fourth possible implementation of the seventh aspect of the embodiments of the present invention, the second parsing unit includes:

a statistics collection subunit, configured to collect statistics about the quantity of the target UE;

a determining subunit, configured to determine a location of the UE in the target UE, where a location of the UE in the second-level acknowledgement indication message is determined by the location of the UE in the target UE; and a parsing subunit, configured to parse, on the location of the UE in the second-level acknowledgement indication message, the type of the acknowledgement feedback information corresponding to the data sent by the UE.

With reference to any one of the second to the fourth possible implementations of the seventh aspect of the embodiments of the present invention, in a fifth possible implementation of the seventh aspect of the embodiments of the present invention, when the second-level acknowledgement indication message indicates that a type of acknowledgement feedback information corresponding to data transmitted by at least one target UE is the second type, the second-level acknowledgement indication message further indicates a check failure status corresponding to the data sent by the at least one target UE, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the second to the fifth possible implementations of the seventh aspect of the embodiments of the present invention, in a sixth possible implementation of the seventh aspect of the embodiments of the present invention, the UE further includes:

a first determining unit, configured to: when the second parsing unit learns, by means of parsing, that the type of the acknowledgement feedback information corresponding to the data sent by the UE is the first type, determine that check performed by the base station on the data sent by the UE succeeds.

With reference to any one of the second to the fifth possible implementations of the seventh aspect of the embodiments of the present invention, in a seventh possible implementation of the seventh aspect of the embodiments of the present invention, the UE further includes:

a second determining unit, configured to: when the second parsing unit learns, by means of parsing, that the type of the acknowledgement feedback information corresponding to the data sent by the UE is the second type, determine that check performed by the base station on the data sent by the UE fails.

With reference to the fifth possible implementation of the seventh aspect of the embodiments of the present invention, in an eighth possible implementation of the seventh aspect of the embodiments of the present invention, the UE further includes:

a third parsing unit, configured to: when the second parsing unit learns, by means of parsing, that the type of the acknowledgement feedback information corresponding to the data sent by the UE is the second type, parse, from the second-level acknowledgement indication message, a check failure status corresponding to the data sent by the UE.

With reference to the eighth possible implementation of the seventh aspect of the embodiments of the present invention, in a ninth possible implementation of the seventh aspect of the embodiments of the present invention, the UE further includes:

a third determining unit, configured to: when the third parsing unit learns, by means of parsing, that the check failure status corresponding to the data sent by the UE is the third state, determine that check performed by the base station on the data sent by the UE fails due to the conflict that is caused by the low uplink multi-user matching degree.

With reference to the eighth possible implementation of the seventh aspect of the embodiments of the present invention, in a tenth possible implementation of the seventh aspect of the embodiments of the present invention, the UE further includes:

a fourth determining unit, configured to: when the third parsing unit learns, by means of parsing, that the check failure status corresponding to the data sent by the UE is the fourth state, determine that check performed by the base station on the data sent by the UE fails due to the poor data transmission channel quality.

With reference to the seventh aspect of the embodiments of the present invention or the first possible implementation of the seventh aspect, in an eleventh possible implementation of the seventh aspect of the embodiments of the present invention, the UE further includes:

a fifth determining unit, configured to: when the first parsing unit learns, by means of parsing, that the flag bit status corresponding to the UE in the acknowledgement group is the second state, determine that the base station does not find the data sent by the UE.

With reference to any one of the seventh aspect of the embodiments of the present invention, or the first to the eleventh possible implementations of the seventh aspect, in a twelfth possible implementation of the seventh aspect of the embodiments of the present invention, the receiving unit is further configured to: before receiving, after the UE sends the data to the base station, the first-level acknowledgement indication message that is fed back by the base station, receive configuration information sent by the base station, where the configuration information indicates the acknowledgement group to which the UE belongs, the quantity of the UE in the acknowledgement group, and a flag bit corresponding to the UE in the acknowledgement group.

An eighth aspect of the embodiments of the present invention discloses user equipment (UE), including:

a receiving unit, configured to: after the UE sends data to a base station, receive an acknowledgement indication message that is fed back by the base station, where the acknowledgement indication message indicates an index number corresponding to target UE in an acknowledgement group to which the UE belongs, the target UE is at least one UE whose data is found by the base station in the acknowledgement group, the index number is a number of the target UE in the acknowledgement group, different target UE in the acknowledgement group correspond to different index numbers, and the acknowledgement group includes each UE whose data is to be detected by the base station; and a first parsing unit, configured to parse the acknowledgement indication message, to detect whether there is an index number corresponding to the UE in the acknowledgement indication message.

With reference to the eighth aspect of the embodiments of the present invention, in a first possible implementation of the eighth aspect of the embodiments of the present invention, the acknowledgement indication message further indicates a flag bit of the index number corresponding to the target UE, and the UE further includes:

a second parsing unit, configured to: when the first parsing unit learns, by means of parsing, that there is the index number corresponding to the UE in the acknowledgement indication message, parse a flag bit status of the index number corresponding to the UE, where the flag bit status of the index number includes a first state or a second state, the first state indicates that data check performed by the base station succeeds, and the second state indicates that the data check performed by the base station fails.

With reference to the first possible implementation of the eighth aspect of the embodiments of the present invention, in a second possible implementation of the eighth aspect of the embodiments of the present invention, when the acknowledgement indication message indicates that there is target UE corresponding to an index number whose flag bit status is the second state, the acknowledgement indication message further indicates a check failure status corresponding to data sent by the target UE corresponding to the index number whose flag bit status is the second state, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to the first or the second possible implementation of the eighth aspect of the embodiments of the present invention, in a third possible implementation of the eighth aspect of the embodiments of the present invention, the UE further includes:

a first determining unit, configured to: when the second parsing unit learns, by means of parsing, that the flag bit status of the index number corresponding to the UE is the first state, determine that check performed by the base station on the data sent by the UE succeeds.

With reference to the first or the second possible implementation of the eighth aspect of the embodiments of the present invention, in a fourth possible implementation of the eighth aspect of the embodiments of the present invention, the UE further includes:

a second determining unit, configured to: when the second parsing unit learns, by means of parsing, that the flag bit status of the index number corresponding to the UE is the second state, determine that check performed by the base station on the data sent by the UE fails.

With reference to the second possible implementation of the eighth aspect of the embodiments of the present invention, in a fifth possible implementation of the eighth aspect of the embodiments of the present invention, the UE further includes:

a third parsing unit, configured to: when the second parsing unit learns, by means of parsing, that the flag bit status of the index number corresponding to the UE is the second state, parse, from the acknowledgement indication message, a check failure status corresponding to the data sent by the UE.

With reference to the fifth possible implementation of the eighth aspect of the embodiments of the present invention, in a sixth possible implementation of the eighth aspect of the embodiments of the present invention, the UE further includes:

a third determining unit, configured to: when the third parsing unit learns, by means of parsing, that the check failure status corresponding to the data sent by the UE is the third state, determine that check performed by the base station on the data sent by the UE fails due to the conflict that is caused by the low uplink multi-user matching degree.

With reference to the fifth possible implementation of the eighth aspect of the embodiments of the present invention, in a seventh possible implementation of the eighth aspect of the embodiments of the present invention, the UE further includes:

a fourth determining unit, configured to: when the third parsing unit learns, by means of parsing, that the check failure status corresponding to the data sent by the UE is the fourth state, determine that check performed by the base station on the data sent by the UE fails due to the poor data transmission channel quality.

With reference to the eighth aspect of the embodiments of the present invention, in an eighth possible implementation of the eighth aspect of the embodiments of the present invention, the UE further includes:

a fifth determining unit, configured to: when the first parsing unit learns, by means of parsing, that there is no index number corresponding to the UE in the acknowledgement indication message, determine that the base station does not find the data sent by the UE.

With reference to any one of the eighth aspect of the embodiments of the present invention, or the first to the eighth possible implementations of the eighth aspect, in a ninth possible implementation of the eighth aspect of the embodiments of the present invention, a data length of the acknowledgement indication message is a preset data length, and a quantity of index numbers that are indicated by the acknowledgement indication message and that are corresponding to target UE in the acknowledgement group to which the UE belongs does not exceed the preset data length.

With reference to any one of the eighth aspect of the embodiments of the present invention, or the first to the ninth possible implementations of the eighth aspect, in a tenth possible implementation of the eighth aspect of the embodiments of the present invention.

the receiving unit is further configured to: before receiving, after the UE sends the data to the base station, the acknowledgement indication message that is fed back by the base station, receive configuration information sent by the base station, where the configuration information indicates the acknowledgement group to which the UE belongs, a quantity of UE for which the base station presets a feedback in the acknowledgement group, and the index number corresponding to the UE in the acknowledgement group.

A ninth aspect of the embodiments of the present invention discloses a base station, including a processor, a memory, an output apparatus, and a communications bus, where the memory is configured to store a program and data;

the communications bus is configured to establish connections and communication between the processor, the memory, and the output apparatus; and the processor is configured to invoke the program stored in the memory, to perform the following steps:

detecting whether each user equipment (UE) in an acknowledgement group transmits data, to obtain a detection result, where the acknowledgement group includes each UE whose data is to be detected by the base station;

generating a first-level acknowledgement indication message according to the detection result, where the first-level acknowledgement indication message indicates a flag bit status corresponding to each UE in the acknowledgement group, the flag bit status includes a first state or a second state, the first state indicates that the base station finds data, and the second state indicates that the base station does not find data; and controlling the output apparatus to send the first-level acknowledgement indication message.

With reference to the ninth aspect of the embodiments of the present invention, in a first possible implementation of the ninth aspect of the embodiments of the present invention, a data length of the first-level acknowledgement indication message is determined by a quantity of the UE in the acknowledgement group.

With reference to the ninth aspect of the embodiments of the present invention or the first possible implementation of the ninth aspect, in a second possible implementation of the ninth aspect of the embodiments of the present invention, a manner in which the processor controls the output apparatus to send the first-level acknowledgement indication message is specifically:

controlling the output apparatus to send the first-level acknowledgement indication message on a first acknowledgement resource corresponding to the acknowledgement group.

With reference to any one of the ninth aspect of the embodiments of the present invention, or the first to the second possible implementations of the ninth aspect, in a third possible implementation of the ninth aspect of the embodiments of the present invention, the processor is further configured to invoke the program stored in the memory, to perform the following steps:

when there is target UE in the UE in the acknowledgement group, checking data transmitted by the target UE, to obtain a check result, where the target UE is all UE whose flag bit statuses are the first state;

generating a second-level acknowledgement indication message according to the check result, where the second-level acknowledgement indication message indicates a type of acknowledgement feedback information corresponding to the data transmitted by the target UE, the type of the acknowledgement feedback information includes a first type or a second type, the first type indicates that the data check performed by the base station succeeds, and the second type indicates that the data check performed by the base station fails; and controlling the output apparatus to send the second-level acknowledgement indication message.

With reference to the third possible implementation of the ninth aspect of the embodiments of the present invention, in a fourth possible implementation of the ninth aspect of the embodiments of the present invention, a manner in which the processor controls the output apparatus to send the second-level acknowledgement indication message is specifically:

controlling the output apparatus to send the second-level acknowledgement indication message on a second acknowledgement resource corresponding to the acknowledgement group.

With reference to the third possible implementation of the ninth aspect of the embodiments of the present invention or the fourth possible implementation of the ninth aspect, in a fifth possible implementation of the ninth aspect of the embodiments of the present invention, a data length of the second-level acknowledgement indication message is determined by a quantity of the target UE.

With reference to any one of the third to the fifth possible implementations of the ninth aspect of the embodiments of the present invention, in a sixth possible implementation of the ninth aspect of the embodiments of the present invention, when the second-level acknowledgement indication message indicates that a type of acknowledgement feedback information corresponding to data transmitted by at least one target UE is the second type, the second-level acknowledgement indication message further indicates a check failure status corresponding to the data transmitted by the at least one target UE, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the ninth aspect of the embodiments of the present invention, or the first to the sixth possible implementations of the ninth aspect, in a seventh possible implementation of the ninth aspect of the embodiments of the present invention, before the detecting whether each user equipment (UE) in an acknowledgement group transmits data, to obtain a detection result, the processor is further configured to invoke the program stored in the memory, to perform the following step:

controlling the output apparatus to send, to each user equipment (UE) in the acknowledgement group, configuration information included in the data stored in the memory, where the configuration information indicates the acknowledgement group to which each UE belongs, the quantity of the UE in the acknowledgement group, and a flag bit corresponding to each UE in the acknowledgement group.

A tenth aspect of the embodiments of the present invention discloses a base station, including a processor, a memory, an output apparatus, and a communications bus, where the memory is configured to store a program and data;

the communications bus is configured to establish connections and communication between the processor, the memory, and the output apparatus; and the processor is configured to invoke the program stored in the memory, to perform the following steps:

detecting whether each user equipment (UE) in an acknowledgement group transmits data, to obtain a detection result, where the acknowledgement group includes each UE whose data is to be detected by the base station;

generating an acknowledgement indication message according to the detection result, where the acknowledgement indication message indicates an index number corresponding to target UE in the acknowledgement group, the target UE is at least one UE whose data is found by the base station in the acknowledgement group, the index number is a number of the target UE in the acknowledgement group, and different target UE in the acknowledgement group correspond to different index numbers; and controlling the output apparatus to send the acknowledgement indication message.

With reference to the tenth aspect of the embodiments of the present invention, in a first possible implementation of the tenth aspect of the embodiments of the present invention, a manner in which the processor controls the output apparatus to send the acknowledgement indication message is specifically:

controlling the output apparatus to send the acknowledgement indication message on an acknowledgement resource corresponding to the acknowledgement group.

With reference to the tenth aspect of the embodiments of the present invention or the first possible implementation of the tenth aspect, in a second possible implementation of the tenth aspect of the embodiments of the present invention, the acknowledgement indication message further indicates a flag bit of the index number corresponding to the target UE, and before the controlling the output apparatus to send the acknowledgement indication message, the processor is further configured to invoke the program stored in the memory, to perform the following steps:

checking data transmitted by the target UE, to obtain a check result; and generating, according to the check result, a flag bit status of the index number corresponding to the target UE, where the flag bit status of the index number includes a first state or a second state, the first state indicates that the data check performed by the base station succeeds, and the second state indicates that the data check performed by the base station fails.

With reference to the second possible implementation of the tenth aspect of the embodiments of the present invention, in a third possible implementation of the tenth aspect of the embodiments of the present invention, when the acknowledgement indication message indicates that there is target UE corresponding to an index number whose flag bit status is the second state, the acknowledgement indication message further indicates a check failure status corresponding to data transmitted by the target UE corresponding to the index number whose flag bit status is the second state, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the tenth aspect of the embodiments of the present invention, or the first to the third possible implementations of the tenth aspect, in a fourth possible implementation of the tenth aspect of the embodiments of the present invention, a data length of the acknowledgement indication message is a preset data length, and a quantity of index numbers that are indicated by the acknowledgement indication message and that are corresponding to target UE in the acknowledgement group does not exceed the preset data length.

With reference to any one of the tenth aspect of the embodiments of the present invention, or the first to the fourth possible implementations of the tenth aspect, in a fifth possible implementation of the tenth aspect of the embodiments of the present invention, before the detecting whether each user equipment (UE) in an acknowledgement group transmits data, to obtain a detection result, the processor is further configured to invoke the program stored in the memory, to perform the following step:

controlling the output apparatus to send, to each user equipment (UE) in the acknowledgement group, configuration information included in the data stored in the memory, where the configuration information indicates the acknowledgement group to which each UE belongs, a quantity of UE for which the base station presets a feedback in the acknowledgement group, and an index number corresponding to each UE in the acknowledgement group.

An eleventh aspect of the embodiments of the present invention discloses user equipment (UE), including a processor, a memory, an output apparatus, an input apparatus, and a communications bus, where the memory is configured to store a program and data;

the communications bus is configured to establish connections and communication between the processor, the memory, the output apparatus, and the input apparatus; and the processor is configured to invoke the program stored in the memory, to perform the following steps:

controlling, after controlling the output apparatus to send data to a base station, the input apparatus to receive a first-level acknowledgement indication message that is fed back by the base station, where the first-level acknowledgement indication message indicates a flag bit status corresponding to each UE in an acknowledgement group to which the UE belongs, the flag bit status includes a first state or a second state, the first state indicates that the base station finds data, the second state indicates that the base station does not find data, and the acknowledgement group includes each UE whose data is to be detected by the base station; and parsing a flag bit status corresponding to the UE in the acknowledgement group from the first-level acknowledgement indication message.

With reference to the eleventh aspect of the embodiments of the present invention, in a first possible implementation of the eleventh aspect of the embodiments of the present invention, a data length of the first-level acknowledgement indication message is determined by a quantity of the UE in the acknowledgement group.

With reference to the eleventh aspect of the embodiments of the present invention or the first possible implementation of the eleventh aspect, in a second possible implementation of the eleventh aspect of the embodiments of the present invention, the processor is further configured to invoke the program stored in the memory, to perform the following steps:

when it is learned, by means of parsing, that the flag bit status corresponding to the UE in the acknowledgement group is the first state, controlling the input apparatus to receive a second-level acknowledgement indication message that is fed back by the base station, where the second-level acknowledgement indication message indicates a type of acknowledgement feedback information corresponding to data sent by target UE, the target UE is all UE that are in the acknowledgement group and whose flag bit statuses are the first state, the type of the acknowledgement feedback information includes a first type or a second type, the first type indicates that data check performed by the base station succeeds, and the second type indicates that the data check performed by the base station fails; and parsing, from the second-level acknowledgement indication message, a type of acknowledgement feedback information corresponding to the data sent by the output apparatus.

With reference to the second possible implementation of the eleventh aspect of the embodiments of the present invention, in a third possible implementation of the eleventh aspect of the embodiments of the present invention, a data length of the second-level acknowledgement indication message is determined by a quantity of the target UE.

With reference to the second or the third possible implementation of the eleventh aspect of the embodiments of the present invention, in a fourth possible implementation of the eleventh aspect of the embodiments of the present invention, a manner in which the processor parses, from the second-level acknowledgement indication message, the type of the acknowledgement feedback information corresponding to the data sent by the output apparatus is specifically:

collecting statistics about the quantity of the target UE;

determining a location of the UE in the target UE, where a location of the UE in the second-level acknowledgement indication message is determined by the location of the UE in the target UE; and parsing, on the location of the UE in the second-level acknowledgement indication message, the type of the acknowledgement feedback information corresponding to the data sent by the output apparatus.

With reference to any one of the second to the fourth possible implementations of the eleventh aspect of the embodiments of the present invention, in a fifth possible implementation of the eleventh aspect of the embodiments of the present invention, when the second-level acknowledgement indication message indicates that a type of acknowledgement feedback information corresponding to data transmitted by at least one target UE is the second type, the second-level acknowledgement indication message further indicates a check failure status corresponding to the data sent by the at least one target UE, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to any one of the second to the fifth possible implementations of the eleventh aspect of the embodiments of the present invention, in a sixth possible implementation of the eleventh aspect of the embodiments of the present invention, the processor is further configured to invoke the program stored in the memory, to perform the following step:

when it is learned, by means of parsing, that the type of the acknowledgement feedback information corresponding to the data sent by the output apparatus is the first type, determining that check performed by the base station on the data sent by the output apparatus succeeds.

With reference to any one of the second to the fifth possible implementations of the eleventh aspect of the embodiments of the present invention, in a seventh possible implementation of the eleventh aspect of the embodiments of the present invention, the processor is further configured to invoke the program stored in the memory, to perform the following step:

when it is learned, by means of parsing, that the type of the acknowledgement feedback information corresponding to the data sent by the output apparatus is the second type, determining that check performed by the base station on the data sent by the output apparatus fails.

With reference to the fifth possible implementation of the eleventh aspect of the embodiments of the present invention, in an eighth possible implementation of the eleventh aspect of the embodiments of the present invention, the processor is further configured to invoke the program stored in the memory, to perform the following step:

when it is learned, by means of parsing, that the type of the acknowledgement feedback information corresponding to the data sent by the output apparatus is the second type, parsing, from the second-level acknowledgement indication message, a check failure status corresponding to the data sent by the output apparatus.

With reference to the eighth possible implementation of the eleventh aspect of the embodiments of the present invention, in a ninth possible implementation of the eleventh aspect of the embodiments of the present invention, the processor is further configured to invoke the program stored in the memory, to perform the following step:

when it is learned, by means of parsing, that the check failure status corresponding to the data sent by the output apparatus is the third state, determining that check performed by the base station on the data sent by the output apparatus fails due to the conflict that is caused by the low uplink multi-user matching degree.

With reference to the eighth possible implementation of the eleventh aspect of the embodiments of the present invention, in a tenth possible implementation of the eleventh aspect of the embodiments of the present invention, the processor is further configured to invoke the program stored in the memory, to perform the following step:

when it is learned, by means of parsing, that the check failure status corresponding to the data sent by the output apparatus is the fourth state, determining that check performed by the base station on the data sent by the output apparatus fails due to the poor data transmission channel quality.

With reference to the eleventh aspect of the embodiments of the present invention or the first possible implementation of the eleventh aspect, in an eleventh possible implementation of the eleventh aspect of the embodiments of the present invention, the processor is further configured to invoke the program stored in the memory, to perform the following step:

when it is learned, by means of parsing, that the flag bit status corresponding to the UE in the acknowledgement group is the second state, determining that the base station does not find the data sent by the output apparatus.

With reference to any one of the eleventh aspect of the embodiments of the present invention, or the first to the eleventh possible implementations of the eleventh aspect, in a twelfth possible implementation of the eleventh aspect of the embodiments of the present invention, before the controlling, after controlling the output apparatus to send data to a base station, the input apparatus to receive a first-level acknowledgement indication message that is fed back by the base station, the processor is further configured to invoke the program stored in the memory, to perform the following step:

controlling the input apparatus to receive configuration information sent by the base station, where the configuration information indicates the acknowledgement group to which the UE belongs, the quantity of the UE in the acknowledgement group, and a flag bit corresponding to the UE in the acknowledgement group.

A twelfth aspect of the embodiments of the present invention discloses user equipment (UE), including a processor, a memory, an output apparatus, an input apparatus, and a communications bus, where the memory is configured to store a program and data;

the communications bus is configured to establish connections and communication between the processor, the memory, the output apparatus, and the input apparatus; and the processor is configured to invoke the program stored in the memory, to perform the following steps:

controlling, after controlling the output apparatus to send data to a base station, the input apparatus to receive an acknowledgement indication message that is fed back by the base station, where the acknowledgement indication message indicates an index number corresponding to target UE in an acknowledgement group to which the UE belongs, the target UE is at least one UE whose data is found by the base station in the acknowledgement group, the index number is a number of the target UE in the acknowledgement group, different target UE in the acknowledgement group correspond to different index numbers, and the acknowledgement group includes each UE whose data is to be detected by the base station; and parsing the acknowledgement indication message, to detect whether there is an index number corresponding to the UE in the acknowledgement indication message.

With reference to the twelfth aspect of the embodiments of the present invention, in a first possible implementation of the twelfth aspect of the embodiments of the present invention, the acknowledgement indication message further indicates a flag bit of the index number corresponding to the target UE, and the processor is further configured to invoke the program stored in the memory, to perform the following step:

when it is learned, by means of parsing, that there is the index number corresponding to the UE in the acknowledgement indication message, parsing a flag bit status of the index number corresponding to the UE, where the flag bit status of the index number includes a first state or a second state, the first state indicates that data check performed by the base station succeeds, and the second state indicates that the data check performed by the base station fails.

With reference to the first possible implementation of the twelfth aspect of the embodiments of the present invention, in a second possible implementation of the twelfth aspect of the embodiments of the present invention, when the acknowledgement indication message indicates that there is target UE corresponding to an index number whose flag bit status is the second state, the acknowledgement indication message further indicates a check failure status corresponding to data sent by the target UE corresponding to the index number whose flag bit status is the second state, the check failure status includes a third state or a fourth state, the third state indicates that a data check failure is caused by a conflict that is caused by a low uplink multi-user matching degree, and the fourth state indicates that the data check failure is caused by poor data transmission channel quality.

With reference to the first or the second possible implementation of the twelfth aspect of the embodiments of the present invention, in a third possible implementation of the twelfth aspect of the embodiments of the present invention, the processor is further configured to invoke the program stored in the memory, to perform the following step:

when it is learned, by means of parsing, that the flag bit status of the index number corresponding to the UE is the first state, determining that check performed by the base station on the data sent by the output apparatus succeeds.

With reference to the first or the second possible implementation of the twelfth aspect of the embodiments of the present invention, in a fourth possible implementation of the twelfth aspect of the embodiments of the present invention, the processor is further configured to invoke the program stored in the memory, to perform the following step:

when it is learned, by means of parsing, that the flag bit status of the index number corresponding to the UE is the second state, determining that check performed by the base station on the data sent by the output apparatus fails.

With reference to the second possible implementation of the twelfth aspect of the embodiments of the present invention, in a fifth possible implementation of the twelfth aspect of the embodiments of the present invention, the processor is further configured to invoke the program stored in the memory, to perform the following step:

when it is learned, by means of parsing, that the flag bit status of the index number corresponding to the UE is the second state, parsing, from the acknowledgement indication message, a check failure status corresponding to the data sent by the output apparatus.

With reference to the fifth possible implementation of the twelfth aspect of the embodiments of the present invention, in a sixth possible implementation of the twelfth aspect of the embodiments of the present invention, the processor is further configured to invoke the program stored in the memory, to perform the following step:

when it is learned, by means of parsing, that the check failure status corresponding to the data sent by the output apparatus is the third state, determining that check performed by the base station on the data sent by the output apparatus fails due to the conflict that is caused by the low uplink multi-user matching degree.

With reference to the fifth possible implementation of the twelfth aspect of the embodiments of the present invention, in a seventh possible implementation of the twelfth aspect of the embodiments of the present invention, the processor is further configured to invoke the program stored in the memory, to perform the following step:

when it is learned, by means of parsing, that the check failure status corresponding to the data sent by the output apparatus is the fourth state, determining that check performed by the base station on the data sent by the output apparatus fails due to the poor data transmission channel quality.

With reference to the twelfth aspect of the embodiments of the present invention, in an eighth possible implementation of the twelfth aspect of the embodiments of the present invention, the processor is further configured to invoke the program stored in the memory, to perform the following step:

when it is learned, by means of parsing, that there is no index number corresponding to the UE in the acknowledgement indication message, determining that the base station does not find the data sent by the output apparatus.

With reference to any one of the twelfth aspect of the embodiments of the present invention, or the first to the eighth possible implementations of the twelfth aspect, in a ninth possible implementation of the twelfth aspect of the embodiments of the present invention, a data length of the acknowledgement indication message is a preset data length, and a quantity of index numbers that are indicated by the acknowledgement indication message and that are corresponding to target UE in the acknowledgement group to which the UE belongs does not exceed the preset data length.

With reference to any one of the twelfth aspect of the embodiments of the present invention, or the first to the ninth possible implementations of the twelfth aspect, in a tenth possible implementation of the twelfth aspect of the embodiments of the present invention, before the controlling, after controlling the output apparatus to send data to a base station, the input apparatus to receive an acknowledgement indication message that is fed back by the base station, the processor is further configured to invoke the program stored in the memory, to perform the following step:

controlling the input apparatus to receive configuration information sent by the base station, where the configuration information indicates the acknowledgement group to which the UE belongs, a quantity of UE for which the base station presets a feedback in the acknowledgement group, and the index number corresponding to the UE in the acknowledgement group.

In the embodiments of the present invention, in an uplink data transmission mode based on contention transmission, the base station may detect whether each UE in the acknowledgement group transmits data, to obtain the detection result, and generate the first-level acknowledgement indication message according to the detection result. The first-level acknowledgement indication message indicates the flag bit status corresponding to each UE in the acknowledgement group, the flag bit status corresponding to each UE includes the first state or the second state, the first state indicates that the base station finds the data transmitted by the UE, and the second state indicates that the base station does not find the data transmitted by the UE. The base station may send the first-level acknowledgement indication message, so that the UE can receive the first-level acknowledgement indication message, parse the flag bit status corresponding to the UE from the first-level acknowledgement indication message, and learn, according to a result of the parsing, whether the data sent by the UE is found by the base station. It may be learned that, according to the embodiments of the present invention, the base station can simultaneously feed back an acknowledgement indication message to a plurality of UE in an acknowledgement group, so that the UE learns, in time, whether data transmitted by the UE is found by the base station. In this way, a problem that the UE has transmitted data but the base station misses detecting the data and does not feed back an acknowledgement indication message can be resolved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without undue experiment.

FIG. 8 is a schematic diagram of an index-based acknowledgement indication message according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without undue experiment shall fall within the protection scope of the present invention.

The embodiments of the present invention provide an acknowledgement indication method for data transmission and a related device, so that an acknowledgement indication message can be simultaneously fed back to a plurality of UE in an acknowledgement group, and the UE can learn, in time, whether data transmitted by the UE is found by a base station. In this way, a problem that the UE has transmitted data but the base station misses detecting the data and does not feed back an acknowledgement indication message can be resolved. Details are separately described below.

Figure 1:
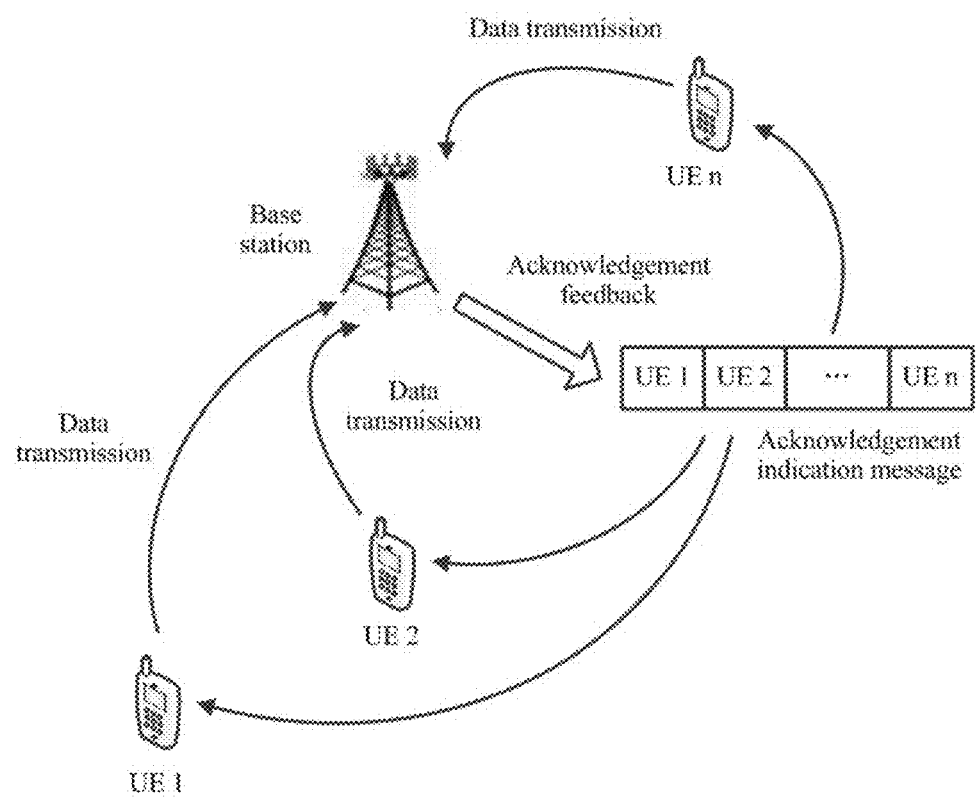
FIG. 1 is a schematic diagram of a network architecture according to an embodiment of the present invention.

For better understanding of the acknowledgement indication method for data transmission and the related device disclosed in the embodiments of the present invention, a network architecture to which the embodiments of the present invention are applicable is first described below. Referring to FIG. 1, FIG. 1 is a schematic diagram of a network architecture according to an embodiment of the present invention. The network architecture shown in FIG. 1 may include a base station and a plurality of user equipments (UE). The base station may be communicatively connected to the plurality of UE by using a wireless local area network (WLAN). In the network architecture shown in FIG. 1, the UE may include a mobile phone, a tablet computer, a palmtop computer, a personal digital assistant (PDA), a mobile Internet device (MID), a wearable device (such as a smartwatch or a smart band), or the like. This is not limited in the embodiments of the present invention.

In the network architecture shown in FIG. 1, the base station can allow simultaneous access of the plurality of UE, and the base station may allocate transport channels to the plurality of accessed UE. UE to which a transport channel is allocated transmits uplink data to the base station on the corresponding transport channel of the UE. In addition, the base station may not allocate any transport channel to some accessed UE, and there is an idle channel that has not been allocated to any UE. The UE to which no transport channel is allocated may transmit, by means of contention, data to the base station on the idle channel that has not been allocated to any UE. In the network architecture shown in FIG. 1, the plurality of user equipments, that is, UE 1, UE 2, . . . , and UE n may transmit uplink data to the base station on respective corresponding transport channels, where n is a positive integer greater than 0. The base station may detect the data, and feed back an acknowledgement indication message to the UE, so that the UE learns, in time, whether data transmitted by the UE is found by the base station. The base station may group the accessed UE, to group the plurality of UE into several acknowledgement groups. For each acknowledgement group, the base station may detect data transmitted by UE in the acknowledgement group, and simultaneously feed back an acknowledgement indication message to UE in the acknowledgement group. Herein, the UE 1, the UE 2, . . . , and the UE n may be considered as UE in a same acknowledgement group. The base station detects data in this acknowledgement group, and may simultaneously feed back an acknowledgement indication message to the UE 1, the UE 2, . . . , and the UE n by using a bitmap or an index, and the UE in the acknowledgement group may receive and parse the acknowledgement indication message. According to the network architecture shown in FIG. 1, the base station can simultaneously feed back an acknowledgement indication message to a plurality of UE in an acknowledgement group, so that the UE learns, in time, whether data transmitted by the UE is found by the base station. In this way, a problem that the UE has transmitted data but the base station misses detecting the data and does not feed back an acknowledgement indication message can be resolved.

Figure 2:
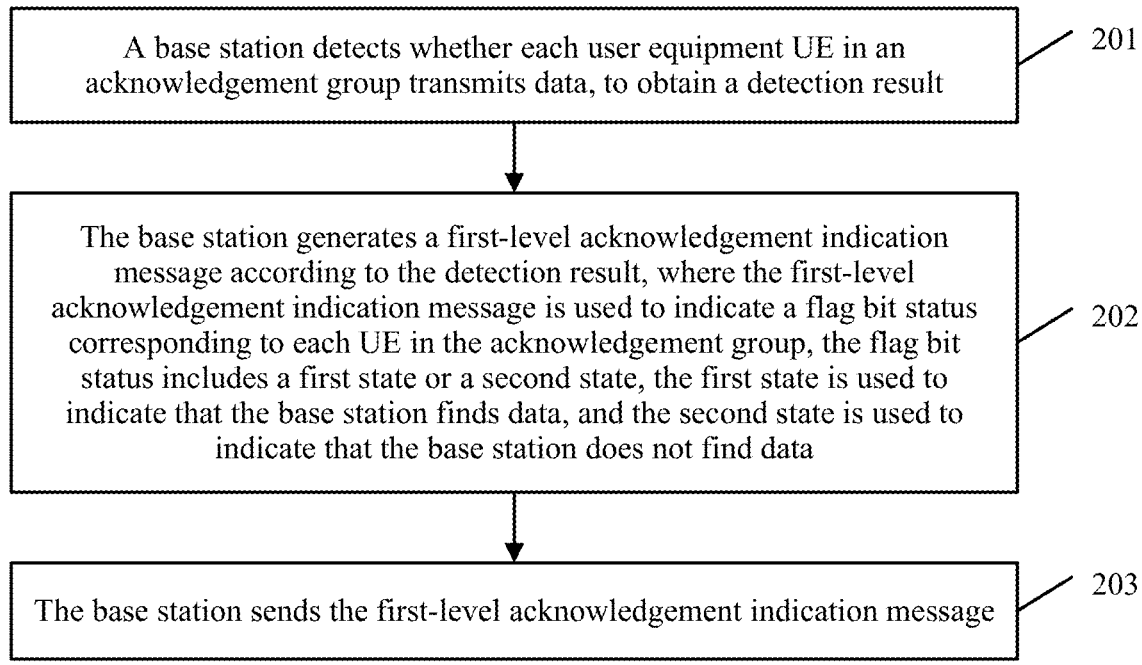
FIG. 2 is a schematic flowchart of an acknowledgement indication method for data transmission according to an embodiment of the present invention.

Based on the network architecture shown in FIG. 1, an embodiment of the present invention provides an acknowledgement indication method for data transmission. Referring to FIG. 2, FIG. 2 is a schematic flowchart of an acknowledgement indication method for data transmission according to an embodiment of the present invention. In the method described in FIG. 2, an acknowledgement indication message is simultaneously fed back to a plurality of UE in a bitmap indication manner. As shown in FIG. 2, the acknowledgement indication method for data transmission may include the following steps.

201. A base station detects whether each user equipment (UE) in an acknowledgement group transmits data, to obtain a detection result.

In this embodiment of the present invention, the base station may group a plurality of accessed UE, to group the plurality of UE into several acknowledgement groups, so that the base station can perform joint processing on UE in the group. One acknowledgement group includes each UE whose data is to be detected by the base station, that is, the base station can perform data detection on each UE included in the acknowledgement group. For each acknowledgement group, the base station may detect, in real time, whether each UE in the acknowledgement group transmits data, to obtain a detection result, or the base station may detect, at intervals of preset time, whether each UE in the acknowledgement group transmits data, to obtain a detection result. This is not limited in this embodiment of the present invention.

In this embodiment of the present invention, the base station mainly detects uplink data that is transmitted by means of contention, that is, may perform blind detection on data transmitted by UE that is in the acknowledgement group and in a contention transmission area, to obtain a detection result.

In some embodiments, when the base station simultaneously feeds back an acknowledgement indication message to a plurality of UE by using a bitmap, before the base station performs step 201 of detecting whether each user equipment (UE) in the acknowledgement group transmits data, to obtain the detection result, the method described in FIG. 2 may further include the following step:

(21). The base station sends configuration information to each user equipment (UE) in the acknowledgement group, where the configuration information indicates the acknowledgement group to which each UE belongs, a quantity of UE in the acknowledgement group, and a flag bit corresponding to each UE in the acknowledgement group.

Figure 3:
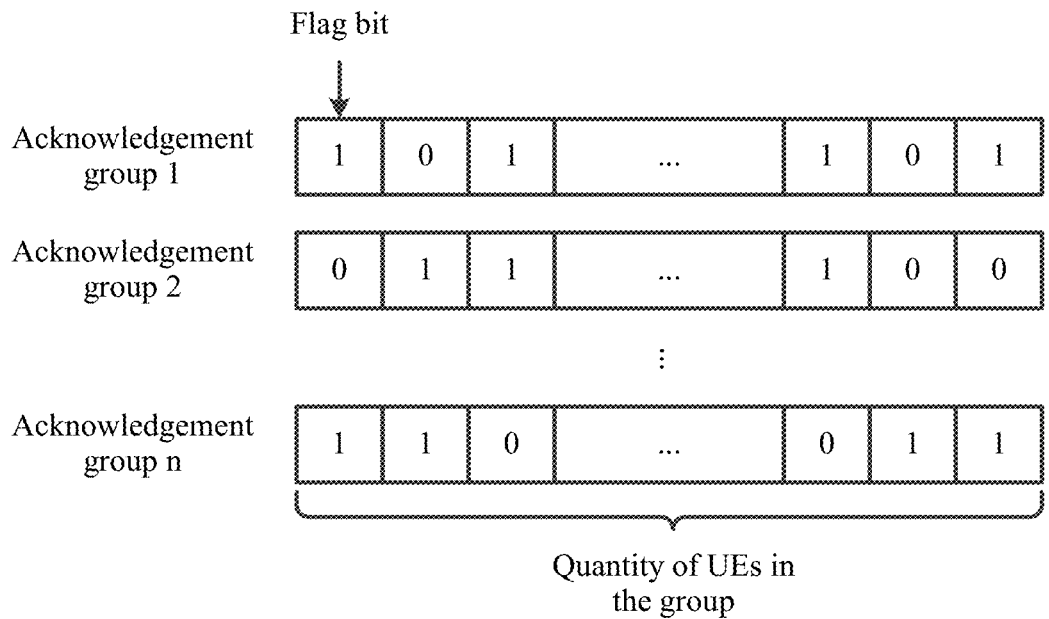
FIG. 3 is a schematic diagram of initial configuration of a bitmap-based acknowledgement indication according to an embodiment of the present invention.

In this implementation, referring to FIG. 3, FIG. 3 is a schematic diagram of initial configuration of a bitmap-based acknowledgement indication according to an embodiment of the present invention. As shown in FIG. 3, the base station may group accessed UE into an acknowledgement group 1, an acknowledgement group 2, ..., and an acknowledgement group n, and each acknowledgement group includes several UE, where n is a positive integer greater than 0. The acknowledgement groups may have a same quantity of UE or different quantities of UE, and each UE has a corresponding flag bit in an acknowledgement group to which the UE belongs, that is, a location of the UE in the acknowledgement group to which the UE belongs.

In this implementation, when UE accesses the base station, the base station may configure, for the UE, configuration information related to an uplink data acknowledgement, and send the configuration information to the UE. The configuration information may include cell-specific configuration information (not shown in FIG. 3) and UE-specific configuration information (as shown in FIG. 3). The cell-specific configuration information may be used to indicate a cell ID (that is, a cell identity) and a cell SRS (Sounding Reference Signal, sounding reference signal) of a cell in which the UE is located, a sending period of the cell SRS, an offset in the period, and the like, and the cell-specific configuration information is the same for all UE in a same cell. In addition to the acknowledgement group to which the UE belongs, the quantity of UE in the acknowledgement group, and the flag bit corresponding to the UE in the acknowledgement group, the UE-specific configuration information may be used to indicate a Cell Radio Network Temporary Identifier (C-RNTI), that is, a dynamic identifier allocated by the base station to the UE. Different UE have different UE-specific configuration information.

202. The base station generates a first-level acknowledgement indication message according to the detection result, where the first-level acknowledgement indication message indicates a flag bit status corresponding to each UE in the acknowledgement group, the flag bit status includes a first state or a second state, the first state indicates that the base station finds data, and the second state indicates that the base station does not find data.

In this embodiment of the present invention, the base station may generate the first-level acknowledgement indication message according to the detection result obtained by detecting whether the UE in the acknowledgement group transmits data. The first-level acknowledgement indication message may be used to indicate the flag bit status corresponding to each UE in the acknowledgement group, the flag bit status corresponding to each UE may include the first state or the second state, the first state indicates that the base station finds the data transmitted by the UE, and the second state indicates that the base station does not find the data transmitted by the UE.

In this embodiment of the present invention, the flag bit status may be represented by one bit, and 0 and 1 separately represent the two states. For example, 1 represents the first state, that is, the base station finds data; 0 represents the second state, that is, the base station does not find data. When the base station finds, in the acknowledgement group, data transmitted by specific UE, the base station sets a flag bit corresponding to the UE in the first-level acknowledgement indication message to 1. When the base station does not find, in the acknowledgement group, data transmitted by specific UE, the base station resets a flag bit corresponding to the UE in the first-level acknowledgement indication message to 0. In addition, alternatively, 0 may be used to represent the first state, and 1 may be used to represent the second state. This is not limited in this embodiment of the present invention.

In this embodiment of the present invention, a data length of the first-level acknowledgement indication message may be determined by the quantity of UE in the acknowledgement group. For example, when one UE is represented by one bit, and the acknowledgement group includes ten UE in total, the data length of the first-level acknowledgement indication message is 10 bits; when one UE is represented by two bits, the data length of the first-level acknowledgement indication message is 20 bits.

203. The base station sends the first-level acknowledgement indication message.

In this embodiment of the present invention, the base station may send the first-level acknowledgement indication message by means of broadcasting, so that UE that is in the acknowledgement group and that has transmitted data can receive the first-level acknowledgement indication message.

In an optional implementation, a specific implementation of step 203 in which the base station sends the first-level acknowledgement indication message may include:

sending, by the base station, the first-level acknowledgement indication message on a first acknowledgement resource corresponding to the acknowledgement group.

In this implementation, the first acknowledgement resource corresponding to the acknowledgement group may include but is not limited to a Physical Downlink Control Channel (PDCCH) or a Physical Downlink Shared Channel (PDSCH). Each acknowledgement group has a corresponding acknowledgement resource, and different acknowledgement groups correspond to different acknowledgement resources.

In this implementation, the base station sends the first-level acknowledgement indication message on the first acknowledgement resource corresponding to the acknowledgement group, and the UE in the acknowledgement group can receive the first-level acknowledgement indication message, and parse the flag bit status corresponding to the UE from the first-level acknowledgement indication message according to the configuration information sent by the base station, to determine whether the data transmitted by the UE is undetected.

In the method described in FIG. 2, the base station may detect whether each UE in the acknowledgement group transmits data, to obtain the detection result, and generate the first-level acknowledgement indication message according to the detection result. The first-level acknowledgement indication message indicates the flag bit status corresponding to each UE in the acknowledgement group, the flag bit status corresponding to each UE includes the first state or the second state, the first state indicates that the base station finds the data transmitted by the UE, and the second state indicates that the base station does not find the data transmitted by the UE. The base station may send the first-level acknowledgement indication message, so that the UE can receive the first-level acknowledgement indication message, parse the flag bit status corresponding to the UE from the first-level acknowledgement indication message, and learn, according to a result of the parsing, whether the data sent by the UE is found by the base station. It may be learned that, according to the method described in FIG. 2, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved.

Figure 4:
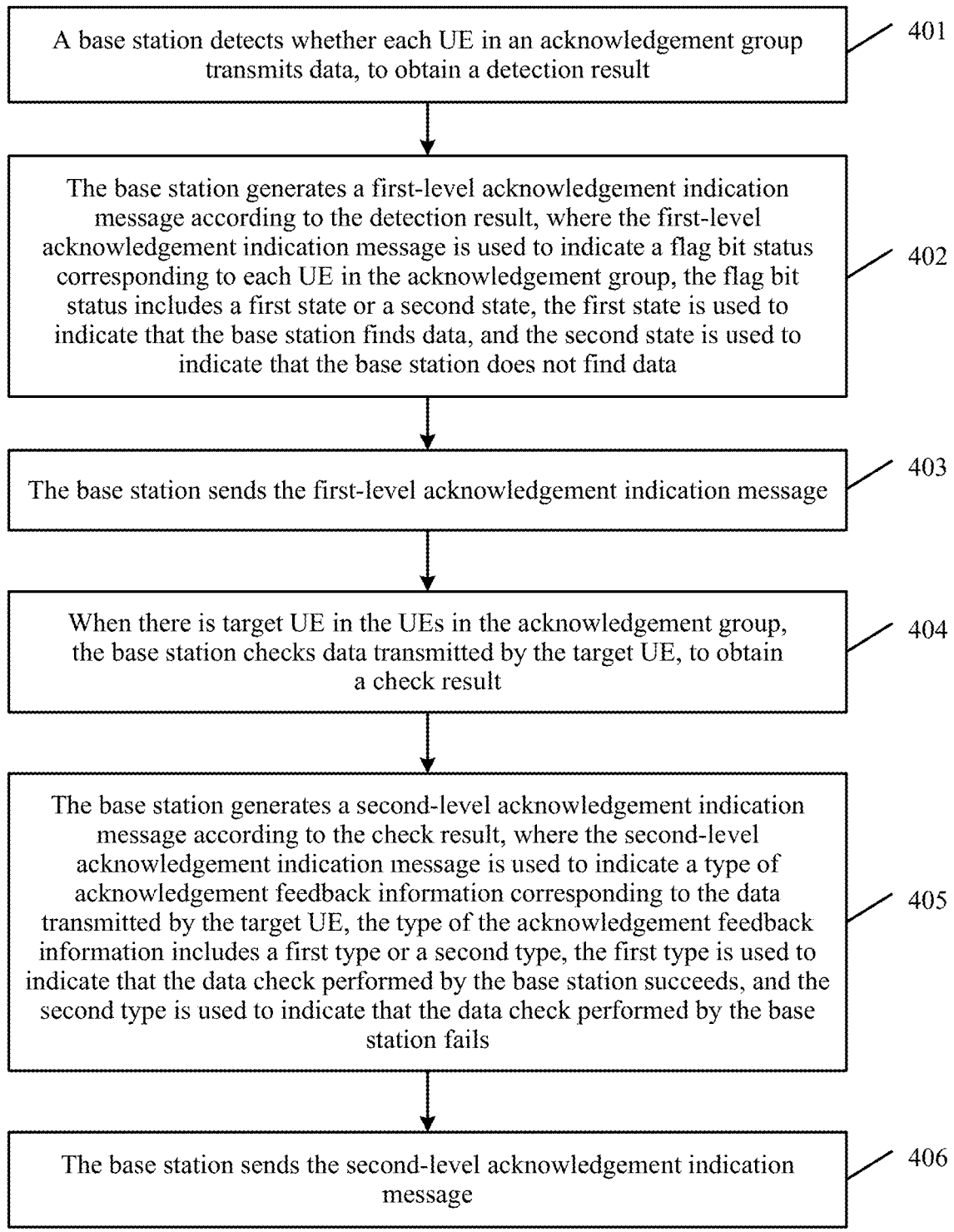
FIG. 4 is a schematic flowchart of another acknowledgement indication method for data transmission according to an embodiment of the present invention.

Based on the network architecture shown in FIG. 1, an embodiment of the present invention provides another acknowledgement indication method for data transmission. Referring to FIG. 4, FIG. 4 is a schematic flowchart of another acknowledgement indication method for data transmission according to an embodiment of the present invention. In the method described in FIG. 4, an acknowledgement indication message is simultaneously fed back to a plurality of UE in a bitmap indication manner. As shown in FIG. 4, the acknowledgement indication method for data transmission may include the following steps.

401. A base station detects whether each user equipment (UE) in an acknowledgement group transmits data, to obtain a detection result.

In this embodiment of the present invention, the base station needs to establish a communicative connection to each UE in the acknowledgement group. The acknowledgement group includes each UE whose data is to be detected by the base station.

In an optional implementation, before step 401, the method described in FIG. 4 may further include the following step:

(41). The base station sends configuration information to each user equipment (UE) in the acknowledgement group, where the configuration information indicates the acknowledgement group to which each UE belongs, a quantity of UE in the acknowledgement group, and a flag bit corresponding to each UE in the acknowledgement group.

402. The base station generates a first-level acknowledgement indication message according to the detection result, where the first-level acknowledgement indication message indicates a flag bit status corresponding to each UE in the acknowledgement group, the flag bit status includes a first state or a second state, the first state indicates that the base station finds data, and the second state indicates that the base station does not find data.

In this embodiment of the present invention, a data length of the first-level acknowledgement indication message is determined by the quantity of UE in the acknowledgement group.

403. The base station sends the first-level acknowledgement indication message.

In an optional implementation, a specific implementation of step 403 in which the base station sends the first-level acknowledgement indication message includes:

sending, by the base station, the first-level acknowledgement indication message on a first acknowledgement resource corresponding to the acknowledgement group.

404. When there is target UE in the UE in the acknowledgement group, the base station checks data transmitted by the target UE, to obtain a check result.

In this embodiment of the present invention, the target UE is all UE whose flag bit statuses are the first state, that is, UE whose data is found by the base station. The base station may check data transmitted by all target UE whose data is found, to obtain the check result.

405. The base station generates a second-level acknowledgement indication message according to the check result, where the second-level acknowledgement indication message indicates a type of acknowledgement feedback information corresponding to the data transmitted by the target UE, the type of the acknowledgement feedback information includes a first type or a second type, the first type indicates that the data check performed by the base station succeeds, and the second type indicates that the data check performed by the base station fails.

In this embodiment of the present invention, the base station may generate the second-level acknowledgement indication message according to the check result obtained by checking the data transmitted by all the target UE. The second-level acknowledgement indication message may be used to indicate the type of the acknowledgement feedback information corresponding to the data transmitted by the target UE, and a type of acknowledgement feedback information corresponding to each target UE may include the first type or the second type. The first type indicates that check performed by the base station on data transmitted by the target UE succeeds, and the second type indicates that the check performed by the base station on the data transmitted by the target UE fails.

In this embodiment of the present invention, the type of the acknowledgement feedback information may be represented by one bit, and 0 and 1 separately represent the two types. For example, 1 represents the first type, that is, data check performed by the base station succeeds; 0 represents the second type, that is, data check performed by the base station fails. When check performed by the base station on data transmitted by specific target UE succeeds, the base station sets a location corresponding to the target UE in the second-level acknowledgement indication message to 1, which may be considered as feeding back, by the base station, an acknowledgement to the target UE. When check performed by the base station on data transmitted by specific target UE fails, the base station resets a location corresponding to the target UE in the second-level acknowledgement indication message to 0, which may be considered as feeding back, by the base station, a negative acknowledgement to the target UE. In addition, alternatively, 0 may be used to represent the first type, and 1 may be used to indicate the second type. This is not limited in this embodiment of the present invention.

In this embodiment of the present invention, a data length of the second-level acknowledgement indication message is determined by a quantity of the target UE that are in the acknowledgement group and whose flag bit statuses are the first state. For example, when one target UE is represented by one bit, and there are five target UE, the data length of the second-level acknowledgement indication message is 5 bits; when one target UE is represented by two bits, the data length of the second-level acknowledgement indication message is 10 bits. The base station may determine, according to a location of each target UE in the acknowledgement group, a location corresponding to each target UE in the second-level acknowledgement indication message by collecting statistics about the quantity of the target UE that are in the acknowledgement group and whose flag bit statuses are the first state.

Figure 5:
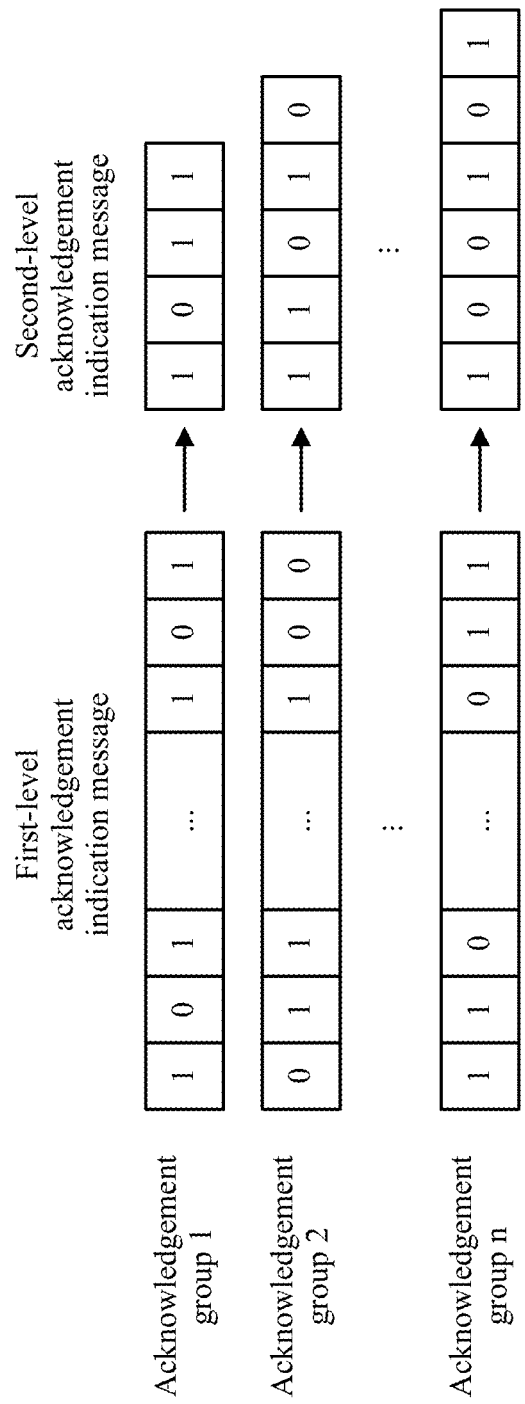
FIG. 5 is a schematic diagram of a bitmap-based acknowledgement indication message according to an embodiment of the present invention.

Referring to FIG. 5, FIG. 5 is a schematic diagram of a bitmap-based acknowledgement indication message according to an embodiment of the present invention. As shown in FIG. 5, the base station first generates a first-level acknowledgement indication message for each acknowledgement group. Each UE is represented by one bit, 1 represents that the base station finds data transmitted by the UE, 0 represents that the base station does not find the data transmitted by the UE, and a data length of the first-level acknowledgement indication message is determined by a quantity of UE in the acknowledgement group. For example, when there are ten UE in the acknowledgement group, the data length of the first-level acknowledgement indication message is 10 bits. The base station may obtain all target UE that are in the first-level acknowledgement indication message and whose flag bit statuses are the first state (that is, the flag bit statuses are 1), and check data transmitted by these target UE, to generate a second-level acknowledgement indication message. As shown in FIG. 5, each target UE may be represented by one bit in the second-level acknowledgement indication message. A data length of a second-level acknowledgement indication message corresponding to an acknowledgement group 1 is 4 bits (that is, there are four target UE), a data length of a second-level acknowledgement indication message corresponding to an acknowledgement group 2 is 5 bits (that is, there are five target UE), and a data length of a second-level acknowledgement indication message corresponding to an acknowledgement group n is 6 bits (that is, there are six target UE). In the second-level acknowledgement indication message, 1 represents that check performed by the base station on the data transmitted by the target UE succeeds, and 0 represents that the check performed by the base station on the data transmitted by the target UE fails.

In an optional implementation, when the second-level acknowledgement indication message indicates that a type of acknowledgement feedback information corresponding to data transmitted by at least one target UE is the second type, that is, check performed by the base station on the data transmitted by the at least one target UE fails, the second-level acknowledgement indication message may be further used to indicate a check failure status corresponding to the data transmitted by the at least one target UE. The check failure status includes a third state or a fourth state, the third state indicates that a data check failure is caused by a conflict that is caused by a low uplink multi-user matching degree, and the fourth state indicates that the data check failure is caused by poor data transmission channel quality.

In this implementation, the check failure status may be considered as a reason for the data check failure. In this case, each target UE may be represented by two bits in the second-level acknowledgement indication message. One bit indicates whether check performed by the base station on data transmitted by the target UE succeeds, for example, 1 represents that the check succeeds, and 0 represents that the check fails. The other bit indicates a reason why the check performed by the base station on the data transmitted by the target UE fails, for example, 1 represents that the data check failure is caused by the conflict that is caused by the low uplink multi-user matching degree, and 0 represents that the data check failure is caused by the poor data transmission channel quality. In this case, the data length of the second-level acknowledgement indication message is twice the data length that is obtained when one target UE is represented by one bit. For example, when one target UE is represented by one bit, and there are five target UE, the data length of the second-level acknowledgement indication message is 5 bits; when one target UE is represented by two bits, the data length of the second-level acknowledgement indication message is 10 bits. When check performed by the base station on data transmitted by specific target UE succeeds, a bit used to indicate a data check failure status may be represented by an invalid character Invalid or a null character Null, or may be represented in another specified manner. This is not limited in this implementation. According to this implementation, the UE can know a reason why the check performed by the base station on the data transmitted by the UE fails, so that communication between the base station and the UE is more transparent.

406. The base station sends the second-level acknowledgement indication message.

In an optional implementation, a specific implementation of step 406 in which the base station sends the second-level acknowledgement indication message may include:

sending, by the base station, the second-level acknowledgement indication message on a second acknowledgement resource corresponding to the acknowledgement group.

In this implementation, the first acknowledgement resource used for sending the first-level acknowledgement indication message and the second acknowledgement resource used for sending the second-level acknowledgement indication message may be different acknowledgement resources. When the base station sends the first-level acknowledgement indication message on a PDCCH corresponding to the acknowledgement group, the base station may also send the second-level acknowledgement indication message on the PDCCH corresponding to the acknowledgement group. In this case, the first-level acknowledgement indication message and the second-level acknowledgement indication message are sent on different frequency-domain resources on the PDCCH, that is, are sent on different frequency-domain sub-channels of the PDCCH. Likewise, when the base station sends the first-level acknowledgement indication message on a PDSCH corresponding to the acknowledgement group, the base station may also send the second-level acknowledgement indication message on the PDSCH corresponding to the acknowledgement group. In this case, the first-level acknowledgement indication message and the second-level acknowledgement indication message are sent on different frequency-domain resources on the PDSCH, that is, are sent on different frequency-domain sub-channels of the PDSCH.

In an optional implementation, when flag bit statuses corresponding to all UE in the acknowledgement group are the second state, that is, when the base station finds data transmitted by neither of all the UE in the acknowledgement group, the base station does not need to perform a data check operation, that is, does not need to perform steps 404 to 406, and needs to send only the first-level acknowledgement indication message.

According to the method described in FIG. 4, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved. In addition, when an acknowledgement message is fed back by using a bitmap, feedback may be performed by using indications of two levels, so that a data check result can be indicated in addition to a data detection result, and the UE can learn, in time, whether check performed by the base station on the data transmitted by the UE succeeds.

Figure 6:
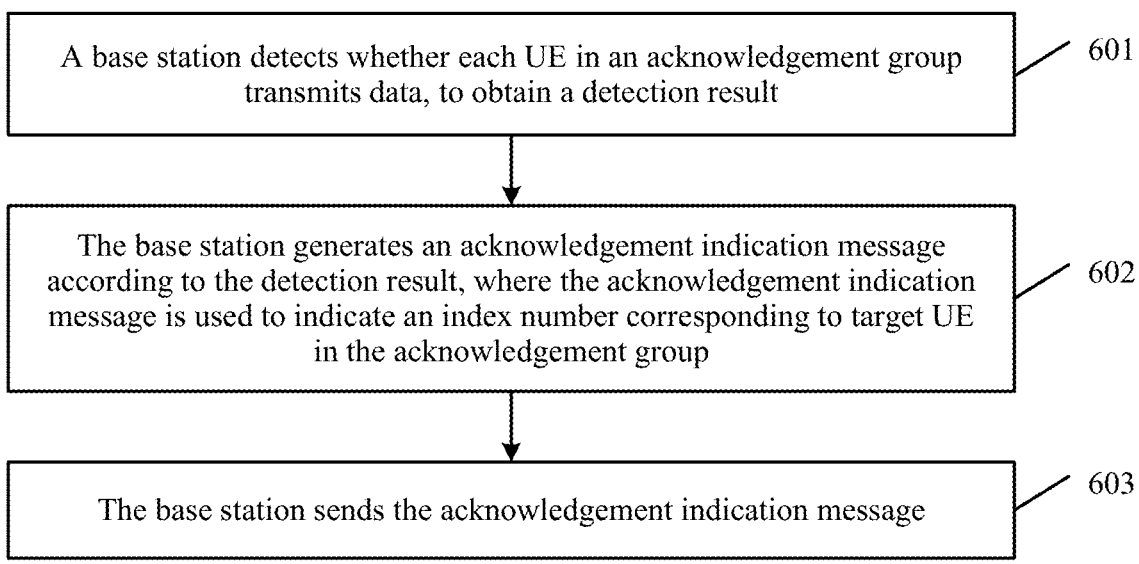
FIG. 6 is a schematic flowchart of still another acknowledgement indication method for data transmission according to an embodiment of the present invention.

Based on the network architecture shown in FIG. 1, an embodiment of the present invention provides still another acknowledgement indication method for data transmission. Referring to FIG. 6, FIG. 6 is a schematic flowchart of still another acknowledgement indication method for data transmission according to an embodiment of the present invention. In the method described in FIG. 6, an acknowledgement indication message is simultaneously fed back to a plurality of UE in an index indication manner. As shown in FIG. 6, the acknowledgement indication method for data transmission may include the following steps.

601. A base station detects whether each UE in an acknowledgement group transmits data, to obtain a detection result.

In this embodiment of the present invention, in an uplink data transmission mode based on contention transmission, the base station may group a plurality of accessed UE, to group the plurality of UE into several acknowledgement groups. One acknowledgement group includes each UE whose data is to be detected by the base station. For each acknowledgement group, the base station may detect, in real time, whether each UE in the acknowledgement group transmits data, to obtain a detection result, or the base station may detect, at intervals of preset time, whether each UE in the acknowledgement group transmits data, to obtain a detection result. This is not limited in this embodiment of the present invention.

In an optional implementation, when the base station simultaneously feeds back an acknowledgement indication message to a plurality of UE by using indexes, before the base station performs step 601, the method described in FIG. 6 may further include the following step.

(61). The base station sends configuration information to each UE in the acknowledgement group, where the configuration information indicates the acknowledgement group to which each UE belongs, a quantity of UE for which the base station presets a feedback in the acknowledgement group, and an index number corresponding to each UE in the acknowledgement group.

In this implementation, when UE accesses the base station, the base station may configure, for the UE, configuration information related to an uplink data acknowledgement, and send the configuration information to the UE. The configuration information may include cell-specific configuration information and UE-specific configuration information. The cell-specific configuration information may be used to indicate a cell ID and a cell SRS of a cell in which the UE is located, a sending period of the cell SRS, an offset in the period, and the like, and the cell-specific configuration information is the same for all UE in a same cell. The UE-specific configuration information may be used to indicate a C-RNTI in addition to the acknowledgement group to which the UE belongs, the quantity of UE for which the base station presets a feedback in the acknowledgement group, and the index number corresponding to the UE in the acknowledgement group. Different UE have different UE-specific configuration information.

In this implementation, the index number corresponding to the UE in the acknowledgement group may be represented by an Arabic numeral 1, 2, 3, or the like, or may be represented by binary 00, 01, 011, or the like, or may be represented by a character A, B, A1, A2, or the like. This is not limited in this embodiment of the present invention.

602. The base station generates an acknowledgement indication message according to the detection result, where the acknowledgement indication message indicates an index number corresponding to target UE in the acknowledgement group.

In this embodiment of the present invention, the base station may generate the acknowledgement indication message according to the detection result obtained by detecting whether the UE in the acknowledgement group transmits data, and the acknowledgement indication message may be used to indicate the index number corresponding to the target UE in the acknowledgement group. The target UE is at least one UE whose data is found by the base station in the acknowledgement group, the index number is a number of the target UE in the acknowledgement group, and different target UE in the acknowledgement group correspond to different index numbers. When the base station finds, in the acknowledgement group, data transmitted by specific target UE, the base station adds an index number corresponding to the target UE to the acknowledgement indication message. When the base station does not find, in the acknowledgement group, data transmitted by specific target UE, the base station does not add an index number corresponding to the target UE to the acknowledgement indication message. When the base station finds, in the acknowledgement group, no data transmitted by the UE, there is no target UE, and an invalid character Invalid or a null character Null may be filled in the acknowledgement indication message.

In this embodiment of the present invention, a data length of the acknowledgement indication message may be a preset data length, that is, the data length of the acknowledgement indication message is configurable, may be preset by the base station, and does not vary with a quantity of the UE in the acknowledgement group. The data length of the acknowledgement indication message may be determined by the quantity, in the configuration information, of UE for which the base station presets a feedback in the acknowledgement group, and a quantity of index numbers included in the acknowledgement indication message usually does not exceed the preset data length. For example, when there are five UE for which the base station presets a feedback in the acknowledgement group, the acknowledgement indication message can include a maximum of five index numbers. When the base station finds data transmitted by more than five target UE, the base station discards an index number corresponding to superfluous target UE. When the base station finds data transmitted by less than five target UE, the base station uses an invalid character Invalid or a null character Null to represent a superfluous location in the acknowledgement indication message. To avoid resource waste, a maximum length that may be configured as the preset data length may be usually determined by the quantity of UE in the acknowledgement group. For example, when one UE is indicated by one bit, and the acknowledgement group includes ten UE, the preset data length may be a maximum of 10 bits; when one UE is indicated by two bits, the preset data length may be a maximum of 20 bits. Data lengths of the acknowledgement indication message that are set by the base station may be different for different acknowledgement groups.

603. The base station sends the acknowledgement indication message.

In this embodiment of the present invention, the base station may send the acknowledgement indication message by means of broadcasting.

In an optional implementation, a specific implementation of step 603 in which the base station sends the acknowledgement indication message may include: sending, by the base station, the acknowledgement indication message on an acknowledgement resource corresponding to the acknowledgement group.

In this implementation, the acknowledgement resource corresponding to the acknowledgement group may include but is not limited a PDCCH or a PDSCH, each acknowledgement group has a corresponding acknowledgement resource, and different acknowledgement groups correspond to different acknowledgement resources.

In this implementation, the base station sends the acknowledgement indication message on the acknowledgement resource corresponding to the acknowledgement group, and the UE in the acknowledgement group may receive the acknowledgement indication message, and parse the acknowledgement indication message according to the configuration information sent by the base station, to detect whether there is the index number corresponding to the UE in the acknowledgement indication message. When specific UE finds an index number corresponding to the UE in the acknowledgement indication message, it may indicate that the base station finds data transmitted by the UE. When specific UE does not find an index number corresponding to the UE in the acknowledgement indication message, it may indicate that the base station does not find data transmitted by the UE.

In the method described in FIG. 6, the base station may detect whether each UE in the acknowledgement group transmits data, to obtain the detection result, and generate the acknowledgement indication message according to the detection result. The acknowledgement indication message indicates the index number corresponding to the target UE in the acknowledgement group, and the target UE is the at least one UE whose data is found by the base station in the acknowledgement group. The base station may send the acknowledgement indication message. It may be learned that, according to the method described in FIG. 6, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved.

Figure 7:
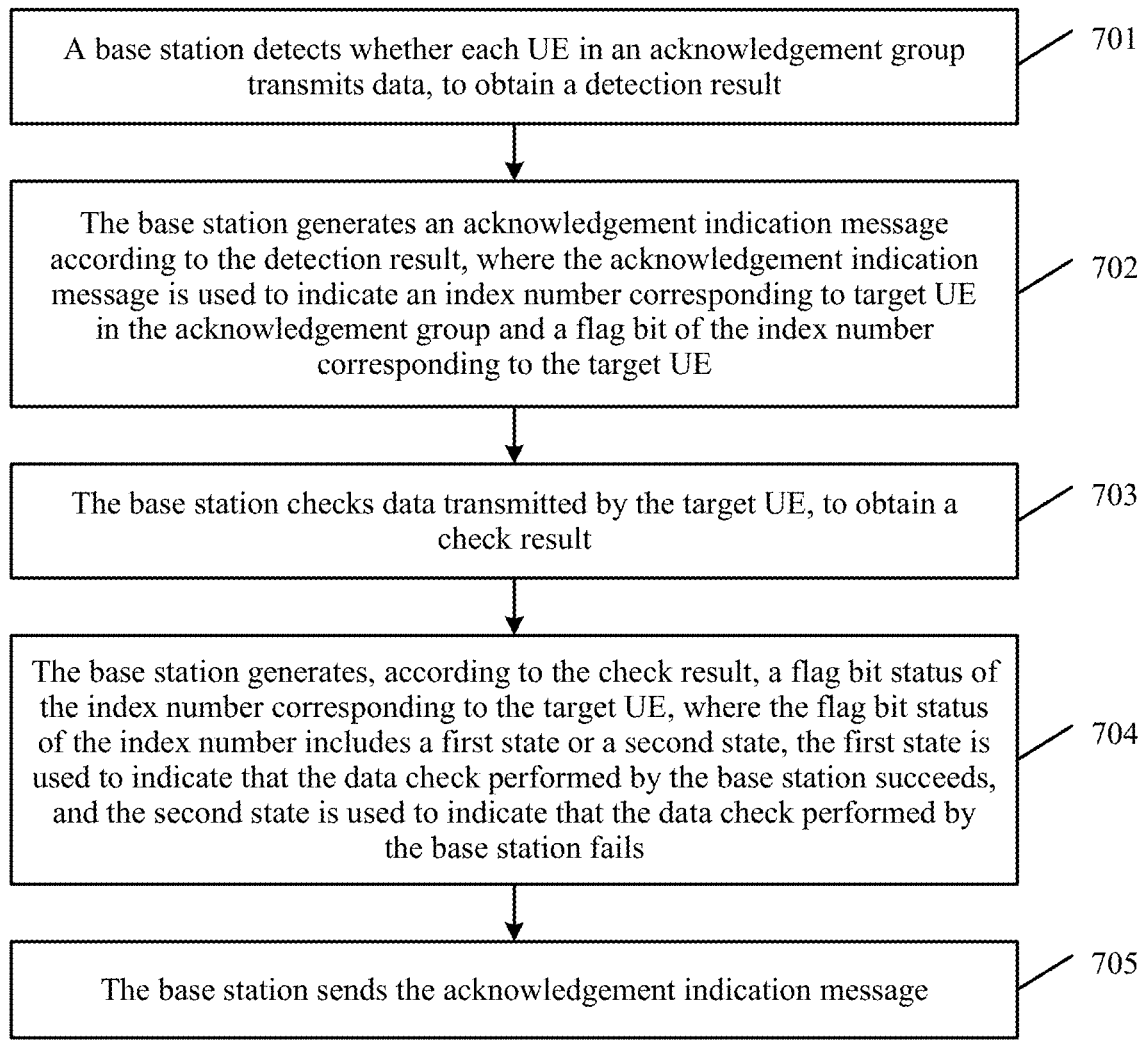
FIG. 7 is a schematic flowchart of yet another acknowledgement indication method for data transmission according to an embodiment of the present invention.

Based on the network architecture shown in FIG. 1, an embodiment of the present invention provides yet another acknowledgement indication method for data transmission. Referring to FIG. 7, FIG. 7 is a schematic flowchart of yet another acknowledgement indication method for data transmission according to an embodiment of the present invention. In the method described in FIG. 7, an acknowledgement indication message is simultaneously fed back to a plurality of UE in an index indication manner. As shown in FIG. 7, the acknowledgement indication method for data transmission may include the following steps.

701. A base station detects whether each UE in an acknowledgement group transmits data, to obtain a detection result, where the acknowledgement group includes each UE whose data is to be detected by the base station.

In an optional implementation, before step 701, the method described in FIG. 7 may further include the following step:

(71). The base station sends configuration information to each UE in the acknowledgement group, where the configuration information indicates the acknowledgement group to which each UE belongs, a quantity of UE for which the base station presets a feedback in the acknowledgement group, and an index number corresponding to each UE in the acknowledgement group.

702. The base station generates an acknowledgement indication message according to the detection result, where the acknowledgement indication message indicates an index number corresponding to target UE in the acknowledgement group and a flag bit of the index number corresponding to the target UE.

In this embodiment of the present invention, the target UE is at least one UE whose data is found by the base station in the acknowledgement group, the index number is a number of the target UE in the acknowledgement group, and different target UE in the acknowledgement group correspond to different index numbers.

In this embodiment of the present invention, a data length of the acknowledgement indication message is a preset data length, and a quantity of index numbers that are indicated by the acknowledgement indication message and that are corresponding to target UE does not exceed the preset data length.

703. The base station checks data transmitted by the target UE, to obtain a check result.

In this embodiment of the present invention, when the base station finds, in the acknowledgement group, the data transmitted by the target UE, the base station may check the data transmitted by the target UE, to obtain the check result.

704. The base station generates, according to the check result, a flag bit status of the index number corresponding to the target UE, where the flag bit status of the index number includes a first state or a second state, the first state indicates that the data check performed by the base station succeeds, and the second state indicates that the data check performed by the base station fails.

In this embodiment of the present invention, one flag bit may be reserved after each index number indicated by the acknowledgement indication message, a flag bit status may be generated by using a data check result, and 0 and 1 may be separately used to represent two states of the flag bit. For example, 1 represents the first state, and 0 represents the second state. When check performed by the base station on data transmitted by specific target UE succeeds, the base station sets a flag bit of an index number corresponding to the target UE to 1, which may be considered as feeding back, by the base station, an acknowledgement to the target UE. When check performed by the base station on data transmitted by specific target UE fails, the base station resets a flag bit of an index number corresponding to the target UE to 0, which may be considered as feeding back, by the base station, a negative acknowledgement to the target UE. In addition, alternatively, 0 may be used to represent a first type, and 1 may be used to indicate a second type. This is not limited in this embodiment of the present invention.

Figure 8:
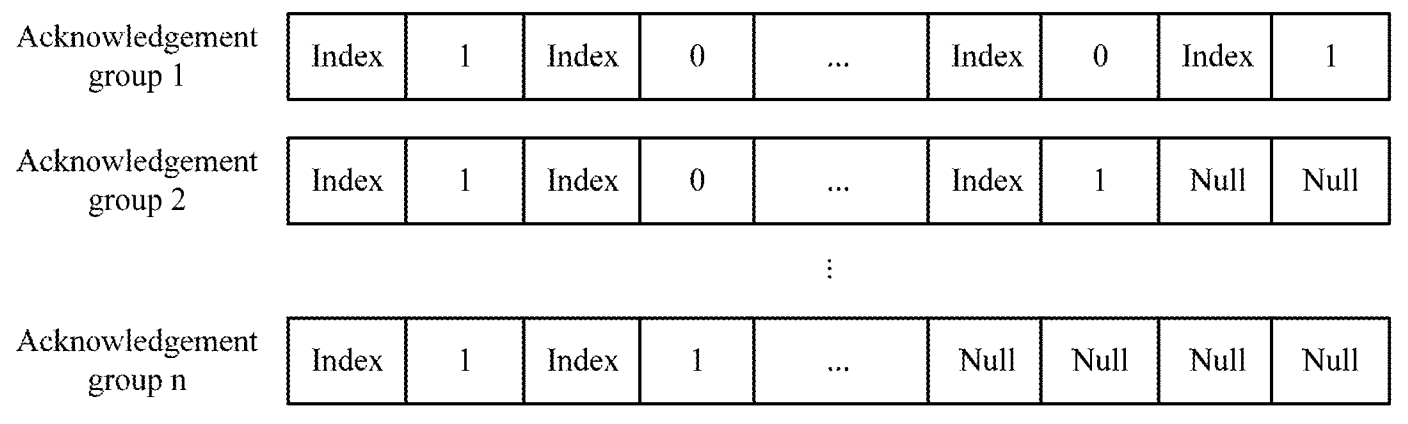

Referring to FIG. 8, FIG. 8 is a schematic diagram of an index-based acknowledgement indication message according to an embodiment of the present invention. As shown in FIG. 8, for each acknowledgement group, the base station adds, to an acknowledgement indication message corresponding to the acknowledgement group, an index number Index corresponding to UE whose data is found by the base station, and reserves one flag bit after the index number. When a flag bit status is 1, it indicates that check performed by the base station on data transmitted by the UE corresponding to the index number succeeds, and in this case, the base station feeds back an acknowledgement to the UE. When a flag bit status is 0, it indicates that check performed by the base station on data transmitted by the UE corresponding to the index number fails, and in this case, the base station feeds back a negative acknowledgement to the UE. A data length of an acknowledgement indication message corresponding to each acknowledgement group is preset by the base station. Therefore, when a quantity of UE whose data is found by the base station in an acknowledgement group exceeds a data length of an acknowledgement indication message, superfluous UE is discarded; when a quantity of UE whose data is found by the base station in an acknowledgement group is less than a data length of an acknowledgement indication message, Null or Invalid may be filled in on a superfluous location.

In an optional implementation, when the acknowledgement indication message indicates that there is target UE corresponding to an index number whose flag bit status is the second state, that is, check performed by the base station on data transmitted by the target UE fails, the acknowledgement indication message may be further used to indicate a check failure status corresponding to the data transmitted by the target UE corresponding to the index number whose flag bit status is the second state. The check failure status includes a third state or a fourth state, the third state indicates that a data check failure is caused by a conflict that is caused by a low uplink multi-user matching degree, and the fourth state indicates that the data check failure is caused by poor data transmission channel quality.

In this implementation, each target UE whose data is found may be indicated by three bits in the acknowledgement indication message. A first bit indicates an index number of the target UE. A second bit indicates a flag bit status of the index number, for example, 1 represents that check succeeds and 0 represents that check fails. A third bit indicates a check failure status corresponding to the data transmitted by the target UE, for example, 1 represents that a data check failure is caused by a conflict that is caused by a low uplink multi-user matching degree, and 0 represents that the data check failure is caused by poor data transmission channel quality. According to this implementation, the UE can know a reason why the check performed by the base station on the data transmitted by the UE fails, so that communication between the base station and the UE is more transparent.

705. The base station sends the acknowledgement indication message.

In an optional implementation, a specific implementation of step 705 in which the base station sends the acknowledgement indication message may include:

sending, by the base station, the acknowledgement indication message on an acknowledgement resource corresponding to the acknowledgement group.

According to the method described in FIG. 7, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved. In addition, when an acknowledgement message is fed back by using an index, a data check result can be indicated in addition to a data detection result, so that the UE can learn, in time, whether check performed by the base station on the data transmitted by the UE succeeds.

Figure 9:
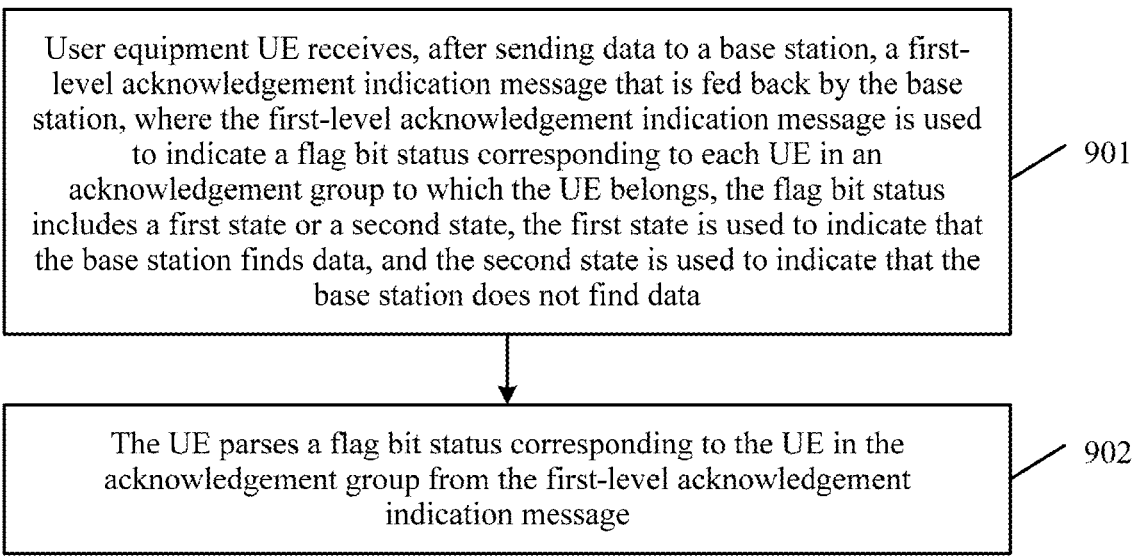
FIG. 9 is a schematic flowchart of still yet another acknowledgement indication method for data transmission according to an embodiment of the present invention.

Based on the network architecture shown in FIG. 1, an embodiment of the present invention provides still yet another acknowledgement indication method for data transmission. Referring to FIG. 9, FIG. 9 is a schematic flowchart of still yet another acknowledgement indication method for data transmission according to an embodiment of the present invention. In the method described in FIG. 9, an acknowledgement indication message is simultaneously fed back to a plurality of UE in a bitmap indication manner. As shown in FIG. 9, the acknowledgement indication method for data transmission may include the following steps.

901. User equipment (UE) receives, after sending data to a base station, a first-level acknowledgement indication message that is fed back by the base station, where the first-level acknowledgement indication message indicates a flag bit status corresponding to each UE in an acknowledgement group to which the UE belongs, the flag bit status includes a first state or a second state, the first state indicates that the base station finds data, and the second state indicates that the base station does not find data.

In this embodiment of the present invention, after the UE sends uplink data to the base station, the UE may receive the first-level acknowledgement indication message that is fed back by the base station by using a bitmap. The first-level acknowledgement indication message indicates the flag bit status corresponding to each UE in the acknowledgement group to which the UE belongs, and the flag bit status may be used to indicate whether the data sent by the UE is found by the base station. The acknowledgement group includes each UE whose data is to be detected by the base station.

In this embodiment of the present invention, a data length of the first-level acknowledgement indication message is determined by a quantity of the UE in the acknowledgement group to which the UE belongs.

In an optional implementation, before step 901, the method described in FIG. 9 may further include the following step:

(91). The UE receives configuration information sent by the base station, where the configuration information indicates the acknowledgement group to which the UE belongs, a quantity of the UE in the acknowledgement group, and a flag bit corresponding to the UE in the acknowledgement group.

In this implementation, the configuration information may be further used to indicate information such as a cell ID and a cell SRS of a cell in which the UE is located, a sending period of the cell SRS, and an offset in the period.

902. The UE parses a flag bit status corresponding to the UE in the acknowledgement group from the first-level acknowledgement indication message.

In this embodiment of the present invention, after receiving the first-level acknowledgement indication message that is fed back by the base station, the UE may parse the flag bit status corresponding to the UE in the acknowledgement group from the first-level acknowledgement indication message according to the received configuration information. The flag bit status may be represented by one bit, and 0 and 1 separately represent the two states. For example, 1 represents the first state, that is, the base station finds data; 0 represents the second state, that is, the base station does not find data. When the UE learns, by parsing the first-level acknowledgement indication message, that the flag bit status of the UE in the acknowledgement group is 1 (that is, the first state), it indicates that the base station finds the data sent by the UE. When the UE learns, by parsing the first-level acknowledgement indication message, that the flag bit status of the UE in the acknowledgement group is 0 (that is, the second state), it indicates that the base station misses detecting the data sent by the UE.

According to the method described in FIG. 9, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved.

Figure 10:
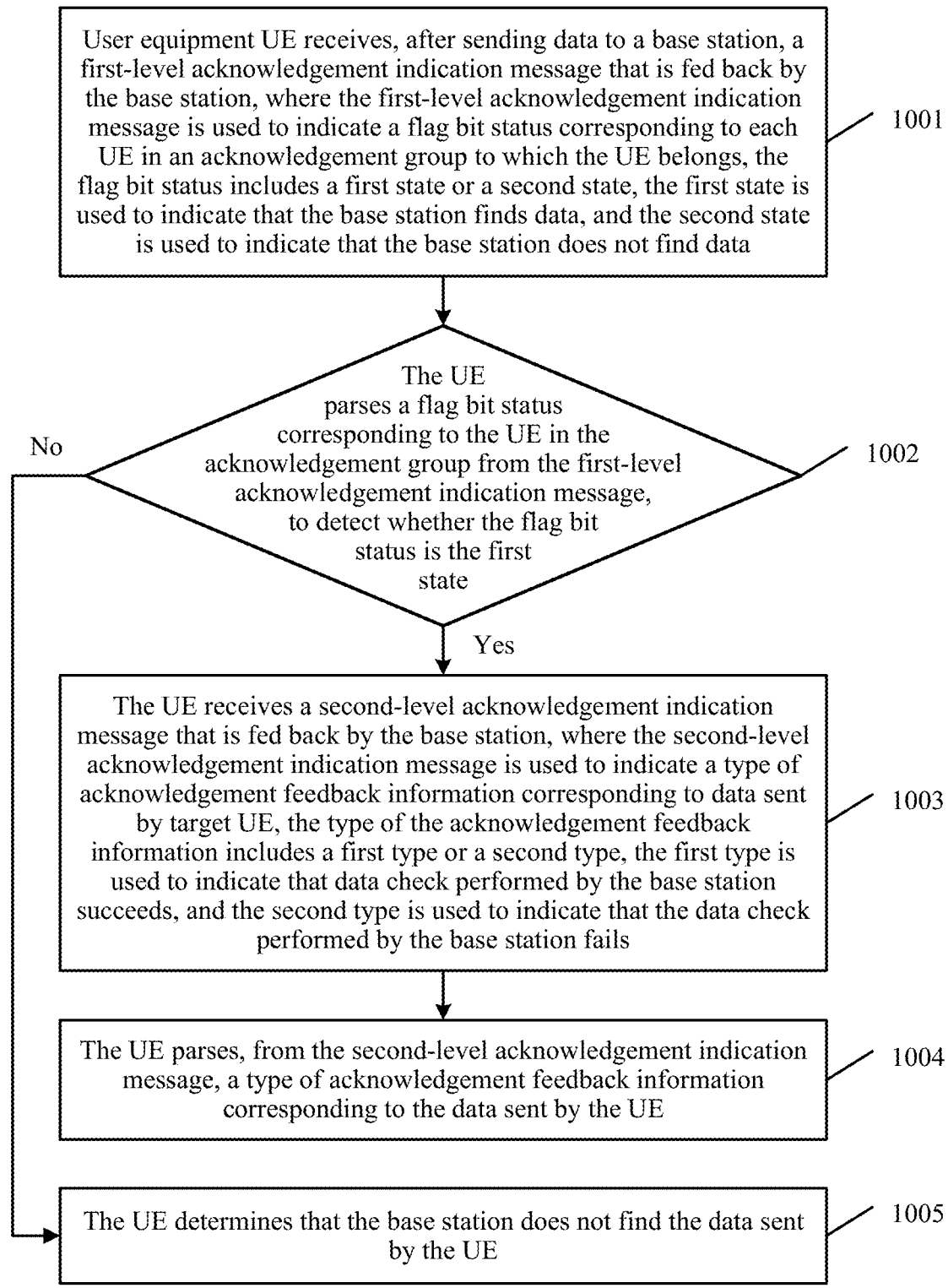
FIG. 10 is a schematic flowchart of a further acknowledgement indication method for data transmission according to an embodiment of the present invention.

Based on the network architecture shown in FIG. 1, an embodiment of the present invention provides a further acknowledgement indication method for data transmission. Referring to FIG. 10, FIG. 10 is a schematic flowchart of a further acknowledgement indication method for data transmission according to an embodiment of the present invention. In the method described in FIG. 10, an acknowledgement indication message is simultaneously fed back to a plurality of UE in a bitmap indication manner. As shown in FIG. 10, the acknowledgement indication method for data transmission may include the following steps.

1001. User equipment (UE) receives, after sending data to a base station, a first-level acknowledgement indication message that is fed back by the base station, where the first-level acknowledgement indication message indicates a flag bit status corresponding to each UE in an acknowledgement group to which the UE belongs, the flag bit status includes a first state or a second state, the first state indicates that the base station finds data, and the second state indicates that the base station does not find data.

In this embodiment of the present invention, the acknowledgement group includes each UE whose data is to be detected by the base station. A data length of the first-level acknowledgement indication message is determined by a quantity of the UE in the acknowledgement group to which the UE belongs.

In an optional implementation, a specific implementation of step 1001 in which the user equipment (UE) receives, after sending the data to the base station, the first-level acknowledgement indication message that is fed back by the base station may include:

receiving, by the user equipment (UE) after sending the data to the base station, the first-level acknowledgement indication message that is fed back by the base station on a first acknowledgement resource corresponding to the acknowledgement group to which the UE belongs.

The first acknowledgement resource corresponding to the acknowledgement group may include but is not limited to a PDCCH or a PDSCH, and different acknowledgement groups correspond to different acknowledgement resources.

In an optional implementation, before step 1001, the method described in FIG. 10 may further include the following step:

(100). The UE receives configuration information sent by the base station, where the configuration information indicates the acknowledgement group to which the UE belongs, a quantity of the UE in the acknowledgement group, and a flag bit corresponding to the UE in the acknowledgement group.

1002. The UE parses a flag bit status corresponding to the UE in the acknowledgement group from the first-level acknowledgement indication message, to detect whether the flag bit status is the first state; and if the flag bit status is the first state, performs step 1003; or if the flag bit status is not the first state, performs step 1005.

1003. The UE receives a second-level acknowledgement indication message that is fed back by the base station, where the second-level acknowledgement indication message indicates a type of acknowledgement feedback information corresponding to data sent by target UE, the type of the acknowledgement feedback information includes a first type or a second type, the first type indicates that data check performed by the base station succeeds, and the second type indicates that the data check performed by the base station fails.

In this embodiment of the present invention, when the UE learns, by means of parsing, that the flag bit status corresponding to the UE in the acknowledgement group is the first state, that is, the base station finds the data sent by the UE, the UE may receive the second-level acknowledgement indication message that is fed back by the base station. The target UE is all UE that are in the acknowledgement group and whose flag bit statuses are the first state.

In an optional implementation, a specific implementation of step 1003 in which the UE receives the second-level acknowledgement indication message that is fed back by the base station may include:

receiving, by the UE, the second-level acknowledgement indication message that is fed back by the base station on a second acknowledgement resource corresponding to the acknowledgement group to which the UE belongs.

The second acknowledgement resource is different from the first acknowledgement resource, and the first acknowledgement resource used for feeding back the first-level acknowledgement indication message and the second acknowledgement resource used for feeding back the second-level acknowledgement indication message may be different frequency-domain sub-channels of a PDCCH, or may be different frequency-domain sub-channels of a PDSCH. This is not limited in this embodiment of the present invention.

1004. The UE parses, from the second-level acknowledgement indication message, a type of acknowledgement feedback information corresponding to the data sent by the UE.

In this embodiment of the present invention, the UE learns, by means of parsing, that the flag bit status corresponding to the UE in the acknowledgement group is the first state, that is, the UE learns, by means of parsing, that the base station finds the data sent by the UE. Further, the UE may receive the second-level acknowledgement indication message that is fed back by the base station, to detect, by parsing the second-level acknowledgement indication message, whether check performed on the data sent by the UE succeeds. When the type of the acknowledgement feedback information corresponding to the data sent by the UE is the first type, it indicates that the check performed by the base station on the data sent by the UE succeeds, and in this case, the base station feeds back an acknowledgement to the UE. When the type of the acknowledgement feedback information corresponding to the data sent by the UE is the second type, it indicates that the check performed by the base station on the data sent by the UE fails, and in this case, the base station feeds back a negative acknowledgement to the UE.

In this embodiment of the present invention, a data length of the second-level acknowledgement indication message is determined by a quantity of the target UE that are in the acknowledgement group and whose flag bit statuses are the first state.

In an optional implementation, a specific implementation of step 1004 in which the UE parses, from the second-level acknowledgement indication message, the type of the acknowledgement feedback information corresponding to the data sent by the UE may include the following steps:

(101). The UE collects statistics about the quantity of the target UE.

(102). The UE determines a location of the UE in the target UE, where a location of the UE in the second-level acknowledgement indication message is determined by the location of the UE in the target UE.

(103). The UE parses, on the location of the UE in the second-level acknowledgement indication message, the type of the acknowledgement feedback information corresponding to the data sent by the UE.

In this implementation, after receiving the first-level acknowledgement indication message, the UE may collect the statistics about the quantity of the target UE that are in the first-level acknowledgement indication message and whose flag bit statuses are the first state, and determine the location of the UE in the target UE according to the location of the UE in the first-level acknowledgement indication message. A sequence of the target UE in the second-level acknowledgement indication message may be determined according to a sequence of the target UE in the first-level acknowledgement indication message, to further determine the location of the UE in the second-level acknowledgement indication message, and parse, on the location of the UE in the second-level acknowledgement indication message, the type of the acknowledgement feedback information of the data sent by the UE.

In an optional implementation, the method described in FIG. 10 may further include the following step:

(104). When the UE learns, by means of parsing, that the type of the acknowledgement feedback information corresponding to the data sent by the UE is the first type, the UE determines that check performed by the base station on the data sent by the UE succeeds.

In an optional implementation, the method described in FIG. 10 may further include the following step:

(105). When the UE learns, by means of parsing, that the type of the acknowledgement feedback information corresponding to the data sent by the UE is the second type, the UE determines that check performed by the base station on the data sent by the UE fails.

In an optional implementation, when the second-level acknowledgement indication message indicates that a type of acknowledgement feedback information corresponding to data transmitted by at least one target UE is the second type, the second-level acknowledgement indication message further indicates a check failure status corresponding to the data sent by the at least one target UE. The check failure status includes a third state or a fourth state, the third state indicates that a data check failure is caused by a conflict that is caused by a low uplink multi-user matching degree, and the fourth state indicates that the data check failure is caused by poor data transmission channel quality.

Correspondingly, when the UE learns, by means of parsing, that the type of the acknowledgement feedback information of the data sent by the UE is the second type, the method described in FIG. 10 may further include the following steps:

(106). The UE parses, from the second-level acknowledgement indication message, a check failure status corresponding to the data sent by the UE.

(107). When the UE learns, by means of parsing, that the check failure status corresponding to the data sent by the UE is the third state, the UE determines that check performed by the base station on the data sent by the UE fails due to the conflict that is caused by the low uplink multi-user matching degree.

(108). When the UE learns, by means of parsing, that the check failure status corresponding to the data sent by the UE is the fourth state, the UE determines that check performed by the base station on the data sent by the UE fails due to the poor data transmission channel quality.

1005. The UE determines that the base station does not find the data sent by the UE.

In this embodiment of the present invention, when the UE learns, by means of parsing, that the flag bit status corresponding to the UE in the acknowledgement group is not the first state, it indicates that the flag bit status corresponding to the UE in the acknowledgement group is the second state, that is, the base station does not find the data sent by the UE, and the UE determines that the base station misses detecting the data sent by the UE. In this case, the UE may send data to the base station again.

According to the method described in FIG. 10, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved. In addition, when acknowledgement information is fed back by using a bitmap, an acknowledgement may be fed back by using indications of two levels. After learning, by parsing the first-level acknowledgement indication message, that the data sent by the UE is found by the base station, the UE may parse a data check result from the second-level acknowledgement indication message, so that the UE learns, in time, whether the check performed by the base station on the data sent by the UE succeeds.

Figure 11:
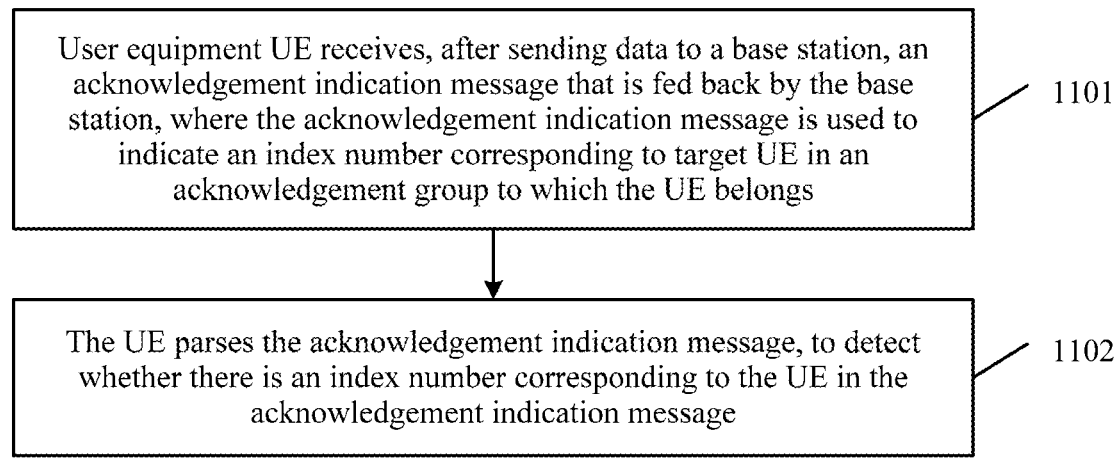
FIG. 11 is a schematic flowchart of a still further acknowledgement indication method for data transmission according to an embodiment of the present invention.

Based on the network architecture shown in FIG. 1, an embodiment of the present invention provides a still further acknowledgement indication method for data transmission. Referring to FIG. 11, FIG. 11 is a schematic flowchart of a still further acknowledgement indication method for data transmission according to an embodiment of the present invention. In the method described in FIG. 11, an acknowledgement indication message is simultaneously fed back to a plurality of UE in an index indication manner. As shown in FIG. 11, the acknowledgement indication method for data transmission may include the following steps.

1101. User equipment (UE) receives, after sending data to a base station, an acknowledgement indication message that is fed back by the base station, where the acknowledgement indication message indicates an index number corresponding to target UE in an acknowledgement group to which the UE belongs.

In this embodiment of the present invention, the target UE is at least one UE whose data is found by the base station in the acknowledgement group, the index number is a temporary number of the target UE in the acknowledgement group, different target UE in the acknowledgement group correspond to different index numbers, and the acknowledgement group includes each UE whose data is to be detected by the base station.

In this embodiment of the present invention, a data length of the acknowledgement indication message is a preset data length, and a quantity of index numbers that are indicated by the acknowledgement indication message and that are corresponding to target UE in the acknowledgement group does not exceed the preset data length.

In an optional implementation, a specific implementation of step 1101 in which the user equipment (UE) receives, after sending the data to the base station, the acknowledgement indication message that is fed back by the base station may include: receiving, by the user equipment (UE) after sending the data to the base station, the acknowledgement indication message that is fed back by the base station on an acknowledgement resource corresponding to the acknowledgement group to which the UE belongs.

The acknowledgement resource corresponding to the acknowledgement group may include but is not limited to a PDCCH or a PDSCH, and different acknowledgement groups correspond to different acknowledgement resources.

In an optional implementation, before step 1101, the method described in FIG. 11 may further include the following step:

(110). The UE receives configuration information sent by the base station, where the configuration information indicates the acknowledgement group to which the UE belongs, a quantity of UE for which the base station presets a feedback in the acknowledgement group, and an index number corresponding to the UE in the acknowledgement group.

In this implementation, the configuration information may be further used to indicate information such as a cell ID and a cell SRS of a cell in which the UE is located, a sending period of the cell SRS, and an offset in the period.

1102. The UE parses the acknowledgement indication message, to detect whether there is an index number corresponding to the UE in the acknowledgement indication message.

In this embodiment of the present invention, the acknowledgement indication message includes the index number corresponding to the target UE whose data is found by the base station, and the UE may learn, by parsing the acknowledgement indication message according to the configuration information, whether there is the index number corresponding to the UE. When there is the index number corresponding to the UE in the acknowledgement indication message, it may indicate that the base station finds the data sent by the UE. When there is no index number corresponding to the UE in the acknowledgement indication message, it may indicate that the base station misses detecting the data sent by the UE. In addition, because the data length of the acknowledgement indication message is a fixed length that is preset by the base station, when a quantity of UE whose data is found by the base station exceeds the data length of the acknowledgement indication message, the base station discards superfluous UE, and therefore there is no index number corresponding to the UE in the acknowledgement indication message because the acknowledgement indication message cannot indicate the index number due to a length limit. In this case, the UE may consider that the base station does not find the data, and the UE sends data to the base station again.

According to the method described in FIG. 11, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved.

Figure 12:
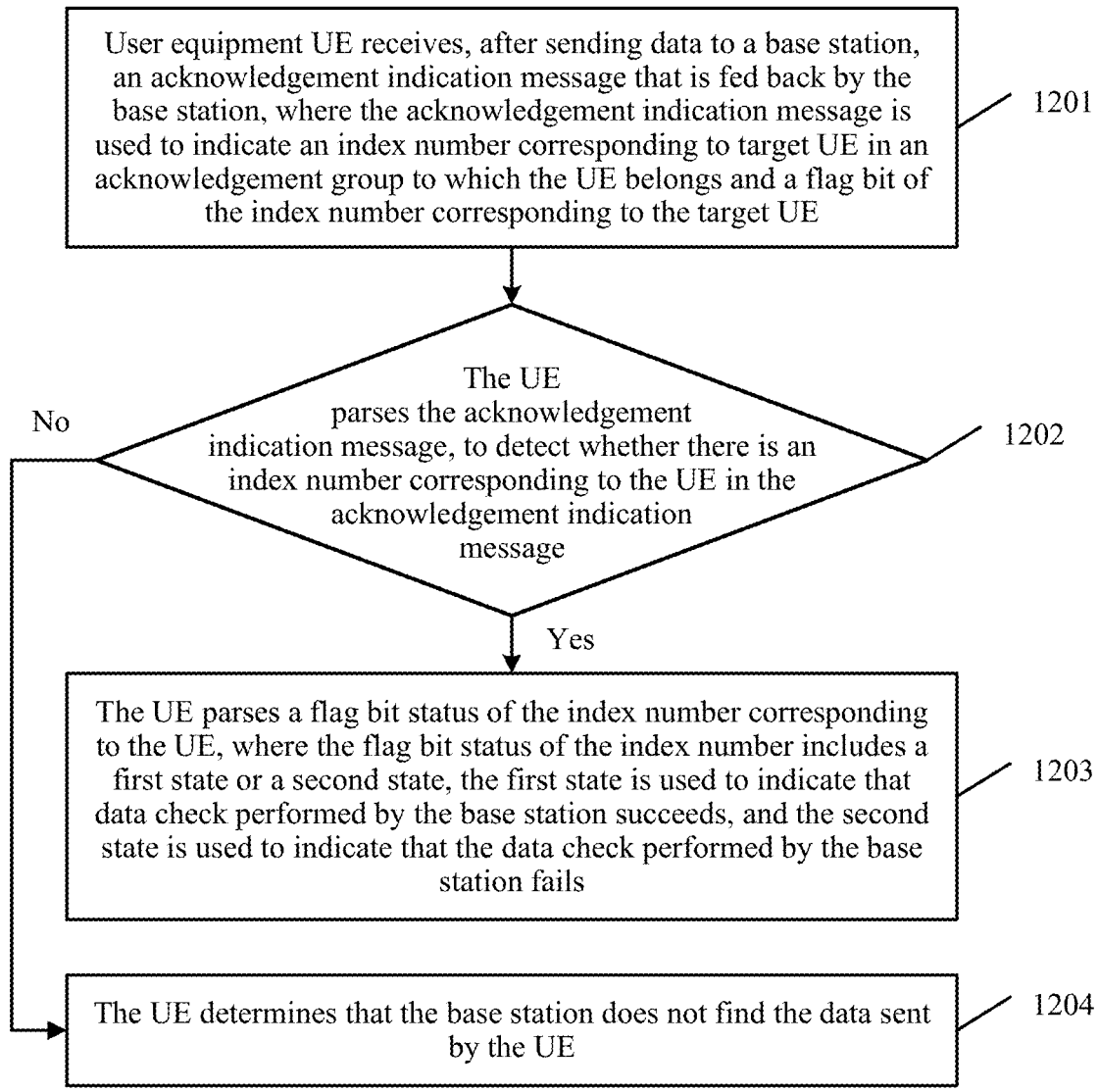
FIG. 12 is a schematic flowchart of a yet further acknowledgement indication method for data transmission according to an embodiment of the present invention.

Based on the network architecture shown in FIG. 1, an embodiment of the present invention provides a yet further acknowledgement indication method for data transmission. Referring to FIG. 12, FIG. 12 is a schematic flowchart of a yet further acknowledgement indication method for data transmission according to an embodiment of the present invention. In the method described in FIG. 12, an acknowledgement indication message is simultaneously fed back to a plurality of UE in an index indication manner. As shown in FIG. 12, the acknowledgement indication method for data transmission may include the following steps.

1201. User equipment (UE) receives, after sending data to a base station, an acknowledgement indication message that is fed back by the base station, where the acknowledgement indication message indicates an index number corresponding to target UE in an acknowledgement group to which the UE belongs and a flag bit of the index number corresponding to the target UE.

In this embodiment of the present invention, the target UE is at least one UE whose data is found by the base station in the acknowledgement group, the index number is a temporary number of the target UE in the acknowledgement group, different target UE in the acknowledgement group correspond to different index numbers, and the acknowledgement group includes each UE whose data is to be detected by the base station.

In this embodiment of the present invention, a data length of the acknowledgement indication message is a preset data length, and a quantity of index numbers that are indicated by the acknowledgement indication message and that are corresponding to target UE does not exceed the preset data length.

In an optional implementation, the method described in FIG. 12 may further include the following step:

(120). The UE receives configuration information sent by the base station, where the configuration information indicates the acknowledgement group to which the UE belongs, a quantity of UE for which the base station presets a feedback in the acknowledgement group, and an index number corresponding to the UE in the acknowledgement group.

1202. The UE parses the acknowledgement indication message, to detect whether there is an index number corresponding to the UE in the acknowledgement indication message, and if there is the index number corresponding to the UE in the acknowledgement indication message, performs step 1203, or if there is no index number corresponding to the UE in the acknowledgement indication message, performs step 1204.

1203. The UE parses a flag bit status of the index number corresponding to the UE, where the flag bit status of the index number includes a first state or a second state, the first state indicates that data check performed by the base station succeeds, and the second state indicates that the data check performed by the base station fails.

In this embodiment of the present invention, when the UE learns, by means of parsing, that there is the index number corresponding to the UE in the acknowledgement indication message, the UE may further parse the flag bit status of the index number corresponding to the UE.

In an optional implementation, the method described in FIG. 12 may further include the following step:

(121). When the UE learns, by means of parsing, that the flag bit status of the index number corresponding to the UE is the first state, the UE determines that check performed by the base station on the data sent by the UE succeeds.

In an optional implementation, the method described in FIG. 12 may further include the following step:

(122). When the UE learns, by means of parsing, that the flag bit status of the index number corresponding to the UE is the second state, the UE determines that check performed by the base station on the data sent by the UE fails.

In an optional implementation, when the acknowledgement indication message indicates that there is target UE corresponding to an index number whose flag bit status is the second state, the acknowledgement indication message further indicates a check failure status corresponding to data sent by the target UE corresponding to the index number whose flag bit status is the second state. The check failure status includes a third state or a fourth state, the third state indicates that a data check failure is caused by a conflict that is caused by a low uplink multi-user matching degree, and the fourth state indicates that the data check failure is caused by poor data transmission channel quality.

Correspondingly, when the UE learns, by means of parsing, that the flag bit status of the index number corresponding to the UE is the second state, the method described in FIG. 12 may further include the following steps:

(123). The UE parses, from the acknowledgement indication message, a check failure status corresponding to the data sent by the UE.

(124). When the UE learns, by means of parsing, that the check failure status corresponding to the data sent by the UE is a third state, the UE determines that check performed by the base station on the data sent by the UE fails due to a conflict that is caused by a low uplink multi-user matching degree.

(125). When the UE learns, by means of parsing, that the check failure status corresponding to the data sent by the UE is a fourth state, the UE determines that check performed by the base station on the data sent by the UE fails due to poor data transmission channel quality.

1204. The UE determines that the base station does not find the data sent by the UE.

In this embodiment of the present invention, when the UE learns, by means of parsing, that there is no index number corresponding to the UE in the acknowledgement indication message, it indicates that the base station does not find the data sent by the UE, and the UE may determine that the base station misses detecting the data sent by the UE.

According to the method described in FIG. 12, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved. In addition, when acknowledgement information is fed back by using an index, the UE may further parse a data check result after learning, by means of parsing, that the data sent by the UE is found by the base station, so that the UE learns, in time, whether the check performed by the base station on the data sent by the UE succeeds.

Figure 13:
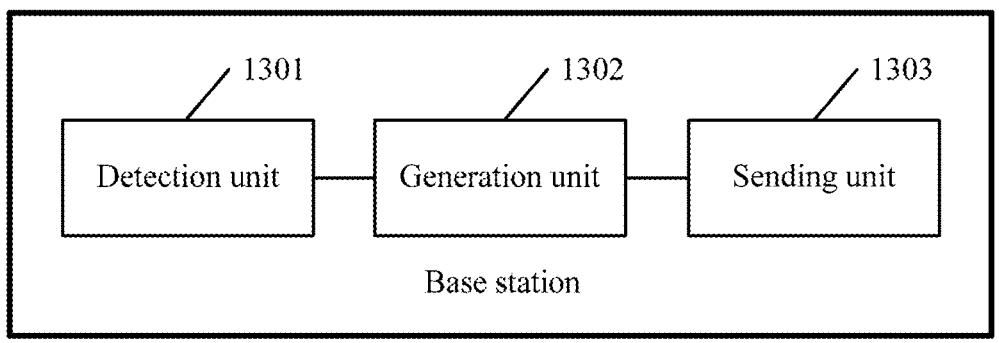
FIG. 13 is a schematic structural diagram of a base station according to an embodiment of the present invention.

Based on the network architecture shown in FIG. 1, an embodiment of the present invention provides a base station. Referring to FIG. 13, FIG. 13 is a schematic structural diagram of a base station according to an embodiment of the present invention. The base station may be configured to perform the acknowledgement indication method for data transmission according to the embodiments of the present invention. As shown in FIG. 13, the base station may include a detection unit 1301, a generation unit 1302, and a sending unit 1303.

The detection unit 1301 is configured to detect whether each user equipment (UE) in an acknowledgement group transmits data, to obtain a detection result.

In this embodiment of the present invention, the base station may group a plurality of accessed UE, to group the plurality of UE into several acknowledgement groups. One acknowledgement group includes each UE whose data is to be detected by the base station, that is, the detection unit 1301 can perform data detection on each UE included in the acknowledgement group. For each acknowledgement group, the detection unit 1301 may detect, in real time, whether each UE in the acknowledgement group transmits data, to obtain a detection result, or the base station may detect, at intervals of preset time, whether each UE in the acknowledgement group transmits data, to obtain a detection result. This is not limited in this embodiment of the present invention.

The generation unit 1302 is configured to generate a first-level acknowledgement indication message according to the detection result. The first-level acknowledgement indication message indicates a flag bit status corresponding to each UE in the acknowledgement group, the flag bit status includes a first state or a second state, the first state indicates that the base station finds data, and the second state indicates that the base station does not find data.

In this embodiment of the present invention, the generation unit 1302 may generate the first-level acknowledgement indication message according to the detection result obtained by the detection unit 1301 by detecting whether the UE in the acknowledgement group transmits data. The first-level acknowledgement indication message may be used to indicate the flag bit status corresponding to each UE in the acknowledgement group, the flag bit status corresponding to each UE may include the first state or the second state, the first state indicates that the base station finds the data transmitted by the UE, and the second state indicates that the base station does not find the data transmitted by the UE.

In this embodiment of the present invention, the flag bit status may be represented by one bit, and 0 and 1 separately represent the two states. For example, 1 represents the first state, that is, the base station finds data; 0 represents the second state, that is, the base station does not find data. When the detection unit 1301 finds, in the acknowledgement group, data transmitted by specific UE, the generation unit 1302 sets a flag bit corresponding to the UE in the first-level acknowledgement indication message to 1. When the detection unit 1301 does not find, in the acknowledgement group, data transmitted by specific UE, the generation unit 1302 resets a flag bit corresponding to the UE in the first-level acknowledgement indication message to 0. In addition, alternatively, 0 may be used to represent the first state, and 1 may be used to represent the second state. This is not limited in this embodiment of the present invention.

In this embodiment of the present invention, a data length of the first-level acknowledgement indication message may be determined by a quantity of the UE in the acknowledgement group.

The sending unit 1303 is configured to send the first-level acknowledgement indication message.

In this embodiment of the present invention, the sending unit 1303 may send the first-level acknowledgement indication message by means of broadcasting, so that UE that is in the acknowledgement group and that has transmitted data can receive the first-level acknowledgement indication message, and parse a flag bit status corresponding to the UE from the first-level acknowledgement indication message, to determine whether the data transmitted by the UE is undetected.

In an optional implementation, a specific implementation in which the sending unit 1303 sends the first-level acknowledgement indication message may be:

the sending unit 1303 sends the first-level acknowledgement indication message on a first acknowledgement resource corresponding to the acknowledgement group.

In this implementation, the first acknowledgement resource corresponding to the acknowledgement group may include but is not limited to a PDCCH or a PDSCH. Each acknowledgement group has a corresponding acknowledgement resource, and different acknowledgement groups correspond to different acknowledgement resources.

Figure 14:
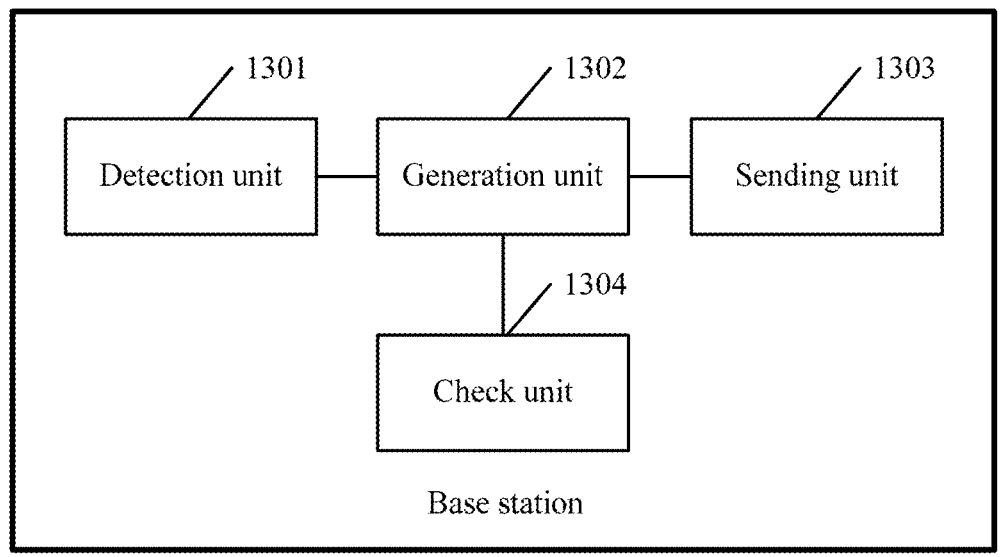
FIG. 14 is a schematic structural diagram of another base station according to an embodiment of the present invention.

Referring to FIG. 14, FIG. 14 is a schematic structural diagram of another base station according to an embodiment of the present invention. The base station is configured to perform the acknowledgement indication method for data transmission according to the embodiments of the present invention. The base station shown in FIG. 14 is obtained by further optimizing the base station shown in FIG. 13. Compared with the base station shown in FIG. 13, the base station shown in FIG. 14 may further include:

a check unit 1304, configured to: when the first-level acknowledgement indication message generated by the generation unit 1302 indicates that there is target UE in the UE in the acknowledgement group, check data transmitted by the target UE, to obtain a check result.

In this embodiment of the present invention, the target UE is all UE whose flag bit statuses are the first state, that is, UE whose data is found by the detection unit 1301. The check unit 1304 may check data transmitted by all target UE whose data is found, to obtain the check result.

The generation unit 1302 is further configured to generate a second-level acknowledgement indication message according to the check result. The second-level acknowledgement indication message indicates a type of acknowledgement feedback information corresponding to the data transmitted by the target UE, the type of the acknowledgement feedback information includes a first type or a second type, the first type indicates that the data check performed by the base station succeeds, and the second type indicates that the data check performed by the base station fails.

In this embodiment of the present invention, the generation unit 1302 may generate the second-level acknowledgement indication message according to the check result obtained by the check unit 1304 by checking the data transmitted by all the target UE. The second-level acknowledgement indication message may be used to indicate the type of the acknowledgement feedback information corresponding to the data transmitted by the target UE, and a type of acknowledgement feedback information corresponding to each target UE may include the first type or the second type. The first type indicates that check performed by the base station on data transmitted by the target UE succeeds, and the second type indicates that the check performed by the base station on the data transmitted by the target UE fails.

In this embodiment of the present invention, a data length of the second-level acknowledgement indication message is determined by a quantity of the target UE that are in the acknowledgement group and whose flag bit statuses are the first state.

The sending unit 1303 is further configured to send the second-level acknowledgement indication message.

In an optional implementation, a specific implementation in which the sending unit 1303 sends the second-level acknowledgement indication message may be:

the sending unit 1303 sends the second-level acknowledgement indication message on a second acknowledgement resource corresponding to the acknowledgement group.

In this implementation, the first acknowledgement resource used for sending the first-level acknowledgement indication message and the second acknowledgement resource used for sending the second-level acknowledgement indication message may be different acknowledgement resources. The first-level acknowledgement indication message and the second-level acknowledgement indication message may be sent on different frequency-domain sub-channels of a PDCCH, or the first-level acknowledgement indication message and the second-level acknowledgement indication message may be sent on different frequency-domain sub-channels of a PDSCH.

In an optional implementation, when the second-level acknowledgement indication message indicates that a type of acknowledgement feedback information corresponding to data transmitted by at least one target UE is the second type, the second-level acknowledgement indication message further indicates a check failure status corresponding to the data transmitted by the at least one target UE. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, before the detection unit 1301 detects whether each user equipment (UE) in the acknowledgement group transmits data, to obtain the detection result, the sending unit 1303 is further configured to send configuration information to each user equipment (UE) in the acknowledgement group. The configuration information indicates the acknowledgement group to which each UE belongs, the quantity of the UE in the acknowledgement group, and a flag bit corresponding to each UE in the acknowledgement group.

In this implementation, the configuration information may include cell-specific configuration information and UE-specific configuration information. The cell-specific configuration information may be used to indicate a cell ID and a cell SRS of a cell in which the UE is located, a sending period of the cell SRS, an offset in the period, and the like, and the cell-specific configuration information is the same for all UE in a same cell. In addition to the acknowledgement group to which the UE belongs, the quantity of the UE in the acknowledgement group, and the flag bit corresponding to the UE in the acknowledgement group, the UE-specific configuration information may be used to indicate a C-RNTI, that is, a dynamic identifier allocated by the base station to the UE. Different UE have different UE-specific configuration information.

Specifically, the base station shown in FIG. 13 or FIG. 14 may implement some or all procedures in the acknowledgement indication method embodiment for data transmission described in the present invention with reference to FIG. 2 or FIG. 4.

It may be learned that, according to the base station shown in FIG. 13 and FIG. 14, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved. In addition, when feedback is performed by using indications of two levels, a data check result can be indicated in addition to a data detection result, so that the UE can learn, in time, whether check performed by the base station on the data transmitted by the UE succeeds.

Figure 15:
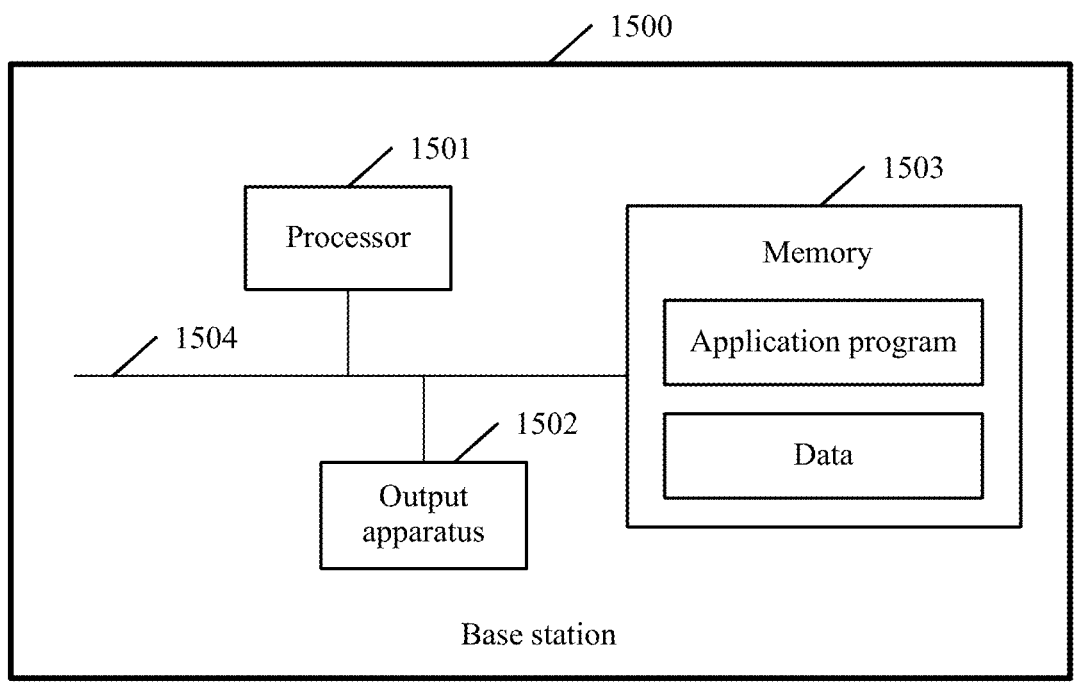
FIG. 15 is a schematic structural diagram of still another base station according to an embodiment of the present invention.

Based on the network architecture shown in FIG. 1, an embodiment of the present invention provides still another base station. Referring to FIG. 15, FIG. 15 is a schematic structural diagram of still another base station according to an embodiment of the present invention. The base station is configured to perform the acknowledgement indication method for data transmission according to the embodiments of the present invention. As shown in FIG. 15, the base station 1500 may include at least one processor 1501 such as a Central Processing Unit (CPU), at least one output apparatus 1502, a memory 1503, and a communications bus 1504. The communications bus 1504 is configured to implement connections and communication between these components. A person skilled in the art may understand that the structure of the base station shown in FIG. 15 does not constitute a limitation on the present invention. The structure may be a bus structure or may be a star structure; and may further include more or fewer parts than those shown in FIG. 15, or combine some parts, or have different part arrangements.

In this embodiment of the present invention, the output apparatus 1502 may be configured to send an acknowledgement indication message.

In this embodiment of the present invention, the memory 1503 may be a high-speed RAM memory or a non-volatile memory such as at least one magnetic disk storage. In some embodiments, the memory 1503 may be at least one storage apparatus that is far away from the processor 1501. As shown in FIG. 15, the memory 1503 used as a computer storage medium may include an application program, data, and the like. This is not limited in this embodiment of the present invention.

In the base station shown in FIG. 15, the processor 1501 may be configured to invoke the application program stored in the memory 1503, to perform the following operations:

detecting whether each user equipment (UE) in an acknowledgement group transmits data, to obtain a detection result, where the acknowledgement group includes each UE whose data is to be detected by the base station;

generating a first-level acknowledgement indication message according to the detection result, where the first-level acknowledgement indication message indicates a flag bit status corresponding to each UE in the acknowledgement group, the flag bit status includes a first state or a second state, the first state indicates that the base station finds data, and the second state indicates that the base station does not find data; and controlling the output apparatus 1502 to send the first-level acknowledgement indication message.

In an optional implementation, a data length of the first-level acknowledgement indication message is determined by a quantity of the UE in the acknowledgement group.

In an optional implementation, a specific implementation in which the processor 1501 controls the output apparatus 1502 to send the first-level acknowledgement indication message may be:

controlling the output apparatus 1502 to send the first-level acknowledgement indication message on a first acknowledgement resource corresponding to the acknowledgement group.

In an optional implementation, the processor 1501 is further configured to invoke the application program stored in the memory 1503, to perform the following steps:

when there is target UE in the UE in the acknowledgement group, checking data transmitted by the target UE, to obtain a check result, where the target UE is all UE whose flag bit statuses are the first state;

generating a second-level acknowledgement indication message according to the check result, where the second-level acknowledgement indication message indicates a type of acknowledgement feedback information corresponding to the data transmitted by the target UE, the type of the acknowledgement feedback information includes a first type or a second type, the first type indicates that the data check performed by the base station succeeds, and the second type indicates that the data check performed by the base station fails; and controlling the output apparatus 1502 to send the second-level acknowledgement indication message.

In an optional implementation, a specific implementation in which the processor 1501 controls the output apparatus 1502 to send the second-level acknowledgement indication message may be:

controlling the output apparatus 1502 to send the second-level acknowledgement indication message on a second acknowledgement resource corresponding to the acknowledgement group.

In an optional implementation, a data length of the second-level acknowledgement indication message is determined by a quantity of the target UE.

In an optional implementation, when the second-level acknowledgement indication message indicates that a type of acknowledgement feedback information corresponding to data transmitted by at least one target UE is the second type, the second-level acknowledgement indication message further indicates a check failure status corresponding to the data transmitted by the at least one target UE. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, before the detecting whether each user equipment (UE) in an acknowledgement group transmits data, to obtain a detection result, the processor 1501 is further configured to invoke the application program stored in the memory 1503, to perform the following step:

controlling the output apparatus 1502 to send, to each user equipment (UE) in the acknowledgement group, configuration information included in the data stored in the memory 1503, where the configuration information indicates the acknowledgement group to which each UE belongs, the quantity of the UE in the acknowledgement group, and a flag bit corresponding to each UE in the acknowledgement group.

Specifically, the base station shown in FIG. 15 may implement some or all procedures in the acknowledgement indication method embodiment for data transmission described in the present invention with reference to FIG. 2 or FIG. 4.

It may be learned that, according to the base station shown in FIG. 15, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved. In addition, when feedback is performed by using indications of two levels, a data check result can be indicated in addition to a data detection result, so that the UE can learn, in time, whether check performed by the base station on the data transmitted by the UE succeeds.

Figure 16:
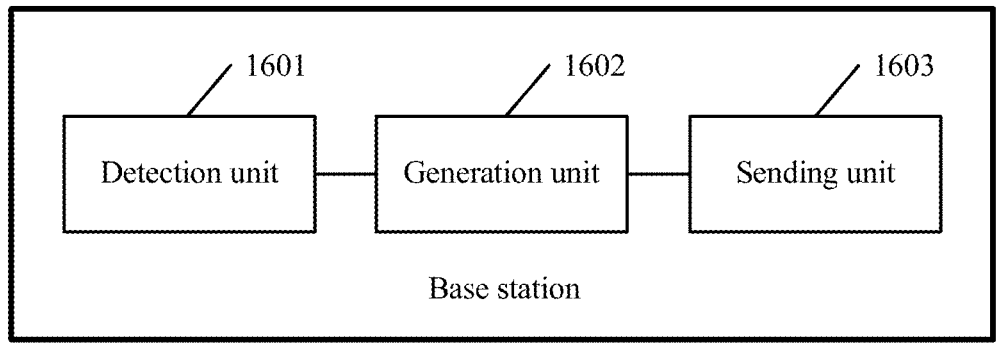
FIG. 16 is a schematic structural diagram of yet another base station according to an embodiment of the present invention.

Based on the network architecture shown in FIG. 1, an embodiment of the present invention provides yet another base station. Referring to FIG. 16, FIG. 16 is a schematic structural diagram of yet another base station according to an embodiment of the present invention. The base station is configured to perform the acknowledgement indication method for data transmission according to the embodiments of the present invention. As shown in FIG. 16, the base station may include a detection unit 1601, a generation unit 1602, and a sending unit 1603.

The detection unit 1601 is configured to detect whether each user equipment (UE) in an acknowledgement group transmits data, to obtain a detection result.

In this embodiment of the present invention, the acknowledgement group includes each UE whose data is to be detected by the base station. The detection unit 1601 may detect, in real time, whether each UE in the acknowledgement group transmits data, to obtain the detection result, or the detection unit 1601 may detect, at intervals of preset time, whether each UE in the acknowledgement group transmits data, to obtain the detection result. This is not limited in this embodiment of the present invention.

The generation unit 1602 is configured to generate an acknowledgement indication message according to the detection result. The acknowledgement indication message indicates an index number corresponding to target UE in the acknowledgement group.

In this embodiment of the present invention, the generation unit 1602 may generate the acknowledgement indication message according to the detection result obtained by the detection unit 1601 by detecting whether the UE in the acknowledgement group transmits data, and the acknowledgement indication message may be used to indicate the index number corresponding to the target UE in the acknowledgement group. The target UE is at least one UE whose data is found by the base station in the acknowledgement group, the index number is a number of the target UE in the acknowledgement group, and different target UE in the acknowledgement group correspond to different index numbers.

In this embodiment of the present invention, a data length of the acknowledgement indication message may be a preset data length, that is, the data length of the acknowledgement indication message is configurable, may be preset by the base station, and does not vary with a quantity of the UE in the acknowledgement group. A quantity of index numbers included in the acknowledgement indication message usually does not exceed the preset data length.

The sending unit 1603 is configured to send the acknowledgement indication message.

In an optional implementation, a specific implementation in which the sending unit 1603 sends the acknowledgement indication message may be:

the sending unit 1603 sends the acknowledgement indication message on an acknowledgement resource corresponding to the acknowledgement group.

In this implementation, the acknowledgement resource corresponding to the acknowledgement group may include but is not limited a PDCCH or a PDSCH, each acknowledgement group has a corresponding acknowledgement resource, and different acknowledgement groups correspond to different acknowledgement resources.

In an optional implementation, the acknowledgement indication message may be used to indicate a flag bit of the index number corresponding to the target UE in addition to the index number corresponding to the target UE in the acknowledgement group.

Figure 17:
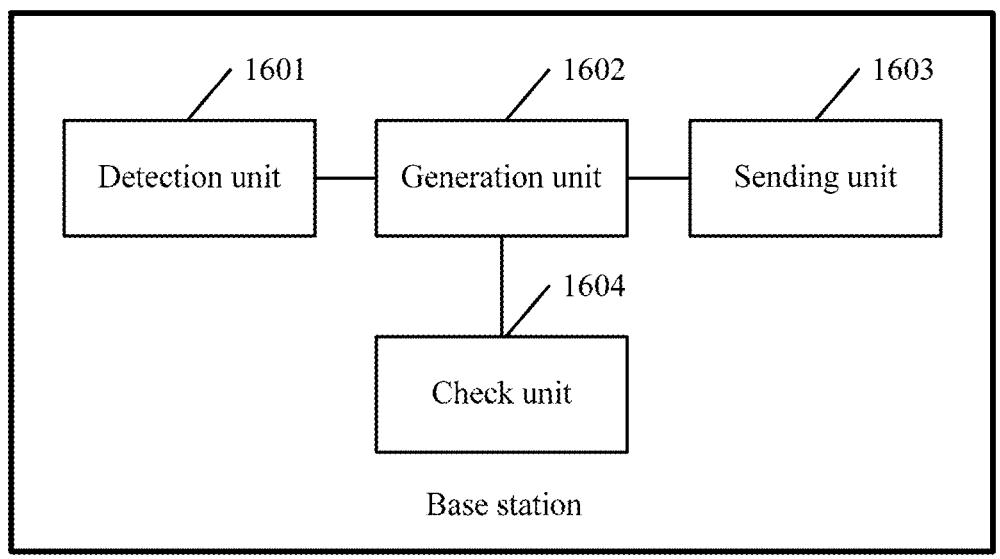
FIG. 17 is a schematic structural diagram of still yet another base station according to an embodiment of the present invention.

Referring to FIG. 17, FIG. 17 is a schematic structural diagram of still yet another base station according to an embodiment of the present invention. The base station is configured to perform the acknowledgement indication method for data transmission according to the embodiments of the present invention. The base station shown in FIG. 17 is obtained by further optimizing the base station shown in FIG. 16. Compared with the base station shown in FIG. 16, the base station shown in FIG. 17 may further include:

a check unit 1604, configured to: before the sending unit 1603 sends the acknowledgement indication message, check data transmitted by the target UE, to obtain a check result.

The generation unit 1602 is further configured to generate, according to the check result, a flag bit status of the index number corresponding to the target UE. The flag bit status of the index number includes a first state or a second state, the first state indicates that the data check performed by the base station succeeds, and the second state indicates that the data check performed by the base station fails.

In this embodiment of the present invention, one flag bit may be reserved after each index number indicated by the acknowledgement indication message, and the flag bit status may be generated according to a data check result.

In an optional implementation, when the acknowledgement indication message indicates that there is target UE corresponding to an index number whose flag bit status is the second state, the acknowledgement indication message further indicates a check failure status corresponding to data transmitted by the target UE corresponding to the index number whose flag bit status is the second state. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, before the detection unit 1601 detects whether each user equipment (UE) in the acknowledgement group transmits data, to obtain the detection result, the sending unit 1603 is further configured to send configuration information to each user equipment (UE) in the acknowledgement group. The configuration information indicates the acknowledgement group to which each UE belongs, a quantity of UE for which the base station presets a feedback in the acknowledgement group, and an index number corresponding to each UE in the acknowledgement group.

In this implementation, the configuration information may include cell-specific configuration information and UE-specific configuration information. The cell-specific configuration information may be used to indicate a cell ID and a cell SRS of a cell in which the UE is located, a sending period of the cell SRS, an offset in the period, and the like, and the cell-specific configuration information is the same for all UE in a same cell. The UE-specific configuration information may be used to indicate a C-RNTI in addition to the acknowledgement group to which the UE belongs, the quantity of UE for which the base station presets a feedback in the acknowledgement group, and the index number corresponding to the UE in the acknowledgement group. Different UE have different UE-specific configuration information.

Specifically, the base station shown in FIG. 16 or FIG. 17 may implement some or all procedures in the acknowledgement indication method embodiment for data transmission described in the present invention with reference to FIG. 6 or FIG. 7.

It may be learned that, according to the base station shown in FIG. 16 and FIG. 17, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved. In addition, a data check result can be indicated in addition to a data detection result, so that the UE can learn, in time, whether check performed by the base station on the data transmitted by the UE succeeds.

Figure 18:
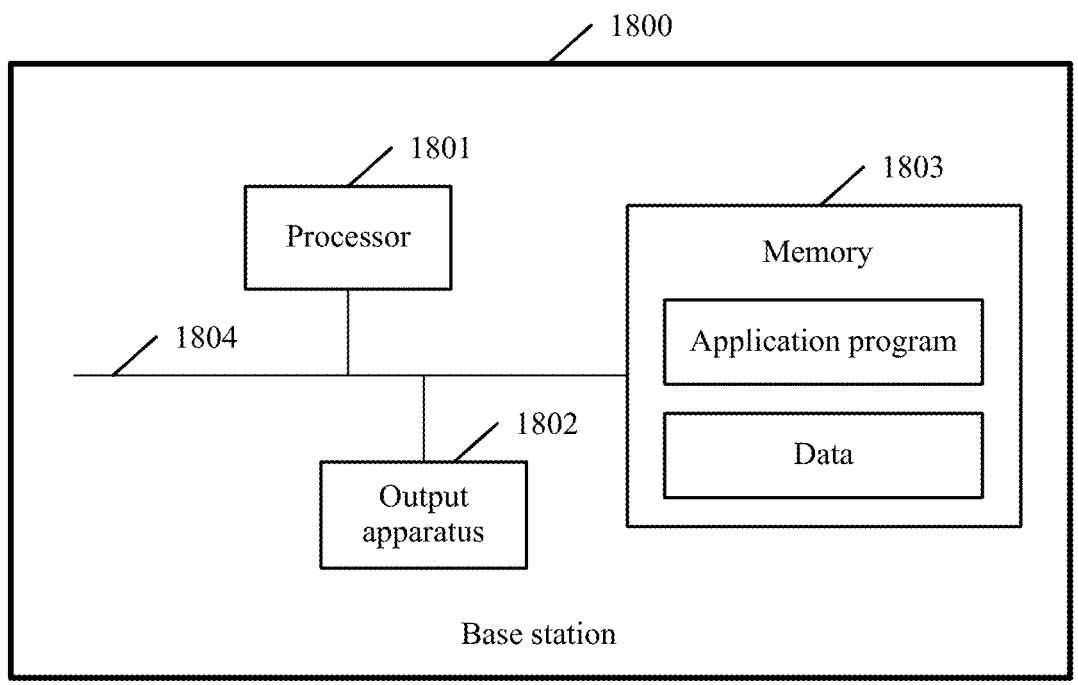
FIG. 18 is a schematic structural diagram of a further base station according to an embodiment of the present invention.

Based on the network architecture shown in FIG. 1, an embodiment of the present invention provides a further base station. Referring to FIG. 18, FIG. 18 is a schematic structural diagram of a further base station according to an embodiment of the present invention. The base station is configured to perform the acknowledgement indication method for data transmission according to the embodiments of the present invention. As shown in FIG. 18, the base station 1800 may include at least one processor 1801 such as a CPU, at least one output apparatus 1802, a memory 1803, and a communications bus 1804. The communications bus 1804 is configured to implement connections and communication between these components. A person skilled in the art may understand that the structure of the base station shown in FIG. 18 does not constitute a limitation on the present invention. The structure may be a bus structure or may be a star structure; and may further include more or fewer parts than those shown in FIG. 18, or combine some parts, or have different part arrangements.

In this embodiment of the present invention, the output apparatus 1802 may be configured to send an acknowledgement indication message.

In this embodiment of the present invention, the memory 1803 may be a high-speed RAM memory or a non-volatile memory such as at least one magnetic disk storage. In some embodiments, the memory 1803 may be at least one storage apparatus that is far away from the processor 1801. As shown in FIG. 18, the memory 1803 used as a computer storage medium may include an application program, data, and the like. This is not limited in this embodiment of the present invention.

In the base station shown in FIG. 18, the processor 1801 may be configured to invoke the application program stored in the memory 1803, to perform the following operations:

detecting whether each user equipment (UE) in an acknowledgement group transmits data, to obtain a detection result, where the acknowledgement group includes each UE whose data is to be detected by the base station;

generating an acknowledgement indication message according to the detection result, where the acknowledgement indication message indicates an index number corresponding to target UE in the acknowledgement group, the target UE is at least one UE whose data is found by the base station in the acknowledgement group, the index number is a number of the target UE in the acknowledgement group, and different target UE in the acknowledgement group correspond to different index numbers; and controlling the output apparatus 1802 to send the acknowledgement indication message.

In an optional implementation, a specific implementation in which the processor 1801 controls the output apparatus 1802 to send the acknowledgement indication message may be:

controlling the output apparatus 1802 to send the acknowledgement indication message on an acknowledgement resource corresponding to the acknowledgement group.

In an optional implementation, the acknowledgement indication message further indicates a flag bit of the index number corresponding to the target UE, and before the controlling the output apparatus 1802 to send the acknowledgement indication message, the processor 1801 is further configured to invoke the application program stored in the memory 1803, to perform the following steps:

checking data transmitted by the target UE, to obtain a check result; and generating, according to the check result, a flag bit status of the index number corresponding to the target UE, where the flag bit status of the index number includes a first state or a second state, the first state indicates that the data check performed by the base station succeeds, and the second state indicates that the data check performed by the base station fails.

In an optional implementation, when the acknowledgement indication message indicates that there is target UE corresponding to an index number whose flag bit status is the second state, the acknowledgement indication message further indicates a check failure status corresponding to data transmitted by the target UE corresponding to the index number whose flag bit status is the second state. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, a data length of the acknowledgement indication message is a preset data length, and a quantity of index numbers that are indicated by the acknowledgement indication message and that are corresponding to target UE in the acknowledgement group does not exceed the preset data length.

In an optional implementation, before the detecting whether each user equipment (UE) in an acknowledgement group transmits data, to obtain a detection result, the processor 1801 is further configured to invoke the application program stored in the memory 1803, to perform the following step:

controlling the output apparatus 1802 to send, to each user equipment (UE) in the acknowledgement group, configuration information included in the data stored in the memory 1803, where the configuration information indicates the acknowledgement group to which each UE belongs, a quantity of UE for which the base station presets a feedback in the acknowledgement group, and an index number corresponding to each UE in the acknowledgement group.

Specifically, the base station shown in FIG. 18 may implement some or all procedures in the acknowledgement indication method embodiment for data transmission described in the present invention with reference to FIG. 6 or FIG. 7.

It may be learned that, according to the base station shown in FIG. 18, in an uplink data transmission mode based on contention transmission, the base station can simultaneously feed back an acknowledgement indication message to a plurality of UE in an acknowledgement group, so that the UE can learn, in time, whether data transmitted by the UE is found by the base station. In this way, a problem that the UE has transmitted data but the base station misses detecting the data and does not feed back an acknowledgement indication message can be resolved. In addition, a data check result can be indicated in addition to a data detection result, so that the UE can learn, in time, whether check performed by the base station on the data transmitted by the UE succeeds.

Figure 19:
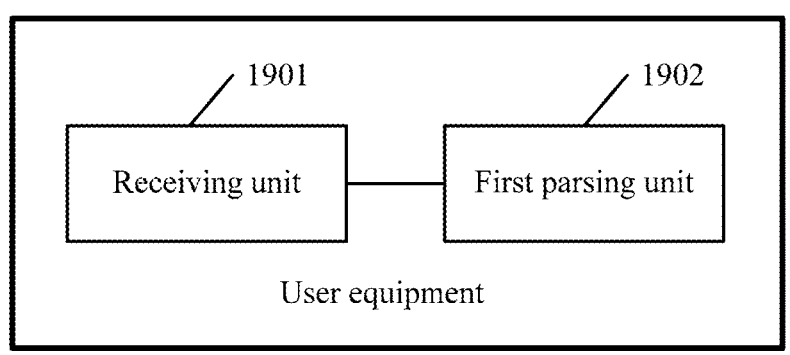
FIG. 19 is a schematic structural diagram of user equipment according to an embodiment of the present invention.

Based on the network architecture shown in FIG. 1, an embodiment of the present invention provides user equipment (UE). Referring to FIG. 19, FIG. 19 is a schematic structural diagram of user equipment according to an embodiment of the present invention. The user equipment is configured to perform the acknowledgement indication method for data transmission according to the embodiments of the present invention. As shown in FIG. 19, the user equipment (UE) may include a receiving unit 1901 and a first parsing unit 1902.

The receiving unit 1901 is configured to receive, after the UE sends data to a base station, a first-level acknowledgement indication message that is fed back by the base station. The first-level acknowledgement indication message indicates a flag bit status corresponding to each UE in an acknowledgement group to which the UE belongs, the flag bit status includes a first state or a second state, the first state indicates that the base station finds data, and the second state indicates that the base station does not find data.

In this embodiment of the present invention, after the UE sends uplink data to the base station, the receiving unit 1901 may receive the first-level acknowledgement indication message that is fed back by the base station. The first-level acknowledgement indication message indicates the flag bit status corresponding to each UE in the acknowledgement group to which the UE belongs, and the flag bit status may be used to indicate whether the data sent by the UE is found by the base station. The acknowledgement group includes each UE whose data is to be detected by the base station.

In this embodiment of the present invention, a data length of the first-level acknowledgement indication message is determined by a quantity of the UE in the acknowledgement group to which the UE belongs.

The first parsing unit 1902 is configured to parse a flag bit status corresponding to the UE in the acknowledgement group from the first-level acknowledgement indication message.

In this embodiment of the present invention, after the receiving unit 1901 receives the first-level acknowledgement indication message that is fed back by the base station, the first parsing unit 1902 may parse the flag bit status corresponding to the UE in the acknowledgement group from the first-level acknowledgement indication message.

In an optional implementation, the receiving unit 1901 is further configured to: when the first parsing unit 1902 learns, by means of parsing, that the flag bit status corresponding to the UE in the acknowledgement group is the first state, receive a second-level acknowledgement indication message that is fed back by the base station. The second-level acknowledgement indication message indicates a type of acknowledgement feedback information corresponding to data sent by target UE, the target UE is all UE that are in the acknowledgement group and whose flag bit statuses are the first state, the type of the acknowledgement feedback information includes a first type or a second type, the first type indicates that data check performed by the base station succeeds, and the second type indicates that the data check performed by the base station fails.

A data length of the second-level acknowledgement indication message is determined by a quantity of the target UE.

Figure 20:
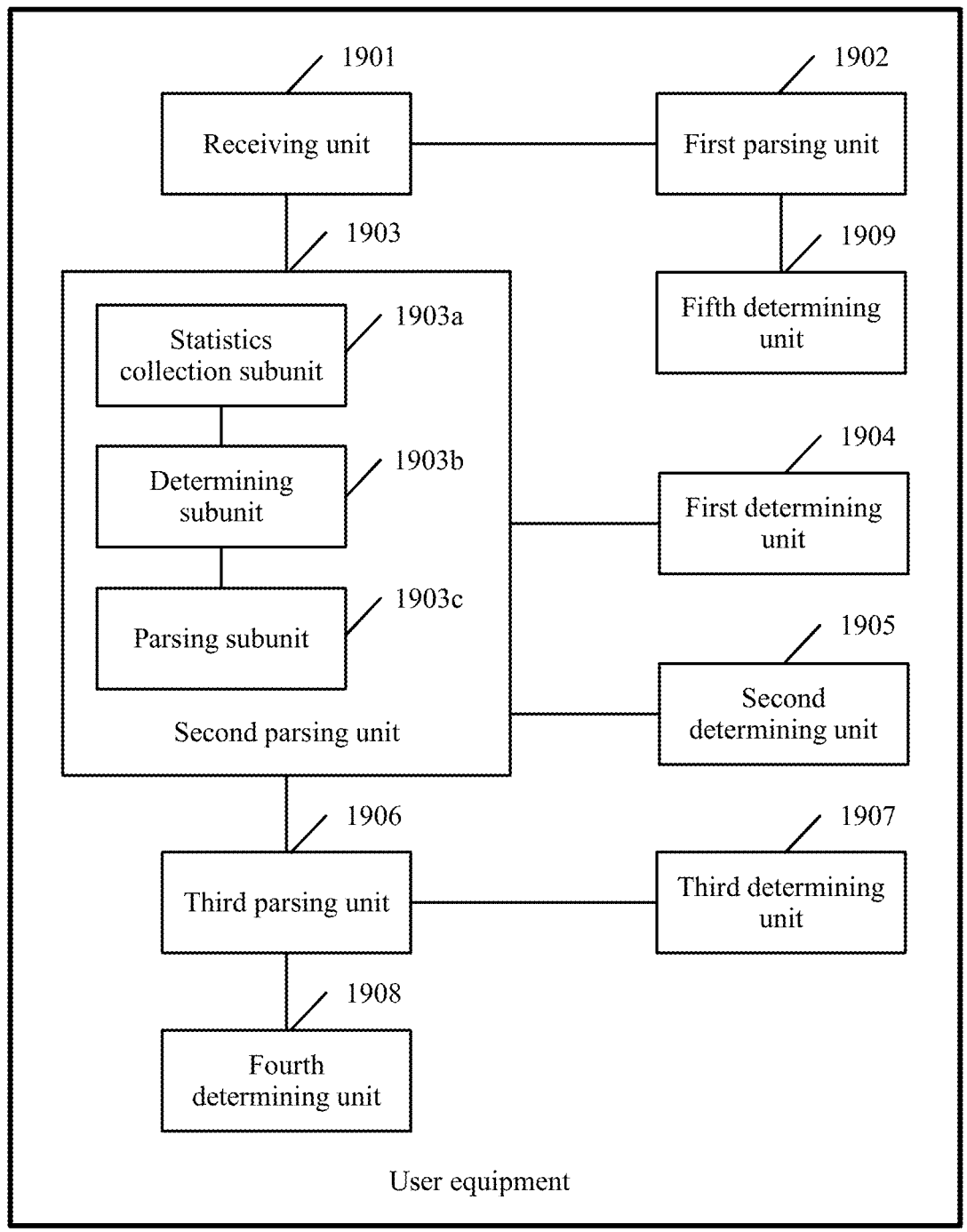
FIG. 20 is a schematic structural diagram of another user equipment according to an embodiment of the present invention.

Correspondingly, referring to FIG. 20, FIG. 20 is a schematic structural diagram of another user equipment according to an embodiment of the present invention. The user equipment is configured to perform the acknowledgement indication method for data transmission according to the embodiments of the present invention. The user equipment shown in FIG. 20 is obtained by further optimizing the user equipment shown in FIG. 19. Compared with the user equipment shown in FIG. 19, the user equipment shown in FIG. 20 may further include:

a second parsing unit 1903, configured to parse, from the second-level acknowledgement indication message received by the receiving unit 1901, a type of acknowledgement feedback information corresponding to the data sent by the UE.

In an optional implementation, the second parsing unit 1903 may further include:

a statistics collection subunit 1903*a*, configured to collect statistics about the quantity of the target UE;

a determining subunit 1903*b*, configured to determine a location of the UE in the target UE, where a location of the UE in the second-level acknowledgement indication message is determined by the location of the UE in the target UE; and a parsing subunit 1903*c*, configured to parse, on the location of the UE in the second-level acknowledgement indication message, the type of the acknowledgement feedback information corresponding to the data sent by the UE.

In an optional implementation, the user equipment shown in FIG. 20 may further include:

a first determining unit 1904, configured to: when the second parsing unit 1903 learns, by means of parsing, that the type of the acknowledgement feedback information corresponding to the data sent by the UE is the first type, determine that check performed by the base station on the data sent by the UE succeeds; and a second determining unit 1905, configured to: when the second parsing unit 1903 learns, by means of parsing, that the type of the acknowledgement feedback information corresponding to the data sent by the UE is the second type, determine that check performed by the base station on the data sent by the UE fails.

In an optional implementation, when the second-level acknowledgement indication message indicates that a type of acknowledgement feedback information corresponding to data transmitted by at least one target UE is the second type, the second-level acknowledgement indication message further indicates a check failure status corresponding to the data sent by the at least one target UE. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, the user equipment shown in FIG. 20 may further include:

a third parsing unit 1906, configured to: when the second parsing unit 1903 learns, by means of parsing, that the type of the acknowledgement feedback information corresponding to the data sent by the UE is the second type, parse, from the second-level acknowledgement indication message, a check failure status corresponding to the data sent by the UE.

Correspondingly, the user equipment shown in FIG. 20 may further include:

a third determining unit 1907, configured to: when the third parsing unit 1906 learns, by means of parsing, that the check failure status corresponding to the data sent by the UE is the third state, determine that check performed by the base station on the data sent by the UE fails due to the conflict that is caused by the low uplink multi-user matching degree; and a fourth determining unit 1908, configured to: when the third parsing unit 1906 learns, by means of parsing, that the check failure status corresponding to the data sent by the UE is the fourth state, determine that check performed by the base station on the data sent by the UE fails due to the poor data transmission channel quality.

In an optional implementation, the user equipment shown in FIG. 20 may further include:

a fifth determining unit 1909, configured to: when the first parsing unit 1902 learns, by means of parsing, that the flag bit status corresponding to the UE in the acknowledgement group is the second state, determine that the base station does not find the data sent by the UE.

In an optional implementation, the receiving unit 1901 is further configured to: before receiving, after the UE sends the data to the base station, the first-level acknowledgement indication message that is fed back by the base station, receive configuration information sent by the base station. The configuration information indicates the acknowledgement group to which the UE belongs, the quantity of the UE in the acknowledgement group, and a flag bit corresponding to the UE in the acknowledgement group.

Specifically, the user equipment shown in FIG. 19 or FIG. 20 may implement some or all procedures in the acknowledgement indication method embodiment for data transmission described in the present invention with reference to FIG. 9 or FIG. 10.

It may be learned that, according to the user equipment shown in FIG. 19 and FIG. 20, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved. In addition, when an acknowledgement is fed back by using indications of two levels, after learning, by parsing the first-level acknowledgement indication message, that the data sent by the UE is found by the base station, the UE may parse a data check result from the second-level acknowledgement indication message, so that the UE learns, in time, whether the check performed by the base station on the data sent by the UE succeeds.

Figure 21:
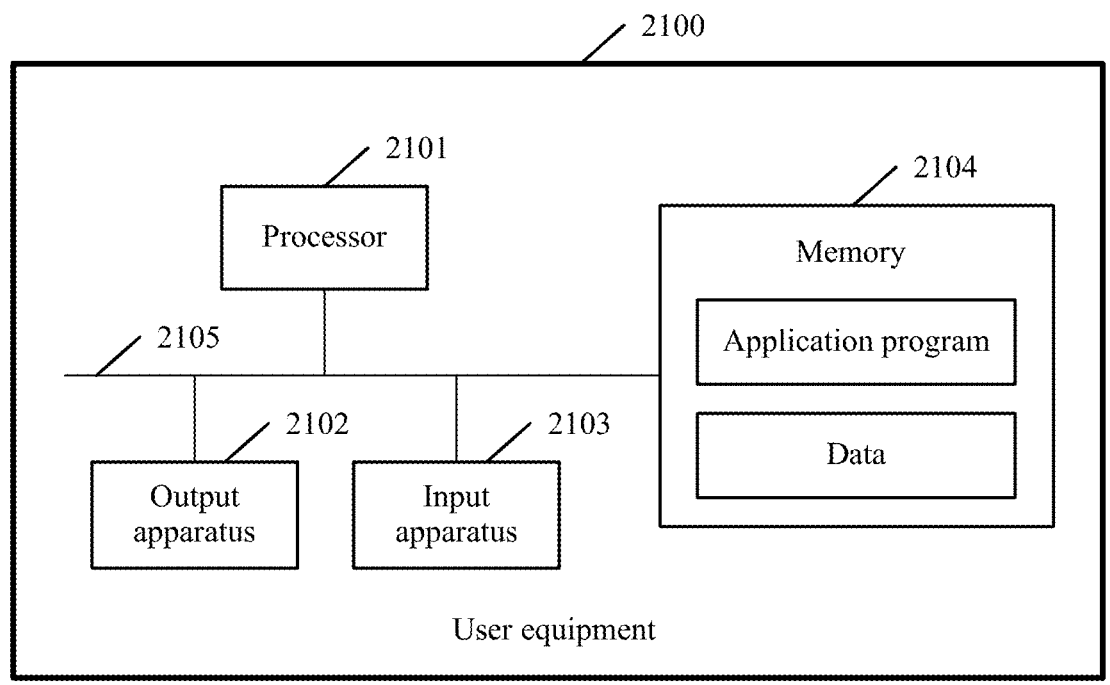
FIG. 21 is a schematic structural diagram of still another user equipment according to an embodiment of the present invention.

Based on the network architecture shown in FIG. 1, an embodiment of the present invention provides still another user equipment. Referring to FIG. 21, FIG. 21 is a schematic structural diagram of still another user equipment according to an embodiment of the present invention. The user equipment is configured to perform the acknowledgement indication method for data transmission according to the embodiments of the present invention. As shown in FIG. 21, the user equipment 2100 may include at least one processor 2101 such as a CPU, at least one output apparatus 2102, at least one input apparatus 2103, a memory 2104, and a communications bus 2105. The communications bus 2105 is configured to implement connections and communication between these components. A person skilled in the art may understand that the structure of the user equipment (UE) shown in FIG. 21 does not constitute a limitation on the present invention. The structure may be a bus structure or may be a star structure; and may further include more or fewer parts than those shown in FIG. 21, or combine some parts, or have different part arrangements.

In this embodiment of the present invention, the output apparatus 2102 may be configured to send data to a base station, and the input apparatus 2103 may be configured to receive an acknowledgement indication message that is fed back by the base station.

In this embodiment of the present invention, the memory 2104 may be a high-speed RAM memory or a non-volatile memory such as at least one magnetic disk storage. In some embodiments, the memory 2104 may be at least one storage apparatus that is far away from the processor 2101. As shown in FIG. 21, the memory 2104 used as a computer storage medium may include an operating system, an application program, data, and the like. This is not limited in this embodiment of the present invention.

In the user equipment shown in FIG. 21, the processor 2101 may be configured to invoke the application program stored in the memory 2104, to perform the following operations:

controlling, after controlling the output apparatus 2102 to send the data to the base station, the input apparatus 2103 to receive a first-level acknowledgement indication message that is fed back by the base station, where the first-level acknowledgement indication message indicates a flag bit status corresponding to each UE in an acknowledgement group to which the UE belongs, the flag bit status includes a first state or a second state, the first state indicates that the base station finds data, the second state indicates that the base station does not find data, and the acknowledgement group includes each UE whose data is to be detected by the base station; and parsing a flag bit status corresponding to the UE in the acknowledgement group from the first-level acknowledgement indication message.

In an optional implementation, a data length of the first-level acknowledgement indication message is determined by a quantity of the UE in the acknowledgement group.

In an optional implementation, the processor 2101 is further configured to invoke the application program stored in the memory 2104, to perform the following steps:

when it is learned, by means of parsing, that the flag bit status corresponding to the UE in the acknowledgement group is the first state, controlling the input apparatus 2103 to receive a second-level acknowledgement indication message that is fed back by the base station, where the second-level acknowledgement indication message indicates a type of acknowledgement feedback information corresponding to data sent by target UE, the target UE is all UE that are in the acknowledgement group and whose flag bit statuses are the first state, the type of the acknowledgement feedback information includes a first type or a second type, the first type indicates that data check performed by the base station succeeds, and the second type indicates that the data check performed by the base station fails; and parsing, from the second-level acknowledgement indication message, a type of acknowledgement feedback information corresponding to the data sent by the output apparatus 2102.

In an optional implementation, a data length of the second-level acknowledgement indication message is determined by a quantity of the target UE.

In an optional implementation, a specific implementation in which the processor 2101 parses, from the second-level acknowledgement indication message, the type of the acknowledgement feedback information corresponding to the data sent by the output apparatus 2102 may be:

collecting statistics about the quantity of the target UE;

determining a location of the UE in the target UE, where a location of the UE in the second-level acknowledgement indication message is determined by the location of the UE in the target UE; and parsing, on the location of the UE in the second-level acknowledgement indication message, the type of the acknowledgement feedback information corresponding to the data sent by the output apparatus 2102.

In an optional implementation, when the second-level acknowledgement indication message indicates that a type of acknowledgement feedback information corresponding to data transmitted by at least one target UE is the second type, the second-level acknowledgement indication message further indicates a check failure status corresponding to the data sent by the at least one target UE. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, the processor 2101 is further configured to invoke the application program stored in the memory 2104, to perform the following step:

when it is learned, by means of parsing, that the type of the acknowledgement feedback information corresponding to the data sent by the output apparatus 2102 is the first type, determining that check performed by the base station on the data sent by the output apparatus 2102 succeeds.

In an optional implementation, the processor 2101 is further configured to invoke the application program stored in the memory 2104, to perform the following step:

when it is learned, by means of parsing, that the type of the acknowledgement feedback information corresponding to the data sent by the output apparatus 2102 is the second type, determining that check performed by the base station on the data sent by the output apparatus 2102 fails.

In an optional implementation, the processor 2101 is further configured to invoke the application program stored in the memory 2104, to perform the following step:

when it is learned, by means of parsing, that the type of the acknowledgement feedback information corresponding to the data sent by the output apparatus 2102 is the second type, parsing, from the second-level acknowledgement indication message, a check failure status corresponding to the data sent by the output apparatus 2102.

In an optional implementation, the processor 2101 is further configured to invoke the application program stored in the memory 2104, to perform the following step:

when it is learned, by means of parsing, that the check failure status corresponding to the data sent by the output apparatus 2102 is the third state, determining that check performed by the base station on the data sent by the output apparatus 2102 fails due to the conflict that is caused by the low uplink multi-user matching degree.

In an optional implementation, the processor 2101 is further configured to invoke the application program stored in the memory 2104, to perform the following step:

when it is learned, by means of parsing, that the check failure status corresponding to the data sent by the output apparatus 2102 is the fourth state, determining that check performed by the base station on the data sent by the output apparatus 2102 fails due to the poor data transmission channel quality.

In an optional implementation, the processor 2101 is further configured to invoke the application program stored in the memory 2104, to perform the following step:

when it is learned, by means of parsing, that the flag bit status corresponding to the UE in the acknowledgement group is the second state, determining that the base station does not find the data sent by the output apparatus 2102.

In an optional implementation, before the controlling, after controlling the output apparatus 2102 to send the data to the base station, the input apparatus 2103 to receive a first-level acknowledgement indication message that is fed back by the base station, the processor 2101 is further configured to invoke the application program stored in the memory 2104, to perform the following step:

controlling the input apparatus 2103 to receive configuration information sent by the base station, where the configuration information indicates the acknowledgement group to which the UE belongs, the quantity of the UE in the acknowledgement group, and a flag bit corresponding to the UE in the acknowledgement group.

Specifically, the user equipment shown in FIG. 21 may implement some or all procedures in the acknowledgement indication method embodiment for data transmission described in the present invention with reference to FIG. 9 or FIG. 10.

It may be learned that, according to the user equipment shown in FIG. 21, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved. In addition, when an acknowledgement is fed back by using indications of two levels, after learning, by parsing the first-level acknowledgement indication message, that the data sent by the UE is found by the base station, the UE may parse a data check result from the second-level acknowledgement indication message, so that the UE learns, in time, whether the check performed by the base station on the data sent by the UE succeeds.

Figure 22:
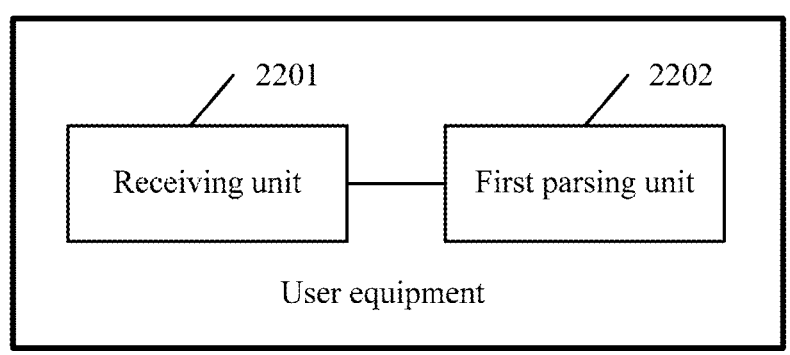
FIG. 22 is a schematic structural diagram of yet another user equipment according to an embodiment of the present invention.

Based on the network architecture shown in FIG. 1, an embodiment of the present invention provides yet another user equipment. Referring to FIG. 22, FIG. 22 is a schematic structural diagram of yet another user equipment according to an embodiment of the present invention. The user equipment is configured to perform the acknowledgement indication method for data transmission according to the embodiments of the present invention. As shown in FIG. 22, the user equipment (UE) may include a receiving unit 2201 and a first parsing unit 2202.

The receiving unit 2201 is configured to: after the UE sends data to a base station, receive an acknowledgement indication message that is fed back by the base station. The acknowledgement indication message indicates an index number corresponding to target UE in an acknowledgement group to which the UE belongs.

In this embodiment of the present invention, the target UE is at least one UE whose data is found by the base station in the acknowledgement group, the index number is a number of the target UE in the acknowledgement group, different target UE in the acknowledgement group correspond to different index numbers, and the acknowledgement group includes each UE whose data is to be detected by the base station.

In this embodiment of the present invention, a data length of the acknowledgement indication message is a preset data length, and a quantity of index numbers that are indicated by the acknowledgement indication message and that are corresponding to target UE in the acknowledgement group does not exceed the preset data length.

The first parsing unit 2202 is configured to parse the acknowledgement indication message, to detect whether there is an index number corresponding to the UE in the acknowledgement indication message.

In this embodiment of the present invention, the acknowledgement indication message includes the index number corresponding to the target UE whose data is found by the base station, and the first parsing unit 2202 may learn, by parsing the acknowledgement indication message, whether there is the index number corresponding to the UE. When there is the index number corresponding to the UE in the acknowledgement indication message, it may indicate that the base station finds the data sent by the UE. When there is no index number corresponding to the UE in the acknowledgement indication message, it may indicate that the base station misses detecting the data sent by the UE. In addition, because the data length of the acknowledgement indication message is a fixed length that is preset by the base station, when a quantity of UE whose data is found by the base station exceeds the data length of the acknowledgement indication message, the base station discards superfluous UE, and therefore there is no index number corresponding to the UE in the acknowledgement indication message because the acknowledgement indication message cannot indicate the index number due to a length limit. In this case, the UE may consider that the base station does not find the data, and the UE sends data to the base station again.

In an optional implementation, the acknowledgement indication message may be used to indicate a flag bit of the index number corresponding to the target UE in addition to the index number corresponding to the target UE in the acknowledgement group to which the UE belongs.

Figure 23:
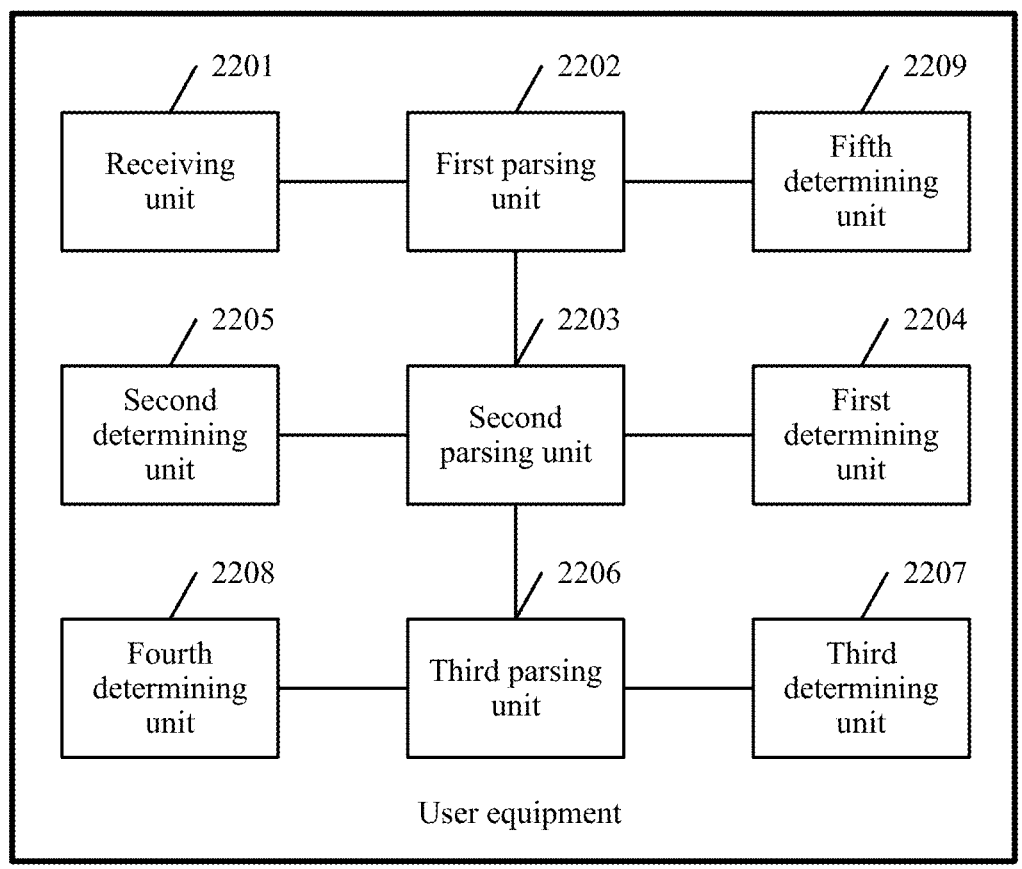
FIG. 23 is a schematic structural diagram of still yet another user equipment according to an embodiment of the present invention.

Correspondingly, referring to FIG. 23, FIG. 23 is a schematic structural diagram of still yet another user equipment according to an embodiment of the present invention. The user equipment is configured to perform the acknowledgement indication method for data transmission according to the embodiments of the present invention. The user equipment shown in FIG. 23 is obtained by further optimizing the user equipment shown in FIG. 22. Compared with the user equipment shown in FIG. 22, the user equipment shown in FIG. 23 may further include:

a second parsing unit 2203, configured to: when the first parsing unit 2202 learns, by means of parsing, that there is the index number corresponding to the UE in the acknowledgement indication message, parse a flag bit status of the index number corresponding to the UE. The flag bit status of the index number includes a first state or a second state, the first state indicates that data check performed by the base station succeeds, and the second state indicates that the data check performed by the base station fails.

In an optional implementation, the user equipment shown in FIG. 23 may further include:

a first determining unit 2204, configured to: when the second parsing unit 2203 learns, by means of parsing, that the flag bit status of the index number corresponding to the UE is the first state, determine that check performed by the base station on the data sent by the UE succeeds; and a second determining unit 2205, configured to: when the second parsing unit 2203 learns, by means of parsing, that the flag bit status of the index number corresponding to the UE is the second state, determine that check performed by the base station on the data sent by the UE fails.

In an optional implementation, when the acknowledgement indication message indicates that there is target UE corresponding to an index number whose flag bit status is the second state, the acknowledgement indication message may be further used to indicate a check failure status corresponding to data sent by the target UE corresponding to the index number whose flag bit status is the second state. The check failure status includes a third state or a fourth state, the third state indicates that a data check failure is caused by a conflict that is caused by a low uplink multi-user matching degree, and the fourth state indicates that the data check failure is caused by poor data transmission channel quality.

Correspondingly, the user equipment shown in FIG. 23 may further include:

a third parsing unit 2206, configured to: when the second parsing unit 2203 learns, by means of parsing, that the flag bit status of the index number corresponding to the UE is the second state, parse, from the acknowledgement indication message, a check failure status corresponding to the data sent by the UE.

In an optional implementation, the user equipment shown in FIG. 23 may further include:

a third determining unit 2207, configured to: when the third parsing unit 2206 learns, by means of parsing, that the check failure status corresponding to the data sent by the UE is the third state, determine that check performed by the base station on the data sent by the UE fails due to the conflict that is caused by the low uplink multi-user matching degree; and a fourth determining unit 2208, configured to: when the third parsing unit 2206 learns, by means of parsing, that the check failure status corresponding to the data sent by the UE is the fourth state, determine that check performed by the base station on the data sent by the UE fails due to the poor data transmission channel quality.

In an optional implementation, the user equipment shown in FIG. 23 may further include:

a fifth determining unit 2209, configured to: when the first parsing unit 2202 learns, by means of parsing, that there is no index number corresponding to the UE in the acknowledgement indication message, determine that the base station does not find the data sent by the UE.

In an optional implementation, the receiving unit 2201 may be further configured to: before receiving, after the UE sends the data to the base station, the acknowledgement indication message that is fed back by the base station, receive configuration information sent by the base station. The configuration information indicates the acknowledgement group to which the UE belongs, a quantity of UE for which the base station presets a feedback in the acknowledgement group, and the index number corresponding to the UE in the acknowledgement group.

Specifically, the user equipment shown in FIG. 22 or FIG. 23 may implement some or all procedures in the acknowledgement indication method embodiment for data transmission described in the present invention with reference to FIG. 11 or FIG. 12.

It may be learned that, according to the user equipment shown in FIG. 22 and FIG. 23, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved. In addition, the UE may further parse a data check result after learning, by means of parsing, that the data sent by the UE is found by the base station, so that the UE learns, in time, whether the check performed by the base station on the data sent by the UE succeeds.

Figure 24:
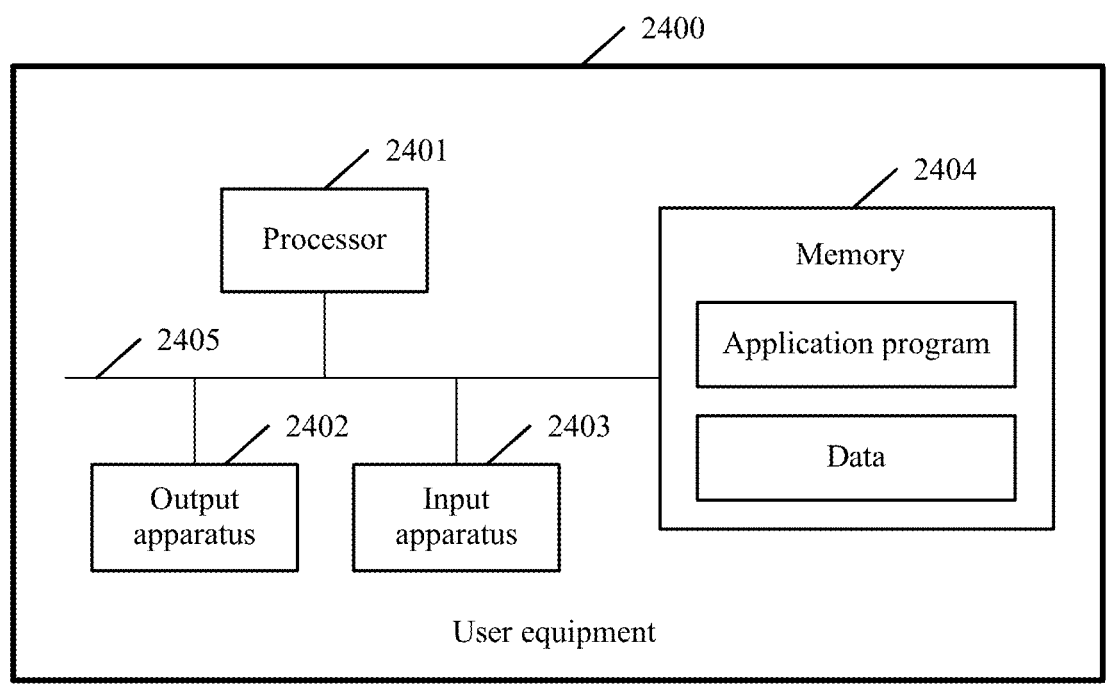
FIG. 24 is a schematic structural diagram of further user equipment according to an embodiment of the present invention.

Based on the network architecture shown in FIG. 1, an embodiment of the present invention provides further user equipment. Referring to FIG. 24, FIG. 24 is a schematic structural diagram of further user equipment according to an embodiment of the present invention. The user equipment is configured to perform the acknowledgement indication method for data transmission according to the embodiments of the present invention. As shown in FIG. 24, the user equipment 2400 may include at least one processor 2401 such as a CPU, at least one output apparatus 2402, at least one input apparatus 2403, a memory 2404, and a communications bus 2405. The communications bus 2405 is configured to implement connections and communication between these components. A person skilled in the art may understand that the structure of the user equipment (UE) shown in FIG. 24 does not constitute a limitation on the present invention. The structure may be a bus structure or may be a star structure; and may further include more or fewer parts than those shown in FIG. 24, or combine some parts, or have different part arrangements.

In this embodiment of the present invention, the output apparatus 2402 may be configured to send data to a base station, and the input apparatus 2403 may be configured to receive an acknowledgement indication message that is fed back by the base station.

In this embodiment of the present invention, the memory 2404 may be a high-speed RAM memory or a non-volatile memory such as at least one magnetic disk storage. In some embodiments, the memory 2404 may be at least one storage apparatus that is far away from the processor 2401. As shown in FIG. 24, the memory 2404 used as a computer storage medium may include an operating system, an application program, data, and the like. This is not limited in this embodiment of the present invention.

In the user equipment shown in FIG. 24, the processor 2401 may be configured to invoke the application program stored in the memory 2404, to perform the following operations:

controlling, after controlling the output apparatus 2402 to send the data to the base station, the input apparatus 2403 to receive an acknowledgement indication message that is fed back by the base station, where the acknowledgement indication message indicates an index number corresponding to target UE in an acknowledgement group to which the UE belongs, the target UE is at least one UE whose data is found by the base station in the acknowledgement group, the index number is a number of the target UE in the acknowledgement group, different target UE in the acknowledgement group correspond to different index numbers, and the acknowledgement group includes each UE whose data is to be detected by the base station; and parsing the acknowledgement indication message, to detect whether there is an index number corresponding to the UE in the acknowledgement indication message.

In an optional implementation, the acknowledgement indication message further indicates a flag bit of the index number corresponding to the target UE, and the processor 2401 is further configured to invoke the application program stored in the memory 2404, to perform the following step:

when it is learned, by means of parsing, that there is the index number corresponding to the UE in the acknowledgement indication message, parsing a flag bit status of the index number corresponding to the UE, where the flag bit status of the index number includes a first state or a second state, the first state indicates that data check performed by the base station succeeds, and the second state indicates that the data check performed by the base station fails.

In an optional implementation, when the acknowledgement indication message indicates that there is target UE corresponding to an index number whose flag bit status is the second state, the acknowledgement indication message further indicates a check failure status corresponding to data sent by the target UE corresponding to the index number whose flag bit status is the second state. The check failure status includes a third state or a fourth state, the third state indicates that a data check failure is caused by a conflict that is caused by a low uplink multi-user matching degree, and the fourth state indicates that the data check failure is caused by poor data transmission channel quality.

In an optional implementation, the processor 2401 is further configured to invoke the application program stored in the memory 2404, to perform the following step:

when it is learned, by means of parsing, that the flag bit status of the index number corresponding to the UE is the first state, determining that check performed by the base station on the data sent by the output apparatus 2402 succeeds.

In an optional implementation, the processor 2401 is further configured to invoke the application program stored in the memory 2404, to perform the following step:

when it is learned, by means of parsing, that the flag bit status of the index number corresponding to the UE is the second state, determining that check performed by the base station on the data sent by the output apparatus 2402 fails.

In an optional implementation, the processor 2401 is further configured to invoke the application program stored in the memory 2404, to perform the following step:

when it is learned, by means of parsing, that the flag bit status of the index number corresponding to the UE is the second state, parsing, from the acknowledgement indication message, a check failure status corresponding to the data sent by the output apparatus 2402.

In an optional implementation, the processor 2401 is further configured to invoke the application program stored in the memory 2404, to perform the following step:

when it is learned, by means of parsing, that the check failure status corresponding to the data sent by the output apparatus 2402 is the third state, determining that check performed by the base station on the data sent by the output apparatus 2402 fails due to the conflict that is caused by the low uplink multi-user matching degree.

In an optional implementation, the processor 2401 is further configured to invoke the application program stored in the memory 2404, to perform the following step:

when it is learned, by means of parsing, that the check failure status corresponding to the data sent by the output apparatus 2402 is the fourth state, determining that check performed by the base station on the data sent by the output apparatus 2402 fails due to the poor data transmission channel quality.

In an optional implementation, the processor 2401 is further configured to invoke the application program stored in the memory 2404, to perform the following step:

when it is learned, by means of parsing, that there is no index number corresponding to the UE in the acknowledgement indication message, determining that the base station does not find the data sent by the output apparatus 2402.

In an optional implementation, a data length of the acknowledgement indication message is a preset data length, and a quantity of index numbers that are indicated by the acknowledgement indication message and that are corresponding to target UE in the acknowledgement group to which the UE belongs does not exceed the preset data length.

In an optional implementation, before the controlling, after controlling the output apparatus 2402 to send the data to the base station, the input apparatus 2403 to receive an acknowledgement indication message that is fed back by the base station, the processor 2401 is further configured to invoke the application program stored in the memory 2404, to perform the following step:

controlling the input apparatus 2403 to receive configuration information sent by the base station, where the configuration information indicates the acknowledgement group to which the UE belongs, a quantity of UE for which the base station presets a feedback in the acknowledgement group, and the index number corresponding to the UE in the acknowledgement group.

Specifically, the user equipment shown in FIG. 24 may implement some or all procedures in the acknowledgement indication method embodiment for data transmission described in the present invention with reference to FIG. 11 or FIG. 12.

It may be learned that, according to the user equipment shown in FIG. 24, after sending the data to the base station by means of contention, the UE may receive an acknowledgement indication message that is simultaneously fed back by the base station to a plurality of UE, and learn, in time by parsing the acknowledgement indication message, whether the data sent by the UE is found by the base station, so that a problem that the UE has transmitted data but the base station misses detecting the data and does not feed back an acknowledgement indication message can be resolved. In addition, the UE may further parse a data check result after learning, by means of parsing, that the data sent by the UE is found by the base station, so that the UE learns, in time, whether the check performed by the base station on the data sent by the UE succeeds.

A module or a submodule in all embodiments of the present invention may be implemented by using a universal integrated circuit such as a CPU or by using an Application Specific Integrated Circuit (ASIC).

It should be noted that, for brief description, the foregoing method embodiments are represented as a series of actions. However, a person skilled in the art should appreciate that the present invention is not limited to the described order of the actions, because according to the present invention, some steps may be performed simultaneously or in another order. In addition, a person skilled in the art should also appreciate that all the embodiments described in the specification are example embodiments, and the related actions and modules are not necessarily mandatory to the present invention.

In the foregoing embodiments, the descriptions of the embodiments have respective focuses. For a part that is not described in detail in an embodiment, refer to related description in other embodiments.

The steps in the methods in the embodiments of the present invention may be adjusted, combined, and deleted according to an actual requirement.

The units or subunits in the base station or the user equipment (UE) in the embodiments of the present invention may be combined, divided, and deleted according to an actual requirement.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disc, and the like.

The acknowledgement indication method for data transmission and the related device according to the embodiments of the present invention are described in detail above. In this specification, specific examples are used to describe the principle and implementations of the present invention, and the description of the embodiments is only intended to help understand the method and core idea of the present invention. In addition, a person of ordinary skill in the art may, based on the idea of the present invention, may make modification with respect to the specific implementations and application(s) described herein. Therefore, the content of this specification shall not be construed as limitations to the present invention.

What is claimed is:

1. A base station, comprising a processor, a memory, an output apparatus, and a communications bus, wherein the memory is configured to store a program and data;

the communications bus is configured to establish connections and communication between the processor, the memory, and the output apparatus; and the processor is configured to invoke the program stored in the memory, to perform the following steps:

detecting whether each user equipment (UE) in an acknowledgement group transmits data, to obtain a detection result, wherein the acknowledgement group comprises UE having data to be detected by the base station;

generating a first-level acknowledgement indication message according to the detection result, wherein the first-level acknowledgement indication message indicates a flag bit status corresponding to each UE in the acknowledgement group, the flag bit status comprising a first state or a second state, the first state indicating that the base station finds data, and the second state indicating that the base station does not find data; and controlling the output apparatus to send the first-level acknowledgement indication message.

2. The base station according to claim 1, wherein a data length of the first-level acknowledgement indication message is determined by a quantity of the UE in the acknowledgement group.

3. The base station according to claim 1, wherein controlling the output apparatus to send the first-level acknowledgement indication comprises:

controlling the output apparatus to send the first-level acknowledgement indication message on a first acknowledgement resource corresponding to the acknowledgement group.

4. The base station according to claim 1, wherein the processor is further configured to invoke the program stored in the memory, to perform the following steps:

when a target UE is included in the UE in the acknowledgement group, checking data transmitted by the target UE, to obtain a check result, wherein the target UE is all UE whose flag bit statuses are the first state;

generating a second-level acknowledgement indication message according to the check result, wherein the second-level acknowledgement indication message indicates a type of acknowledgement feedback information corresponding to the data transmitted by the target UE, the type of the acknowledgement feedback information comprising a first type or a second type, the first type indicating that the data check performed by the base station succeeds, and the second type indicating that the data check performed by the base station fails; and controlling the output apparatus to send the second-level acknowledgement indication message.

5. The base station according to claim 4, controlling the output apparatus to send the second-level acknowledgement indication message comprises:

controlling the output apparatus to send the second-level acknowledgement indication message on a second acknowledgement resource corresponding to the acknowledgement group.

6. The base station according to claim 4, wherein a data length of the second-level acknowledgement indication message is determined by a quantity of the target UE.

7. The base station according to claim 4, wherein when the second-level acknowledgement indication message indicates that a type of acknowledgement feedback information corresponding to data transmitted by at least one target UE is the second type, the second-level acknowledgement indication message further indicates a check failure status corresponding to the data transmitted by the at least one target UE, the check failure status comprising a third state or a fourth state, the third state indicating that a data check failure is caused by a conflict that is caused by a low uplink multi-user matching degree, and the fourth state indicating that the data check failure is caused by poor data transmission channel quality.

8. The base station according to claim 1, wherein before the detecting whether each user equipment (UE) in an acknowledgement group transmits data, to obtain a detection result, the processor is further configured to invoke the program stored in the memory, to perform the following step:

controlling the output apparatus to send, to each user equipment (UE) in the acknowledgement group, configuration information comprised in the data stored in the memory, wherein the configuration information indicates the acknowledgement group to which each UE belongs, the quantity of the UE in the acknowledgement group, and a flag bit corresponding to each UE in the acknowledgement group.

9. A base station, comprising a processor, a memory, an output apparatus, and a communications bus, wherein the memory is configured to store a program and data;

the communications bus is configured to establish connections and communication between the processor, the memory, and the output apparatus; and the processor is configured to invoke the program stored in the memory, to perform the following steps:

detecting whether each user equipment (UE) in an acknowledgement group transmits data, to obtain a detection result, wherein the acknowledgement group comprises UE having data to be detected by the base station;

generating an acknowledgement indication message according to the detection result, wherein the acknowledgement indication message indicates an index number corresponding to target UE in the acknowledgement group, the target UE being at least one UE having data found by the base station in the acknowledgement group, the index number being a number of the target UE in the acknowledgement group, and different target UE in the acknowledgement group corresponding to different index numbers; and controlling the output apparatus to send the acknowledgement indication message.

10. The base station according to claim 9, controlling the output apparatus to send the acknowledgement indication message comprises:

controlling the output apparatus to send the acknowledgement indication message on an acknowledgement resource corresponding to the acknowledgement group.

11. The base station according to claim 9, wherein the acknowledgement indication message further indicates a flag bit of the index number corresponding to the target UE, and before the controlling the output apparatus to send the acknowledgement indication message, the processor is further configured to invoke the program stored in the memory, to perform the following steps:

checking data transmitted by the target UE, to obtain a check result; and generating, according to the check result, a flag bit status of the index number corresponding to the target UE, wherein the flag bit status of the index number comprises a first state or a second state, the first state indicating that the data check performed by the base station succeeds, and the second state indicating that the data check performed by the base station fails.

12. The base station according to claim 11, wherein when the acknowledgement indication message indicates that a target UE corresponding to an index number has a flag bit status indicting the second state, the acknowledgement indication message further indicates a check failure status corresponding to data transmitted by the target UE, the check failure status comprising a third state or a fourth state, the third state indicating that a data check failure is caused by a conflict that is caused by a low uplink multi-user matching degree, and the fourth state indicating that the data check failure is caused by poor data transmission channel quality.

13. The base station according to claim 9, wherein a data length of the acknowledgement indication message is a preset data length, and a quantity of index numbers, corresponding to target UE in the acknowledgement group, that are indicated by the acknowledgement indication message does not exceed the preset data length.

14. The base station according to claim 9, wherein before the detecting whether each user equipment (UE) in an acknowledgement group transmits data, to obtain a detection result, the processor is further configured to invoke the program stored in the memory, to perform the following step:
controlling the output apparatus to send, to each user equipment (UE) in the acknowledgement group, configuration information in the data stored in the memory, wherein the configuration information indicates the acknowledgement group to which each UE belongs, a quantity of UE for which the base station presets a feedback in the acknowledgement group, and an index number corresponding to each UE in the acknowledgement group.

15. User equipment (UE), comprising a processor, a memory, an output apparatus, an input apparatus, and a communications bus, wherein
the memory is configured to store a program and data;
the communications bus is configured to establish connections and communication between the processor, the memory, the output apparatus, and the input apparatus; and
the processor is configured to invoke the program stored in the memory, to perform the following steps:
controlling, after controlling the output apparatus to send data to a base station, the input apparatus to receive a first-level acknowledgement indication message that is fed back by the base station, wherein the first-level acknowledgement indication message indicates a flag bit status corresponding to each UE in an acknowledgement group to which the UE belongs, the flag bit status comprising a first state or a second state, the first state indicates that the base station finding data, the second state indicating that the base station does not find data, and the acknowledgement group comprising UE having data to be detected by the base station; and
parsing a flag bit status corresponding to the UE in the acknowledgement group from the first-level acknowledgement indication message.

16. The UE according to claim 15, wherein a data length of the first-level acknowledgement indication message is determined by a quantity of the UE in the acknowledgement group.

17. The UE according to claim 15, wherein the processor is further configured to invoke the program stored in the memory, to perform the following steps:
when it is learned, by means of parsing, that the flag bit status corresponding to the UE in the acknowledgement group is the first state, controlling the input apparatus to receive a second-level acknowledgement indication message fed back by the base station, wherein the second-level acknowledgement indication message indicates a type of acknowledgement feedback information corresponding to data sent by target UE, the target UE is all UE in the acknowledgement group and have flag bit statuses indicating the first state, the type of the acknowledgement feedback information comprises a first type or a second type, the first type indicating that data check performed by the base station succeeds, and the second type indicating that the data check performed by the base station fails; and
parsing, from the second-level acknowledgement indication message, a type of acknowledgement feedback information corresponding to the data sent by the output apparatus.

18. The UE according to claim 17, wherein a data length of the second-level acknowledgement indication message is determined by a quantity of the target UE.

19. The UE according to claim 17, wherein a manner in which the processor parses, from the second-level acknowledgement indication message, the type of the acknowledgement feedback information corresponding to the data sent by the output apparatus is specifically:
collecting statistics about the quantity of the target UE;
determining a location of the UE in the target UE, wherein a location of the UE in the second-level acknowledgement indication message is determined by the location of the UE in the target UE; and
parsing, on the location of the UE in the second-level acknowledgement indication message, the type of the acknowledgement feedback information corresponding to the data sent by the output apparatus.

20. The UE according to claim 15, wherein before the controlling, after controlling the output apparatus to send data to a base station, the input apparatus to receive a first-level acknowledgement indication message that is fed back by the base station, the processor is further configured to invoke the program stored in the memory, to perform the following step:
controlling the input apparatus to receive configuration information sent by the base station, wherein the configuration information indicates the acknowledgement group to which the UE belongs, the quantity of the UE in the acknowledgement group, and a flag bit corresponding to the UE in the acknowledgement group.

* * * * *